US012627435B2

(12) United States Patent
Lu et al.

(10) Patent No.: US 12,627,435 B2
(45) Date of Patent: May 12, 2026

(54) METHOD FOR SENDING DATA IN WIRELESS NETWORK, AND RELATED APPARATUS

(71) Applicant: HUAWEI TECHNOLOGIES CO., LTD., Guangdong (CN)

(72) Inventors: Yuxin Lu, Shenzhen (CN); Chenchen Liu, Shenzhen (CN); Ming Gan, Shenzhen (CN); Yunbo Li, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 248 days.

(21) Appl. No.: 18/398,660

(22) Filed: Dec. 28, 2023

(65) Prior Publication Data

US 2024/0154748 A1 May 9, 2024

Related U.S. Application Data

(63) Continuation of application No. PCT/CN2022/102493, filed on Jun. 29, 2022.

(30) Foreign Application Priority Data

Jul. 2, 2021 (CN) .......................... 202110753768.6

(51) Int. Cl.
*H04L 5/00* (2006.01)
*H04L 27/26* (2006.01)
(52) U.S. Cl.
CPC ........ *H04L 5/0048* (2013.01); *H04L 27/2613* (2013.01)
(58) Field of Classification Search
CPC . H04L 5/0048; H04L 27/2613; H04L 5/0044; H04L 27/2602; H04L 1/0018;
(Continued)

(56) References Cited

U.S. PATENT DOCUMENTS

2017/0156148 A1 6/2017 Park et al.
2017/0171860 A1 6/2017 Park et al.
(Continued)

FOREIGN PATENT DOCUMENTS

CN 108881090 A 11/2018
KR 20160130944 A 11/2016
WO 2020242105 A1 12/2020

OTHER PUBLICATIONS

Extended European Search Report in European Appln No. 22832134.5, dated Sep. 23, 2024, 7 pages.
(Continued)

*Primary Examiner* — Richard T Torrente
(74) *Attorney, Agent, or Firm* — Fish & Richardson P.C.

(57) ABSTRACT

This application provides example methods for sending data in a wireless network, and example related apparatuses. One example method includes determining, by a first device, a distributed resource unit (RU) allocated to the first device, where the distributed RU includes data subcarriers and pilot subcarriers, all subcarriers of one distributed RU are distributed on a first frequency band, a size of the first frequency band is 20 MHz, the first frequency band includes a maximum of 18 pilot subcarriers that are disposed at an interval, a quantity of pilot subcarriers included in one distributed RU is greater than or equal to 2, and at least two pilot subcarriers included in one distributed RU are spaced by at least M pilot subcarriers. The first device sends a physical layer protocol data unit (PPDU) on the distributed RU.

18 Claims, 13 Drawing Sheets

(58) Field of Classification Search
CPC .... H04L 5/0094; H04W 84/12; H04W 24/08;
H04W 72/0453; H04W 72/53
See application file for complete search history.

(56) References Cited

U.S. PATENT DOCUMENTS

| | | | |
|---|---|---|---|
| 2019/0174410 A1 | 6/2019 | Seok et al. | |
| 2020/0008185 A1 | 1/2020 | Chen et al. | |
| 2020/0014509 A1 | 1/2020 | Asterjadhi et al. | |
| 2020/0044699 A1 | 2/2020 | Park et al. | |
| 2020/0137836 A1 | 4/2020 | Chen et al. | |
| 2021/0127367 A1* | 4/2021 | Yi | H04W 72/23 |
| 2021/0143955 A1* | 5/2021 | Yang | H04L 5/0048 |
| 2023/0403126 A1* | 12/2023 | Gong | H04L 5/001 |

OTHER PUBLICATIONS

Office Action in Japanese Appln. No. 2023-580657, mailed on Dec. 10, 2024, 6 pages (with English translation).
IEEE Std 802.11a-1999, Supplement to IEEE Standard for Information technology Telecommunications and information exchange between systems Local and metropolitan area networks Specific requirements Part 11: Wireless LAN Medium Access Control (MAC) and Physical Layer (PHY) specifications: High-speed Physical Layer in the 5 GHZ Band, Sep. 16, 1999, 90 pages.
IEEE Std 802.11b-1999, Supplement to IEEE Standard for Information technology Telecommunications and information exchange between systems Local and metropolitan area networks Specific requirements Part 11: Wireless LAN Medium Access Control (MAC) and Physical Layer (PHY) specifications: Higher-Speed Physical Layer Extension in the 2.4 GHz Band, Sep. 16, 1999, 97 pages.
IEEE Std 802.11g-2003, IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band, Jun. 12, 2003, 77 pages.
IEEE Std 802.11n-2009, IEEE Standard for Information technology Telecommunications and information exchange between systems Local and metropolitan area networks Specific requirements Part 11: Wireless LAN Medium Access Control (MAC) and Physical Layer (PHY) Specifications Amendment 5: Enhancements for Higher Throughput, Sep. 11, 2009, 536 pages.
IEEE Std 802.11ac-2013, IEEE Standard for Information technology Telecommunications and information exchange between systems Local and metropolitan area networks Specific requirements Part 11: Wireless LAN Medium Access Control (MAC) and Physical Layer (PHY) Specifications Amendment 4: Enhancements for Very High Throughput for Operation in Bands below 6 GHZ, Dec. 11, 2013, 425 pages.
IEEE P802.11ax/D8.0, Draft Standard for Information technology Telecommunications and information exchange between systems Local and metropolitan area networks Specific requirements Part 11: Wireless LAN Medium Access Control (MAC) and Physical Layer (PHY) Specifications Amendment 1: Enhancements for High Efficiency WLAN, Oct. 2020, 820 pages.
IEEE P802.11be/D0.3, Draft Standard for Information technology Telecommunications and information exchange between systems Local and metropolitan area networks Specific requirements Part 11: Wireless LAN Medium Access Control (MAC) and Physical Layer (PHY) Specifications Amendment 8: Enhancements for extremely high throughput (EHT), Jan. 2021, 196 pages.
Federal Communications Commission, Report and Order and Further Notice of Proposed Rulemaking, FCC 20-51, Apr. 23, 2020, 142 pages.
Office Action in Korean Appln. No. 2024-7002270, mailed on Feb. 6, 2026, 11 pages (with English translation).

* cited by examiner

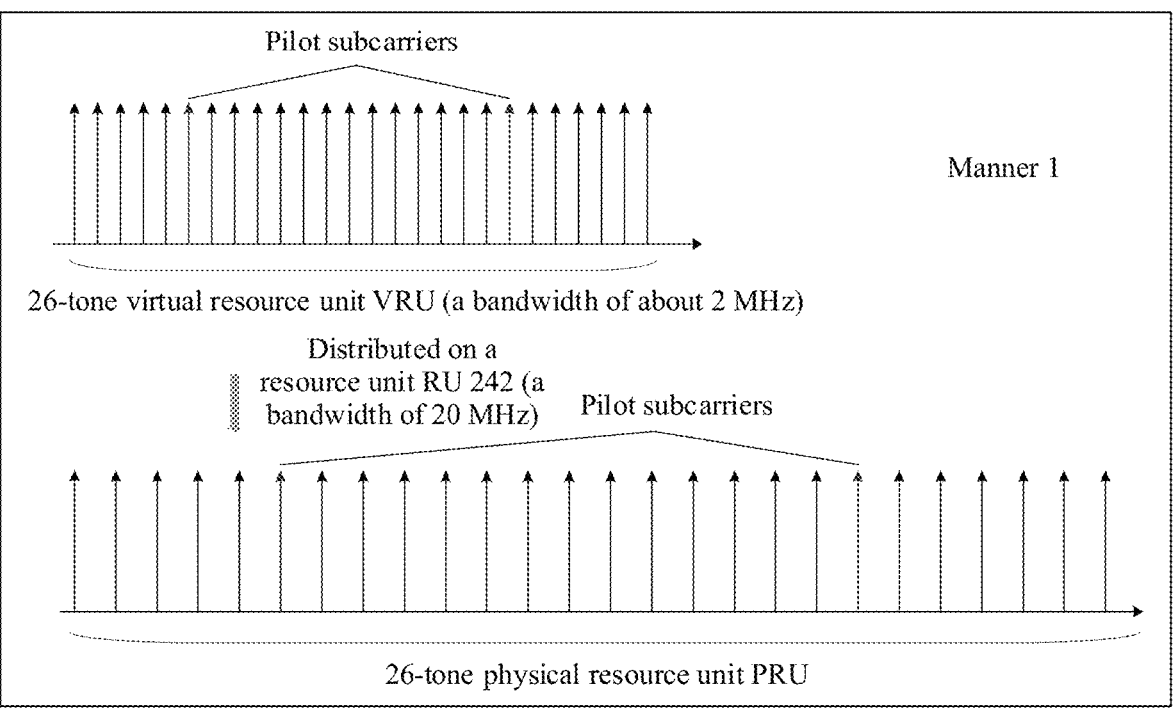
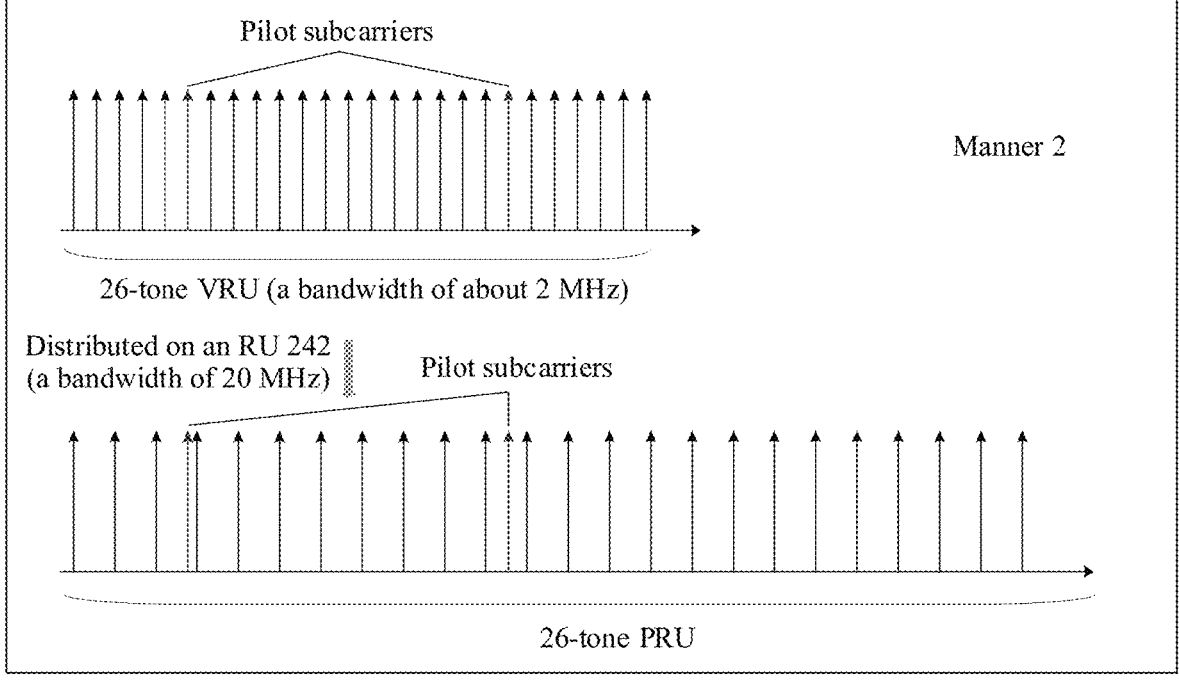
FIG. 1

Wireless access point
(AP)

Station 1
(STA 1)

Station 2
(STA 2)

Frequency (subcarrier)

Time (transmitted symbol): time unit (pilot symbol)
Frequency (subcarrier): frequency band (subcarrier)

Pilot subcarrier

Data subcarrier

Time
(transmitted
symbol)

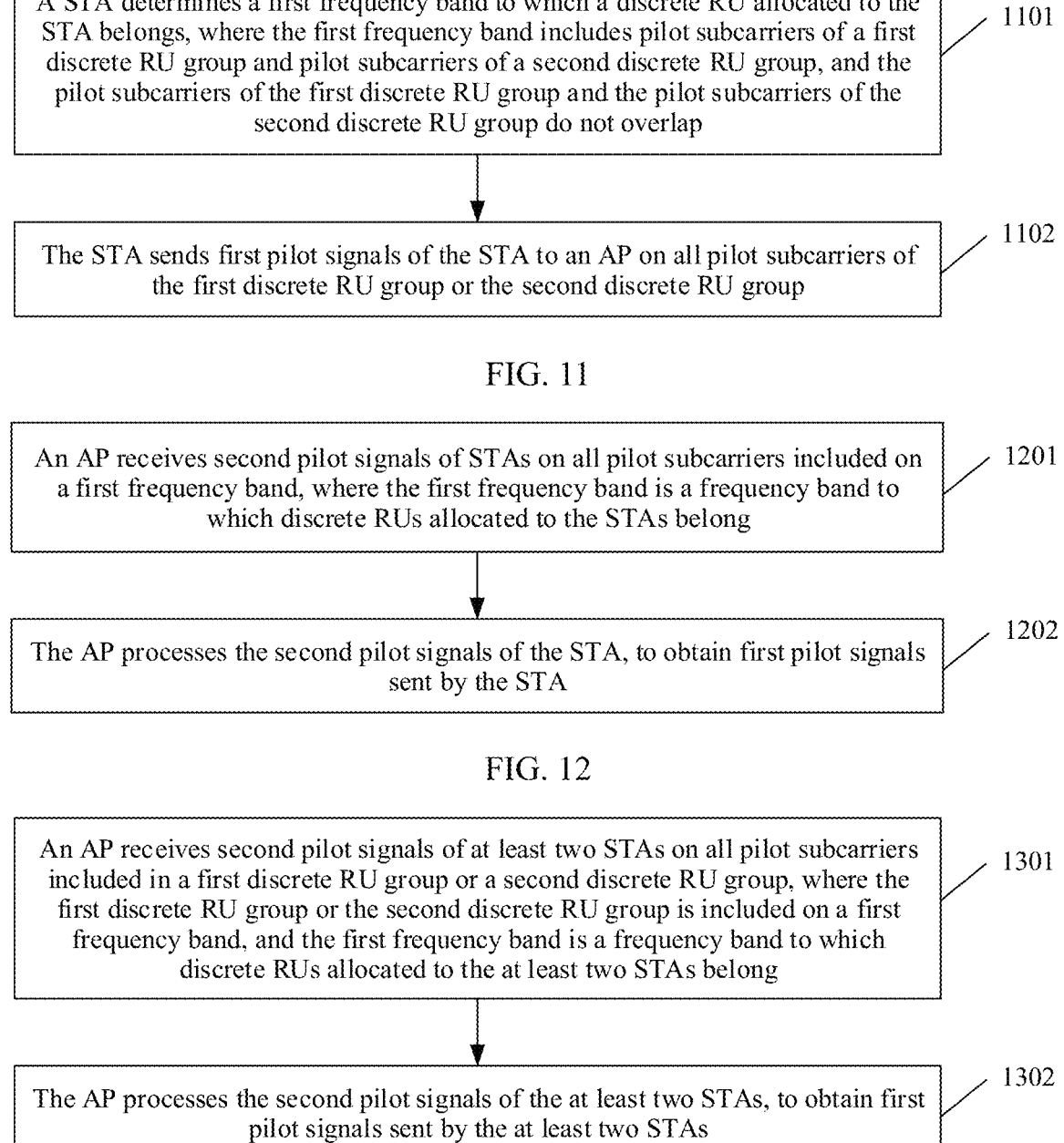

A STA determines a first frequency band to which a discrete RU allocated to the STA belongs, where the first frequency band includes pilot subcarriers of a first discrete RU group and pilot subcarriers of a second discrete RU group, and the pilot subcarriers of the first discrete RU group and the pilot subcarriers of the second discrete RU group do not overlap — 1101

The STA sends first pilot signals of the STA to an AP on all pilot subcarriers of the first discrete RU group or the second discrete RU group — 1102

FIG. 11

An AP receives second pilot signals of STAs on all pilot subcarriers included on a first frequency band, where the first frequency band is a frequency band to which discrete RUs allocated to the STAs belong — 1201

The AP processes the second pilot signals of the STA, to obtain first pilot signals sent by the STA — 1202

FIG. 12

An AP receives second pilot signals of at least two STAs on all pilot subcarriers included in a first discrete RU group or a second discrete RU group, where the first discrete RU group or the second discrete RU group is included on a first frequency band, and the first frequency band is a frequency band to which discrete RUs allocated to the at least two STAs belong — 1301

The AP processes the second pilot signals of the at least two STAs, to obtain first pilot signals sent by the at least two STAs — 1302

FIG. 13

Tone: subcarrier
RU: resource unit

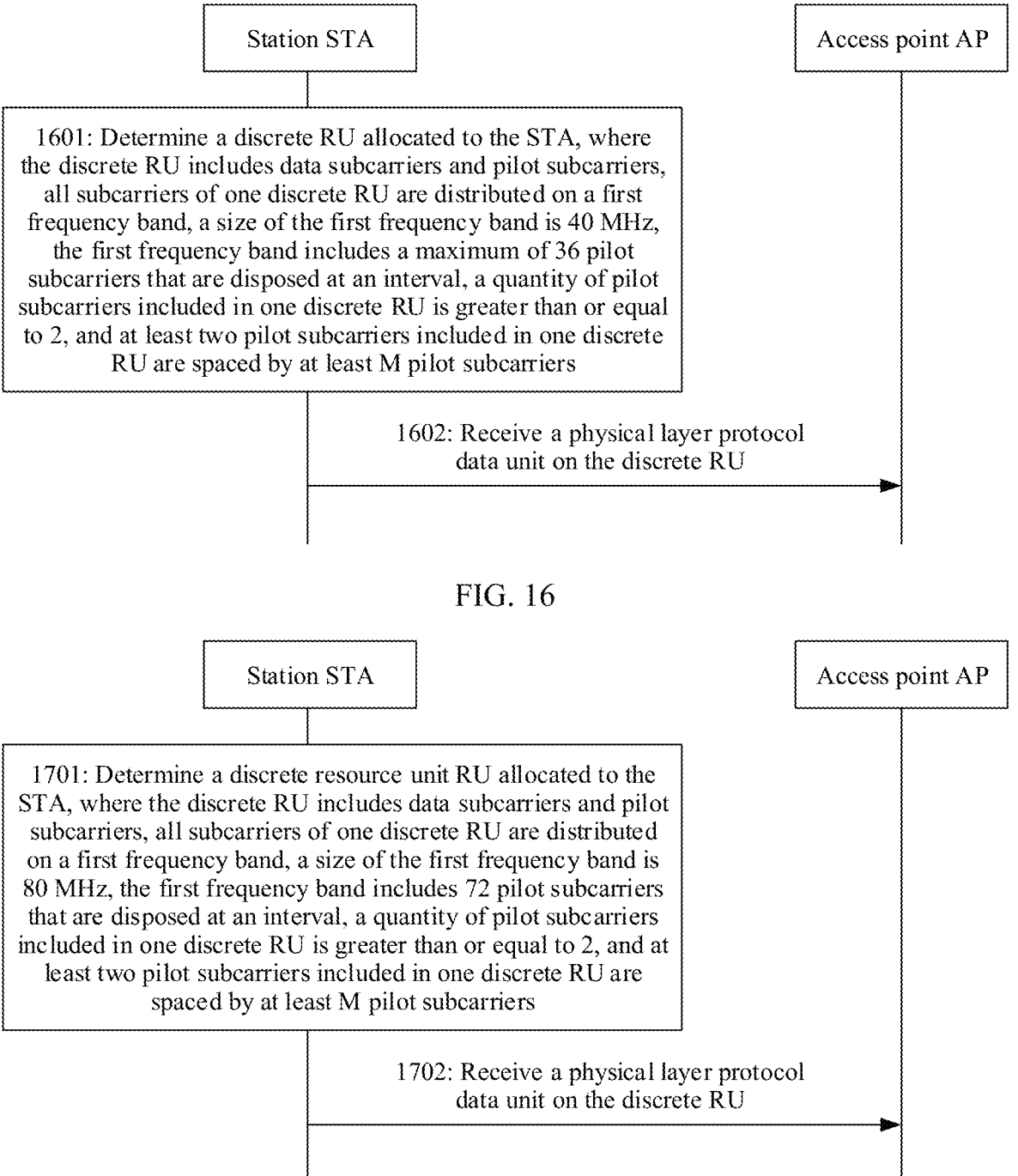

Station STA

Access point AP

1601: Determine a discrete RU allocated to the STA, where the discrete RU includes data subcarriers and pilot subcarriers, all subcarriers of one discrete RU are distributed on a first frequency band, a size of the first frequency band is 40 MHz, the first frequency band includes a maximum of 36 pilot subcarriers that are disposed at an interval, a quantity of pilot subcarriers included in one discrete RU is greater than or equal to 2, and at least two pilot subcarriers included in one discrete RU are spaced by at least M pilot subcarriers 1602: Receive a physical layer protocol data unit on the discrete RU

FIG. 16

Station STA

Access point AP

1701: Determine a discrete resource unit RU allocated to the STA, where the discrete RU includes data subcarriers and pilot subcarriers, all subcarriers of one discrete RU are distributed on a first frequency band, a size of the first frequency band is 80 MHz, the first frequency band includes 72 pilot subcarriers that are disposed at an interval, a quantity of pilot subcarriers included in one discrete RU is greater than or equal to 2, and at least two pilot subcarriers included in one discrete RU are spaced by at least M pilot subcarriers 1702: Receive a physical layer protocol data unit on the discrete RU

FIG. 17

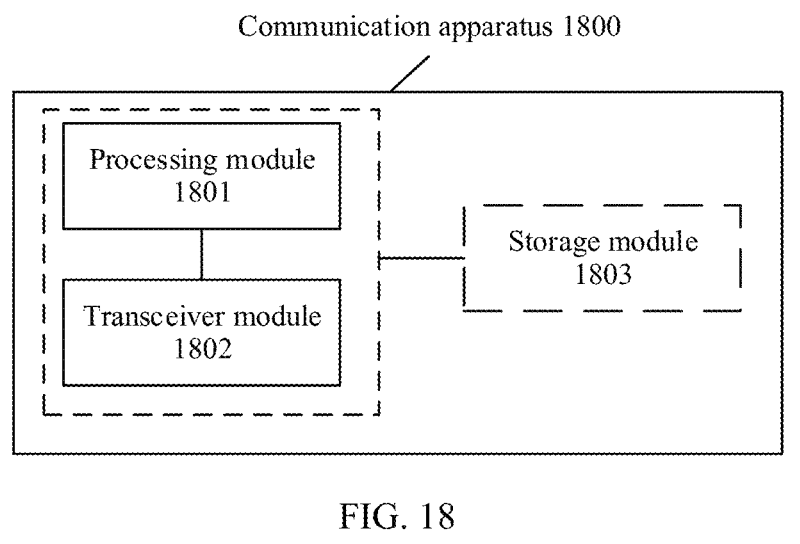

Communication apparatus 1800

Processing module
1801

Transceiver module
1802

Storage module
1803

FIG. 18

METHOD FOR SENDING DATA IN WIRELESS NETWORK, AND RELATED APPARATUS

CROSS-REFERENCE TO RELATED APPLICATIONS

This application is a continuation of International Application No. PCT/CN2022/102493, filed on Jun. 29, 2022, which claims priority to Chinese Patent Application No. 202110753768.6, filed on Jul. 2, 2021. The disclosures of the aforementioned applications are hereby incorporated by reference in their entireties.

TECHNICAL FIELD

This application relates to the field of communication technologies, and in particular, to a method for sending data in a wireless network, and a related apparatus.

BACKGROUND

A transmit power of a device is limited by both a maximum power and a maximum power spectral density. To be specific, the transmit power of the device cannot exceed the maximum power value, and cannot exceed the maximum power spectral density, either. To enable the transmit power of the device to be larger, a corresponding transmit bandwidth may be expanded, to be specific, subcarriers allocated to the device become more discrete in frequency domain, that is, a quantity of subcarriers per MHz is reduced. For example, FIG. 1 is a schematic diagram of mapping a virtual resource unit (virtual resource unit, VRU) to a physical resource unit (physical RU, PRU). In FIG. 1, the following two manners are used to implement that all subcarriers of a 26-tone VRU are distributed to a PRU on a frequency band with a bandwidth of 20 MHz. Manner 1: Two pilot subcarriers in FIG. 1 participate in mapping. Manner 2: Two pilot subcarriers in FIG. 1 do not participate in mapping. It may be understood that, in FIG. 1, a frequency band with a bandwidth of 2 MHz includes one 26-tone VRU, that is, a VRU on a frequency band with a bandwidth of about 2 MHz includes 26 subcarriers, and the 26 subcarriers include two pilot subcarriers. With reference to FIG. 1, it can be learned that, because the 26-tone VRU on the frequency band with a bandwidth of about 2 MHz is distributed to a 26-tone PRU on the frequency band with a bandwidth of 20 MHz, a quantity of subcarriers per MHz can be reduced in both the two manners. However, pilot subcarriers in the two manners are sparsely distributed on the frequency band with a bandwidth of 20 MHz, that is, the pilot subcarriers cannot evenly cover the entire frequency band. When a pilot signal is sent by using a pilot subcarrier included in the 26-tone PRU, problems such as narrowband interference and frequency selective fading may occur, and consequently, transmission of the pilot signal may be greatly affected. Therefore, how to avoid the problems such as narrowband interference and frequency selective fading and improve pilot signal transmission reliability becomes an urgent technical problem to be resolved in a current phase.

SUMMARY

This application provides a method for sending data in a wireless network, and a related apparatus, to avoid problems such as narrowband interference and frequency selective fading, and improve pilot signal transmission reliability.

According to a first aspect, a pilot signal transmission method is provided. The method includes:

A first device determines a first frequency band to which a discrete RU allocated to the first device belongs; and the first device sends first pilot signals of the first device to a second device on all pilot subcarriers included on the first frequency band.

It can be learned that, in the foregoing technical solution, a first frequency band that includes a discrete RU allocated to a STA is determined, so that the STA may send first pilot signals of the STA to an AP on all pilot subcarriers included on the first frequency band. In this way, the first pilot signals can be transmitted by using fixed and evenly distributed pilot subcarriers on the first frequency band, so that problems such as narrowband interference and frequency selective fading that are caused by sparse distribution of pilot subcarriers on a frequency band are avoided, and pilot signal transmission reliability is improved. In addition, a linear difference result is more accurate, so that a problem that a linear difference result is incorrect when pilot phases are not in a same period is avoided, and a linear difference implemented by using pilot subcarriers can accurately cover the entire frequency band.

According to a second aspect, a pilot signal transmission method is provided. The method includes:

A first device determines a first frequency band to which a discrete RU allocated to the first device belongs, where the first frequency band includes pilot subcarriers of a first discrete RU group and pilot subcarriers of a second discrete RU group, and the pilot subcarriers of the first discrete RU group and the pilot subcarriers of the second discrete RU group do not overlap; and the first device sends first pilot signals of the first device to a second device on all pilot subcarriers of the first discrete RU group or the second discrete RU group.

It can be learned that, in the foregoing technical solution, a first frequency band that includes a discrete RU allocated to a STA is determined, so that the STA may send first pilot signals of the STA to an AP on all pilot subcarriers of a first discrete RU group or a second discrete RU group included on the first frequency band. In this way, the first pilot signals can be transmitted by using fixed and evenly distributed pilot subcarriers on the first frequency band, so that problems such as narrowband interference and frequency selective fading that are caused by sparse distribution of pilot subcarriers on a frequency band are avoided, and pilot signal transmission reliability is improved. In addition, a linear difference result is more accurate, so that a problem that a linear difference result is incorrect when pilot phases are not in a same period is avoided, and a linear difference implemented by using pilot subcarriers can accurately cover the entire frequency band.

According to a third aspect, a communication apparatus is provided. The apparatus includes a processing module and a transceiver module.

The processing module is configured to determine a first frequency band to which a discrete RU allocated to the communication apparatus belongs; and the transceiver module is configured to send first pilot signals of the communication apparatus to a second device on all pilot subcarriers included on the first frequency band.

According to a fourth aspect, a communication apparatus is provided. The apparatus includes a processing module and a transceiver module.

The processing module is configured to determine a first frequency band to which a discrete RU allocated to the communication apparatus belongs, where the first frequency band includes pilot subcarriers of a first discrete RU group and pilot subcarriers of a second discrete RU group, and the pilot subcarriers of the first discrete RU group and the pilot subcarriers of the second discrete RU group do not overlap; and the transceiver module is configured to send first pilot signals of the communication apparatus to a second device on all pilot subcarriers of the first discrete RU group or the second discrete RU group.

Optionally, with reference to the first aspect, the second aspect, the third aspect, or the fourth aspect, the first pilot signals of the first device are related to a preset matrix W and a column vector $$s_k^t.$$

W represents an invertible matrix with Nu rows and Nu columns. W satisfies the following formula: $W=[w_1, w_2, \ldots, w_{Nu}]$. $w_x$ represents a column vector, x is an integer greater than or equal to 1 and less than or equal to Nu, and Nu is an integer greater than 0. W is used to control pilot signals transmitted by Nu devices in Nu time units. A column index of W is a time unit index, and a row index of W is a device index. The Nu devices include the first device.

$$s_k^t$$

represents pilot signals corresponding to the first device on all pilot subcarriers included on the first frequency band in a $t^{th}$ time unit. A column quantity of $$s_k^t$$

is a quantity of all the pilot subcarriers included on the first frequency band. An $n^{th}$ element in $$s_k^t$$

represents a pilot signal corresponding to the first device on an $n^{th}$ pilot subcarrier included on the first frequency band. n is an integer greater than 0 and less than or equal to the column quantity of $$s_k^t.$$

k is an integer greater than or equal to 1 and less than or equal to Nu. t is an integer greater than or equal to 0, and t represents a time unit index.

It can be learned that, in the foregoing technical solution, the first pilot signals of the first device are related to the preset matrix W and the column vector $$s_k^t,$$

so that a receive end can separate a pilot signal of a single device.

Optionally, with reference to the first aspect, the second aspect, the third aspect, or the fourth aspect, first pilot signals $q_t$ of the Nu devices satisfy the following formula:

$$q_t = [\, s_1^t \quad s_2^t \quad s_3^t \quad \ldots \quad s_{Nu}^t \,] w_{tt} \cdot tt = \mathrm{mod}(t, Nu) + 1.$$

$w_{tt}$ represents a $tt^{th}$ column vector in W. $q_t$ represents a column vector. A column quantity of $q_t$ is the quantity of all the pilot subcarriers included on the first frequency band. tt is an integer greater than or equal to 1 and less than or equal to Nu. The first pilot signals of the Nu devices are sent on all the pilot subcarriers included on the first frequency band.

It can be learned that, in the foregoing technical solution, the first pilot signals of the Nu devices $q_t$ satisfy the following formula:

$$q_t = [\, s_1^t \quad s_2^t \quad s_3^t \quad \ldots \quad s_{Nu}^t \,] w_{tt},$$

so that a receive end can separate a pilot signal of a single device.

Optionally, the first pilot signals of the first device are $$s_k^t W_{k,tt},$$

where $W_{k,tt}$ represents an element in row k and column tt in W, $tt=\mathrm{mod}(t, Nu)+1$, and tt is an integer greater than or equal to 1 and less than or equal to Nu.

Optionally, with reference to the first aspect, the second aspect, the third aspect, or the fourth aspect, W represents an orthogonal matrix;

W represents a 2*n-order Hadamard matrix $H_{2n}$, and $H_{2n}$ satisfies the following formula:

$$H_{2n} = \begin{bmatrix} H_n & H_n \\ -H_n & H_n \end{bmatrix},$$

where $H_n$ represents an n-order Hadamard matrix, and n is an integer greater than or equal to 1;

W represents a 2*n-order P matrix $P_{2n \times 2n}$, and $P_{2n \times 2n}$ satisfies the following formula:

$$P_{2n \times 2n} = \begin{bmatrix} P_{n \times n} & P_{n \times n} \\ P_{n \times n} & -P_{n \times n} \end{bmatrix},$$

where $P_{n \times n}$ represents an n-order P matrix; or

W represents a diagonal matrix, and the diagonal matrix is an identity matrix.

Optionally, with reference to the first aspect, the second aspect, the third aspect, or the fourth aspect, if n is 1, $$H_{2n} = \begin{bmatrix} 1 & 1 \\ -1 & 1 \end{bmatrix};$$

if n is 2, $$H_{2n} = \begin{bmatrix} H_2 & H_2 \\ -H_2 & H_2 \end{bmatrix} = \begin{bmatrix} 1 & 1 & 1 & 1 \\ -1 & 1 & -1 & 1 \\ -1 & -1 & 1 & 1 \\ 1 & -1 & -1 & 1 \end{bmatrix};$$

if n is 1, $$P_{2n \times 2n} = \begin{bmatrix} 1 & -1 \\ 1 & 1 \end{bmatrix};$$

if n is 2, or $$P_{2n \times 2n} = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

if n is 4, $$P_{2n \times 2n} = \begin{bmatrix} P_{4 \times 4} & P_{4 \times 4} \\ P_{4 \times 4} & -P_{4 \times 4} \end{bmatrix}.$$

Optionally, with reference to the first aspect, the second aspect, the third aspect, or the fourth aspect, a part of elements $$s_k^t$$

are set to zero.

Optionally, with reference to the first aspect, the second aspect, the third aspect, or the fourth aspect, the first pilot signals of the first device occupy different pilot subcarriers in different time units in the Nu time units, and a total quantity of pilot subcarriers occupied by the first pilot signals of the first device in the Nu time units is a total quantity of pilot subcarriers included on the first frequency band.

According to a fifth aspect, a pilot signal demodulation method is provided. The method includes:

A second device receives second pilot signals of at least two first devices on all pilot subcarriers included on a first frequency band, where the first frequency band is a frequency band to which discrete resource units RUs allocated to the at least two first devices belong; and the second device processes the second pilot signals of the at least two first devices, to obtain first pilot signals sent by the at least two first devices.

It can be learned that, in the foregoing technical solution, an AP may receive second pilot signals of at least two STAs on all pilot subcarriers included on a first frequency band, so that the AP may process the second pilot signals of the at least two STAs. In this way, a first pilot signal sent by each STA can be obtained, so that separation of a pilot signal of a single STA is implemented.

According to a sixth aspect, a pilot signal demodulation method is provided. The method includes:

A second device receives second pilot signals of at least two first devices on all pilot subcarriers included in a first discrete RU group or a second discrete RU group, where the first discrete RU group or the second discrete RU group is included on a first frequency band, and the first frequency band is a frequency band to which discrete RUs allocated to the at least two first devices belong; and the second device processes the second pilot signals of the at least two first devices, to obtain first pilot signals sent by the at least two first devices.

It can be learned that, in the foregoing technical solution, an AP may receive second pilot signals of at least two STAs on all pilot subcarriers included in a first discrete RU group or a second discrete RU group, so that the AP may process the second pilot signals of the at least two STAs. In this way, a first pilot signal sent by each STA can be obtained, so that separation of a pilot signal of a single STA is implemented.

According to a seventh aspect, a communication apparatus is provided. The apparatus includes a transceiver module and a processing module.

The transceiver module is configured to receive second pilot signals of at least two first devices on all pilot subcarriers included on a first frequency band, where the first frequency band is a frequency band to which discrete resource units RUs allocated to the at least two first devices belong; and the processing module is configured to process the second pilot signals of the at least two first devices, to obtain first pilot signals sent by the at least two first devices.

According to an eighth aspect, a communication apparatus is provided. The apparatus includes a transceiver module and a processing module.

The transceiver module is configured to receive second pilot signals of at least two first devices on all pilot subcarriers included in a first discrete RU group or a second discrete RU group, where the first discrete RU group or the second discrete RU group is included on a first frequency band, and the first frequency band is a frequency band to which discrete RUs allocated to the at least two first devices belong; and the processing module is configured to process the second pilot signals of the at least two first devices, to obtain first pilot signals sent by the at least two first devices.

Optionally, with reference to the fifth aspect, the sixth aspect, the seventh aspect, or the eighth aspect, second pilot signals X of the at least two first devices satisfy the following formula:

$$X = G[s_1 s_2 s_3 \ldots s_{Nu}]W, \text{ or } X = G[s_1 s_2 s_3 \ldots s_{Nu}]W + Z$$

G represents a channel parameter. Z represents noise. W satisfies the following formula: $W = [w_1, w_2, \ldots, w_{Nu}]$. $w_x$ represents a column vector, x is an integer greater than or equal to 1 and less than or equal to Nu, and Nu is an integer greater than 1. W is used to control pilot signals transmitted by the at least two first devices in Nu time units. A column index of W is a time unit index, and a row index of W is a device index.

A column quantity of $s_k$ is a quantity of all the pilot subcarriers included on the first frequency band. An $n^{th}$ element in $s_k$ represents a pilot signal corresponding to a $k^{th}$ first device in the at least two first devices on an $n^{th}$ pilot subcarrier included on the first frequency band. n is an integer greater than 0 and less than or equal to the column quantity of $s_k$. k is an integer greater than or equal to 1 and less than or equal to Nu. t is an integer greater than or equal to 0, and t represents a time unit index.

It can be learned that, in the foregoing technical solution, the second pilot signals X of the at least two first devices satisfy the following formula: $X = G[s_1 s_2 s_3 \ldots s_{Nu}]W$, or $X = G[s_1 \ s_2 \ s_3 \ \ldots \ s_{Nu}]W + Z$, so that the second device can separate a pilot signal of a single first device.

Optionally, with reference to the fifth aspect, the sixth aspect, the seventh aspect, or the eighth aspect, the first pilot signals sent by the at least two first devices are $[s_1 \ s_2 \ s_3 \ \ldots \ s_{Nu}]W$.

It can be learned that, in the foregoing technical solution, the first pilot signals sent by the at least two first devices are $[s_1 \ s_2 \ s_3 \ \ldots \ s_{Nu}]W$, so that the second device can separate a pilot signal of a single device.

Optionally, with reference to the fifth aspect, the sixth aspect, the seventh aspect, or the eighth aspect, W represents an orthogonal matrix;

W represents a 2*n-order Hadamard matrix $H_{2n}$, and $H_{2n}$ satisfies the following formula:

$$H_{2n} = \begin{bmatrix} H_n & H_n \\ -H_n & H_n \end{bmatrix},$$

where $H_n$ represents an n-order Hadamard matrix, and n is an integer greater than or equal to 1;

W represents a 2*n-order P matrix $P_{2n \times 2n}$, and $P_{2n \times 2n}$ satisfies the following formula:

$$P_{2n \times 2n} = \begin{bmatrix} P_{n \times n} & P_{n \times n} \\ P_{n \times n} & -P_{n \times n} \end{bmatrix},$$

where $P_{n \times n}$ represents an n-order P matrix; or

W represents a diagonal matrix, and the diagonal matrix is an identity matrix.

Optionally, with reference to the fifth aspect, the sixth aspect, the seventh aspect, or the eighth aspect, if n is 1, $$H_{2n} = \begin{bmatrix} 1 & 1 \\ -1 & 1 \end{bmatrix};$$

if n is 2, $$H_{2n} = \begin{bmatrix} H_2 & H_2 \\ -H_2 & H_2 \end{bmatrix} = \begin{bmatrix} 1 & 1 & 1 & 1 \\ -1 & 1 & -1 & 1 \\ -1 & -1 & 1 & 1 \\ 1 & -1 & -1 & 1 \end{bmatrix};$$

if n is 1, $$P_{2n \times 2n} = \begin{bmatrix} 1 & -1 \\ 1 & 1 \end{bmatrix};$$

if n is 2, or $$P_{2n \times 2n} = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

if n is 4, $$P_{2n \times 2n} = \begin{bmatrix} P_{4 \times 4} & P_{4 \times 4} \\ P_{4 \times 4} & -P_{4 \times 4} \end{bmatrix}.$$

Optionally, with reference to the fifth aspect, the sixth aspect, the seventh aspect, or the eighth aspect, a part of elements of a part of column vectors in $[s_1 \ s_2 \ s_3 \ \ldots \ s_{Nu}]$ are set to zero.

Optionally, with reference to the fifth aspect, the sixth aspect, the seventh aspect, or the eighth aspect, first pilot signals of one of the at least two first devices occupy different pilot subcarriers in different time units in the Nu time units, and a total quantity of pilot subcarriers occupied by the first pilot signals of the one first device in the Nu time units is a total quantity of pilot subcarriers included on the first frequency band.

According to a ninth aspect, a method for sending data in a wireless network is provided. The method includes:

A first device determines a discrete resource unit RU allocated to the first device, where the discrete RU includes data subcarriers and pilot subcarriers, all subcarriers of one discrete RU are distributed on a first frequency band, a size of the first frequency band is 20 MHz, and the first frequency band includes a maximum of 18 pilot subcarriers that are disposed at an interval, where a quantity of pilot subcarriers included in one discrete RU is greater than or equal to 2, and at least two pilot subcarriers included in one discrete RU are spaced by at least M pilot subcarriers; and the first device sends a physical layer protocol data unit PPDU on the discrete RU.

It can be learned that, in the foregoing technical solution, all subcarriers of a discrete RU allocated to a STA are distributed on a frequency band of 20 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, sending the PPDU on the discrete RU is also implemented.

According to a tenth aspect, a method for sending data in a wireless network is provided. The method includes:

A second device receives a physical layer protocol data unit PPDU on a discrete RU allocated to a first device, where the discrete RU includes data subcarriers and pilot subcarriers, all subcarriers of one discrete RU are distributed on a first frequency band, a size of the first frequency band is 20 MHz, and the first frequency band includes a maximum of 18 pilot subcarriers that are disposed at an interval; and a quantity of pilot subcarriers included in one discrete RU is greater than or equal to 2, and at least two pilot subcarriers included in one discrete RU are spaced by at least M pilot subcarriers.

It can be learned that, in the foregoing technical solution, all subcarriers of a discrete RU allocated to a STA are distributed on a frequency band of 20 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, receiving the PPDU on the discrete RU is also implemented.

According to an eleventh aspect, a communication apparatus is provided. The apparatus includes a processing module and a transceiver module.

The processing module is configured to determine a discrete resource unit RU allocated to the communication apparatus, where the discrete RU includes data subcarriers and pilot subcarriers, all subcarriers of one discrete RU are distributed on a first frequency band, a size of the first frequency band is 20 MHz, and the first frequency band includes a maximum of 18 pilot subcarriers that are disposed at an interval, where a quantity of pilot subcarriers included in one discrete RU is greater than or equal to 2, and at least two pilot subcarriers included in one discrete RU are spaced by at least M pilot subcarriers; and the transceiver module is configured to send a physical layer protocol data unit PPDU on the discrete RU.

According to a twelfth aspect, a communication apparatus is provided. The apparatus includes a transceiver module.

The transceiver module is configured to receive a physical layer protocol data unit PPDU on a discrete RU allocated to a first device, where the discrete RU includes data subcarriers and pilot subcarriers, all subcarriers of one discrete RU are distributed on a first frequency band, a size of the first frequency band is 20 MHz, and the first frequency band includes a maximum of 18 pilot subcarriers that are disposed at an interval; and a quantity of pilot subcarriers included in one discrete RU is greater than or equal to 2, and at least two pilot subcarriers included in one discrete RU are spaced by at least M pilot subcarriers.

Optionally, with reference to the ninth aspect, the tenth aspect, the eleventh aspect, or the twelfth aspect, the maximum of 18 pilot subcarriers that are disposed at an interval on the first frequency band are the same as pilot subcarriers in a continuous RU mode.

Optionally, with reference to the ninth aspect, the tenth aspect, the eleventh aspect, or the twelfth aspect, one discrete RU corresponds to one continuous RU, one continuous RU includes at least two pilot subcarriers, and there is an intersection set between indexes of pilot subcarriers in the discrete RU and indexes of pilot subcarriers in the continuous RU.

Optionally, with reference to the ninth aspect, the tenth aspect, the eleventh aspect, or the twelfth aspect, the discrete RU is a discrete 26-tone RU, the discrete 26-tone RU includes 24 data subcarriers and two pilot subcarriers, and the two pilot subcarriers are spaced by at least nine pilot subcarriers.

Optionally, with reference to the ninth aspect, the tenth aspect, the eleventh aspect, or the twelfth aspect, the discrete RU is a discrete 52-tone RU, the discrete 52-tone RU includes two discrete 26-tone RUs, and pilot subcarriers of the discrete 52-tone RU include a part or all of pilot subcarriers in the two discrete 26-tone RUs.

Optionally, with reference to the ninth aspect, the tenth aspect, or the twelfth aspect, the discrete RU is a discrete 52-tone RU, the discrete 52-tone RU includes at least 48 data subcarriers, a quantity of pilot subcarriers included in the discrete 52-tone RU is greater than or equal to 2 and is less than or equal to 4, and at least two pilot subcarriers in the maximum of four pilot subcarriers are spaced by at least nine pilot subcarriers.

Optionally, with reference to the ninth aspect, the tenth aspect, the eleventh aspect, or the twelfth aspect, the discrete RU is a discrete 106-tone RU, the discrete 106-tone RU includes two discrete 52-tone RUs, and pilot subcarriers of the discrete 106-tone RU include a part or all of pilot subcarriers in the two discrete 52-tone RUs.

Optionally, with reference to the ninth aspect, the tenth aspect, the eleventh aspect, or the twelfth aspect, the discrete RU is a discrete 106-tone RU, a quantity of data subcarriers included in the discrete 106-tone RU is greater than or equal to 98, a quantity of pilot subcarriers included in the discrete 106-tone RU is greater than or equal to 2 and is less than or equal to 8, and at least two pilot subcarriers in the maximum of eight pilot subcarriers are spaced by at least nine pilot subcarriers.

According to a thirteenth aspect, a method for sending data in a wireless network is provided. The method includes:

A first device determines a discrete resource unit RU allocated to the first device, where the discrete RU includes data subcarriers and pilot subcarriers, all subcarriers of one discrete RU are distributed on a first frequency band, a size of the first frequency band is 40 MHz, and the first frequency band includes a maximum of 36 pilot subcarriers that are disposed at an interval, where a quantity of pilot subcarriers included in one discrete RU is greater than or equal to 2, and at least two pilot subcarriers included in one discrete RU are spaced by at least M pilot subcarriers; and the first device sends a physical layer protocol data unit PPDU on the discrete RU.

It can be learned that, in the foregoing technical solution, all subcarriers of a discrete RU allocated to a STA are distributed on a frequency band of 40 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, sending the PPDU on the discrete RU is also implemented.

According to a fourteenth aspect, a method for sending data in a wireless network is provided. The method includes:

A second device receives a physical layer protocol data unit PPDU on a discrete RU allocated to a first device, where the discrete RU includes data subcarriers and pilot subcarriers, all subcarriers of one discrete RU are distributed on a first frequency band, a size of the first frequency band is 40 MHz, and the first frequency band includes a maximum of 36 pilot subcarriers that are disposed at an interval; and a quantity of pilot subcarriers included in one discrete RU is greater than or equal to 2, and at least two pilot subcarriers included in one discrete RU are spaced by at least M pilot subcarriers.

It can be learned that, in the foregoing technical solution, all subcarriers of a discrete RU allocated to a STA are distributed on a frequency band of 40 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, receiving the PPDU on the discrete RU is also implemented.

According to a fifteenth aspect, a communication apparatus is provided. The apparatus includes a transceiver module.

The transceiver module is configured to determine a discrete resource unit RU allocated to the communication apparatus, where the discrete RU includes data subcarriers and pilot subcarriers, all subcarriers of one discrete RU are distributed on a first frequency band, a size of the first frequency band is 40 MHz, and the first frequency band includes a maximum of 36 pilot subcarriers that are disposed at an interval, where a quantity of pilot subcarriers included in one discrete RU is greater than or equal to 2, and at least two pilot subcarriers included in one discrete RU are spaced by at least M pilot subcarriers; and the first device sends a physical layer protocol data unit PPDU on the discrete RU.

According to a sixteenth aspect, a communication apparatus is provided. The apparatus includes a transceiver module.

The transceiver module is configured to receive a physical layer protocol data unit PPDU on a discrete RU allocated to a first device, where the discrete RU includes data subcarriers and pilot subcarriers, all subcarriers of one discrete RU are distributed on a first frequency band, a size of the first frequency band is 40 MHz, and the first frequency band includes a maximum of 36 pilot subcarriers that are disposed at an interval; and a quantity of pilot subcarriers included in one discrete RU is greater than or equal to 2, and at least two pilot subcarriers included in one discrete RU are spaced by at least M pilot subcarriers.

Optionally, with reference to the thirteenth aspect, the fourteenth aspect, the fifteenth aspect, or the sixteenth aspect, the discrete RU is a discrete 26-tone RU, the discrete 26-tone RU includes 24 data subcarriers and two pilot subcarriers, and the two pilot subcarriers are spaced by at least 18 pilot subcarriers.

Optionally, with reference to the thirteenth aspect, the fourteenth aspect, the fifteenth aspect, or the sixteenth aspect, the discrete RU is a discrete 52-tone RU, the discrete 52-tone RU includes two discrete 26-tone RUs, and pilot subcarriers of the discrete 52-tone RU include a part or all of pilot subcarriers in the two discrete 26-tone RUs.

Optionally, with reference to the thirteenth aspect, the fourteenth aspect, the fifteenth aspect, or the sixteenth aspect, the discrete RU is a discrete 52-tone RU, the discrete 52-tone RU includes at least 48 data subcarriers, a quantity of pilot subcarriers included in the discrete 52-tone RU is greater than or equal to 2 and is less than or equal to 4, and at least two pilot subcarriers in the maximum of four pilot subcarriers are spaced by at least 18 pilot subcarriers.

Optionally, with reference to the thirteenth aspect, the fourteenth aspect, the fifteenth aspect, or the sixteenth aspect, the discrete RU is a discrete 106-tone RU, the discrete 106-tone RU includes two discrete 52-tone RUs, and pilot subcarriers of the discrete 106-tone RU include a part or all of pilot subcarriers in the two discrete 52-tone RUs.

Optionally, with reference to the thirteenth aspect, the fourteenth aspect, the fifteenth aspect, or the sixteenth aspect, the discrete RU is a discrete 106-tone RU, a quantity of data subcarriers included in the discrete 106-tone RU is greater than or equal to 98, a quantity of pilot subcarriers included in the discrete 106-tone RU is greater than or equal to 2 and is less than or equal to 8, and at least two pilot subcarriers in the maximum of eight pilot subcarriers are spaced by at least 18 pilot subcarriers.

Optionally, with reference to the thirteenth aspect, the fourteenth aspect, the fifteenth aspect, or the sixteenth aspect, the discrete RU is a discrete 242-tone RU, the discrete 242-tone RU includes two discrete 106-tone RUs, and pilot subcarriers of the discrete 242-tone RU include a part or all of pilot subcarriers in the two discrete 106-tone RUs.

Optionally, with reference to the thirteenth aspect, the fourteenth aspect, the fifteenth aspect, or the sixteenth aspect, the discrete RU is a discrete 242-tone RU, a quantity of data subcarriers included in the discrete 242-tone RU is greater than or equal to 224, a quantity of pilot subcarriers included in the discrete 242-tone RU is greater than or equal to 2 and is less than or equal to 18, and at least two pilot subcarriers in the maximum of 18 pilot subcarriers are spaced by at least 18 pilot subcarriers.

According to a seventeenth aspect, a method for sending data in a wireless network is provided. The method includes:

A first device determines a discrete resource unit RU allocated to the first device, where the discrete RU includes data subcarriers and pilot subcarriers, all subcarriers of one discrete RU are distributed on a first frequency band, a size of the first frequency band is 80 MHz, and the first frequency band includes 72 pilot subcarriers that are disposed at an interval, where a quantity of pilot subcarriers included in one discrete RU is greater than or equal to 2, and at least two pilot subcarriers included in one discrete RU are spaced by at least M pilot subcarriers; and the first device sends a physical layer protocol data unit PPDU on the discrete RU.

It can be learned that, in the foregoing technical solution, all subcarriers of a discrete RU allocated to a STA are distributed on a frequency band of 80 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, sending the PPDU on the discrete RU is also implemented.

According to an eighteenth aspect, a method for sending data in a wireless network is provided. The method includes:

A second device receives a physical layer protocol data unit PPDU on a discrete RU allocated to a first device, where the discrete RU includes data subcarriers and pilot subcarriers, all subcarriers of one discrete RU are distributed on a first frequency band, a size of the first frequency band is 80 MHz, and the first frequency band includes 72 pilot subcarriers that are disposed at an interval; and a quantity of pilot subcarriers included in one discrete RU is greater than or equal to 2, and at least two pilot subcarriers included in one discrete RU are spaced by at least M pilot subcarriers.

It can be learned that, in the foregoing technical solution, all subcarriers of a discrete RU allocated to a STA are distributed on a frequency band of 80 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, receiving the PPDU on the discrete RU is also implemented.

According to a nineteenth aspect, a communication apparatus is provided. The apparatus includes a processing module and a transceiver module.

The processing module is configured to determine a discrete resource unit RU allocated to the communication apparatus, where the discrete RU includes data subcarriers and pilot subcarriers, all subcarriers of one discrete RU are distributed on a first frequency band, a size of the first frequency band is 80 MHz, and the first frequency band includes 72 pilot subcarriers that are disposed at an interval, where a quantity of pilot subcarriers included in one discrete RU is greater than or equal to 2, and at least two pilot subcarriers included in one discrete RU are spaced by at least M pilot subcarriers; and the transceiver module is configured to send a physical layer protocol data unit PPDU on the discrete RU.

According to a twentieth aspect, a communication apparatus is provided. The apparatus includes a transceiver module.

The transceiver module is configured to receive a physical layer protocol data unit PPDU on a discrete RU allocated to a first device, where the discrete RU includes data subcarriers and pilot subcarriers, all subcarriers of one discrete RU are distributed on a first frequency band, a size of the first frequency band is 80 MHz, and the first frequency band includes 72 pilot subcarriers that are disposed at an interval; and a quantity of pilot subcarriers included in one discrete RU is greater than or equal to 2, and at least two pilot subcarriers included in one discrete RU are spaced by at least M pilot subcarriers.

Optionally, with reference to the seventeenth aspect, the eighteenth aspect, the nineteenth aspect, or the twentieth aspect, the discrete RU is a discrete 26-tone RU, the discrete 26-tone RU includes 24 data subcarriers and two pilot subcarriers, and the two pilot subcarriers are spaced by at least 36 pilot subcarriers.

Optionally, with reference to the seventeenth aspect, the eighteenth aspect, the nineteenth aspect, or the twentieth aspect, the discrete RU is a discrete 52-tone RU, the discrete 52-tone RU includes two discrete 26-tone RUs, and pilot subcarriers of the discrete 52-tone RU include a part or all of pilot subcarriers in the two discrete 26-tone RUs.

Optionally, with reference to the seventeenth aspect, the eighteenth aspect, the nineteenth aspect, or the twentieth aspect, the discrete RU is a discrete 52-tone RU, the discrete 52-tone RU includes at least 48 data subcarriers, a quantity of pilot subcarriers included in the discrete 52-tone RU is greater than or equal to 2 and is less than or equal to 4, and at least two pilot subcarriers in the maximum of four pilot subcarriers are spaced by at least 36 pilot subcarriers.

Optionally, with reference to the seventeenth aspect, the eighteenth aspect, the nineteenth aspect, or the twentieth aspect, the discrete RU is a discrete 106-tone RU, the discrete 106-tone RU includes two discrete 52-tone RUs, and pilot subcarriers of the discrete 106-tone RU include a part or all of pilot subcarriers in the two discrete 52-tone RUs.

Optionally, with reference to the seventeenth aspect, the eighteenth aspect, the nineteenth aspect, or the twentieth aspect, the discrete RU is a discrete 106-tone RU, a quantity of data subcarriers included in the discrete 106-tone RU is greater than or equal to 98, a quantity of pilot subcarriers included in the discrete 106-tone RU is greater than or equal to 2 and is less than or equal to 8, and at least two pilot subcarriers in the maximum of eight pilot subcarriers are spaced by at least 36 pilot subcarriers.

Optionally, with reference to the seventeenth aspect, the eighteenth aspect, the nineteenth aspect, or the twentieth aspect, the discrete RU is a discrete 242-tone RU, the discrete 242-tone RU includes two discrete 106-tone RUs, and pilot subcarriers of the discrete 242-tone RU include a part or all of pilot subcarriers in the two discrete 106-tone RUs.

Optionally, with reference to the seventeenth aspect, the eighteenth aspect, the nineteenth aspect, or the twentieth aspect, the discrete RU is a discrete 242-tone RU, a quantity of data subcarriers included in the discrete 242-tone RU is greater than or equal to 224, a quantity of pilot subcarriers included in the discrete 242-tone RU is greater than or equal to 2 and is less than or equal to 18, and at least two pilot subcarriers in the maximum of 18 pilot subcarriers are spaced by at least 36 pilot subcarriers.

Optionally, with reference to the seventeenth aspect, the eighteenth aspect, the nineteenth aspect, or the twentieth aspect, the discrete RU is a discrete 484-tone RU, the discrete 484-tone RU includes two discrete 242-tone RUs, and pilot subcarriers of the discrete 484-tone RU include a part or all of pilot subcarriers in the two discrete 242-tone RUs.

Optionally, with reference to the seventeenth aspect, the eighteenth aspect, the nineteenth aspect, or the twentieth aspect, the discrete RU is a discrete 484-tone RU, a quantity of data subcarriers included in the discrete 484-tone RU is greater than or equal to 448, a quantity of pilot subcarriers included in the discrete 484-tone RU is greater than or equal to 2 and is less than or equal to 36, and at least two pilot subcarriers in the maximum of 36 pilot subcarriers are spaced by at least 36 pilot subcarriers.

According to a twenty-first aspect, a chip is provided. The chip includes at least one processor and an interface. The processor is configured to read and execute instructions stored in a memory. When the instructions are run, the chip is enabled to perform the method according to any one of the first aspect, the second aspect, the fifth aspect, the sixth aspect, the ninth aspect, the tenth aspect, the thirteenth aspect, the fourteenth aspect, the seventeenth aspect, or the eighteenth aspect.

According to a twenty-second aspect, a computer-readable storage medium is provided. The computer-readable storage medium stores a computer program. The computer program includes program instructions. When the program instructions are executed by a computer, the computer is enabled to perform the method according to any one of the first aspect, the second aspect, the fifth aspect, the sixth aspect, the ninth aspect, the tenth aspect, the thirteenth aspect, the fourteenth aspect, the seventeenth aspect, or the eighteenth aspect.

According to a twenty-third aspect, a communication apparatus is provided. The communication apparatus includes a processor, a memory, an input interface, and an output interface. The input interface is configured to receive information from a communication apparatus other than the communication apparatus. The output interface is configured to output information to a communication apparatus other than the communication apparatus. The processor invokes a computer program stored in the memory, to implement the method according to the first aspect, the second aspect, the fifth aspect, the sixth aspect, the ninth aspect, the tenth aspect, the thirteenth aspect, the fourteenth aspect, the seventeenth aspect, or the eighteenth aspect.

According to a twenty-fourth aspect, a communication system is provided. The communication system includes the foregoing first device and/or the foregoing second device.

BRIEF DESCRIPTION OF DRAWINGS

The following briefly describes accompanying drawings for describing embodiments.

FIG. 1 is a schematic diagram of mapping a virtual resource unit (virtual resource unit, VRU) to a physical resource unit (physical RU, PRU);

FIG. 11 is a schematic flowchart of another pilot signal transmission method according to an embodiment of this application;

FIG. 12 is a schematic flowchart of a pilot signal demodulation method according to an embodiment of this application;

FIG. 13 is a schematic flowchart of another pilot signal demodulation method according to an embodiment of this application;

FIG. 16 is a schematic flowchart of another method for sending data in a wireless network according to an embodiment of this application;

FIG. 17 is a schematic flowchart of another method for sending data in a wireless network according to an embodiment of this application; and FIG. 18 is a schematic diagram of a structure of a communication apparatus according to an embodiment of this application.

DESCRIPTION OF EMBODIMENTS

Figure 2:
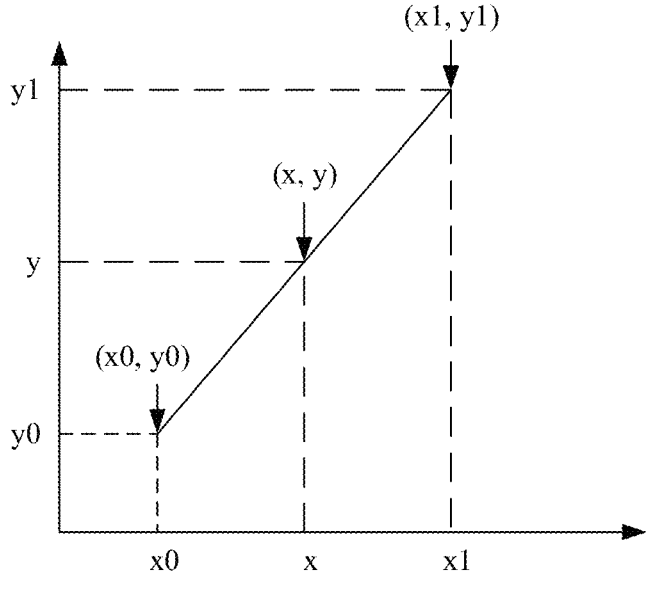
FIG. 2 is a schematic diagram of a linear difference.

The following describes the technical solutions in embodiments of this application with reference to the accompanying drawings in embodiments of this application. The terms "system" and "network" may be used interchangeably in embodiments of this application. "I" represents an "or" relationship between associated objects unless otherwise specified. For example, AB may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural. In addition, in descriptions of this application, "a plurality of" means two or more than two unless otherwise specified. At least one of the following items (pieces) or a similar expression thereof refers to any combination of these items, including a singular item (piece) or any combination of plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, words such as first and second are used in embodiments of this application to distinguish between same items or similar items that have basically same functions or purposes. A person skilled in the art may understand that the words such as "first" and "second" do not limit a quantity or an execution sequence, and the words such as "first" and "second" do not indicate a definite difference, either.

Reference to "an embodiment", "some embodiments", or the like described in embodiments of this application means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner.

The following describes some nouns (or communication terms) in this application.

1. Continuous RU (Continuous RU, CRU)

In this specification, the continuous RU is an RU including a plurality of contiguous subcarriers, or the continuous RU is an RU including two continuous subcarrier groups. A plurality of subcarriers included in each continuous subcarrier group are contiguous, and the two subcarrier groups are spaced by only one or more of a guard subcarrier, a null subcarrier, or a direct current subcarrier. All RUs supported in 802.11ax may be understood as continuous RUs. The continuous RU may also be referred to as a common RU. Certainly, the continuous RU may have another name. A specific name of the continuous RU is not limited in embodiments of this application. In embodiments of this application, a continuous RU including K subcarriers is referred to as a continuous K-tone RU. For example, a continuous 26-tone RU is a continuous RU including 26 subcarriers. In other words, a concept of the continuous K-tone RU is the same as a concept of a K-tone RU in the existing 802.11ax standard.

2. Discrete RU (Distributed RU, DRU)

Relative to a continuous RU, an RU that includes a plurality of subcarrier groups that are discrete in frequency domain may be referred to as a discrete RU. In other words, the discrete RU includes a plurality of subcarrier groups, and any two subcarrier groups are discrete in frequency domain. One subcarrier group includes one subcarrier, or one subcarrier group includes at least two contiguous subcarriers. In other words, one subcarrier group includes one subcarrier or includes a plurality of contiguous subcarriers. The discrete RU may also be referred to as a distributed RU (distributed RU, DRU). Certainly, in another embodiment, the discrete RU may have another name. The name of the discrete RU is not limited in this application. A quantity of subcarrier groups included in one discrete RU in this application is greater than or equal to 2.

In embodiments of this application, a discrete RU including K subcarriers may be referred to as a discrete K-tone RU. For example, a discrete 26-tone RU is a discrete RU including 26 subcarriers. For a value of K, refer to a value of K used for a continuous RU. Certainly, the value of K may be different from the value of K used for the continuous RU. For example, when a bandwidth is 20 MHz, 20 MHz may include one or a combination of a plurality of a discrete 26-tone RU, a discrete 52-tone RU, a discrete 106-tone RU, and a discrete 242-tone RU.

In this application, one discrete RU and another discrete RU may constitute a discrete MRU, and the discrete MRU can be allocated to one or more stations. For example, a discrete 242-tone RU and a discrete 484-tone RU may constitute a discrete 484+242-tone RU.

In some examples, quantities of subcarriers included in any two of a plurality of subcarrier groups included in a discrete RU may be the same or different. For example, a quantity of subcarriers in each subcarrier group may be 1. For another example, quantities of subcarriers in a part of subcarrier groups are 1, and quantities of sub carriers in the other part of subcarrier groups are 2. To be specific, one discrete RU may include four subcarrier groups, and quantities of subcarriers in the four subcarrier groups may be sequentially 1, 1, 2, and 2.

It should be noted that, in this application, one discrete RU may correspond to one continuous RU. For example, one discrete 26-tone RU may correspond to one continuous 26-tone RU, and one discrete 52-tone RU may correspond to one continuous 52-tone RU.

It should be understood that, a discrete RU may be obtained by discretizing a continuous RU specified in 802.11ax or 802.11be; or may be obtained through redefinition, instead of depending on a continuous RU specified in 802.11ax or 802.11be.

When allocation statuses of the discrete RU and the continuous RU are to be indicated, same resource allocation indication information, for example, a same index, may indicate allocated RUs. A transmit end and a receive end each determine, according to a protocol specification and depending on whether a mode is a discrete RU mode or a continuous RU mode, whether the resource allocation indication information specifically indicates the discrete RU or the continuous RU. Briefly, the discrete RU and the continuous RU may reuse resource allocation indication information.

In addition, when the discrete RU is obtained based on the continuous RU, the continuous RU may be referred to as a VRU, and the discrete RU may be referred to as a PRU. In other words, a process of mapping the continuous RU into the discrete RU may be referred to as a process of mapping the VRU into the PRU. The foregoing resource indication information may indicate an index of the VRU, to indicate the corresponding PRU.

3. Frequency Band

In this application, the frequency band refers to a frequency band range, and may also be referred to as a bandwidth, for example, 20 MHz, 40 MHz, 80 MHz, 160 MHz, 320 MHz, 160+160 MHz, or the like.

According to an IEEE 802.11ax protocol specification, for 20 MHz, 40 MHz, 80 MHz, and 160 MHz, bandwidths may be classified into a plurality of types of resource units (resource units, RUs), including a continuous 26-tone RU, a continuous 52-tone RU, a continuous 106-tone RU, a continuous 242-tone RU (a largest RU on a bandwidth of 20 MHz), a continuous 484-tone RU (a largest RU on a bandwidth of 40 MHz), a continuous 996-tone RU (a largest RU on a bandwidth of 80 MHz), and a continuous 2*996-tone RU (a largest RU on a bandwidth of 160 MHz). The entire bandwidth may include, for example, a guard (Guard) subcarrier, a null subcarrier, a direct current (direct current, DC) subcarrier, a pilot subcarrier, and a data subcarrier.

It should be noted that, in this application, a frequency band refers to a frequency band range occupied or covered by an allocated RU, and the frequency band range is not equivalent to an operating bandwidth or a system bandwidth. During implementation, the frequency band range may be less than or equal to the operating bandwidth or the system bandwidth.

For example, the operating bandwidth or the system bandwidth may be 40 MHz, and one continuous RU allocated by an AP to a STA may be discretized on 40 MHz. In this case, a corresponding first frequency band in this solution is 40 MHz. Alternatively, one continuous RU allocated by the AP to a STA 1 may be discretized in a first 20 MHz range, and another continuous RU allocated to a STA 2 may be discretized in a second 20 MHz range. In this case, a first frequency band occupied or covered by all subcarriers included in a discrete RU allocated to each of the STA 1 and the STA 2 is 20 MHz. In a special example, the AP allocates a discrete RU 1 and a discrete RU 2 to the STA 1. The discrete RU 1 is obtained through discretization in the first 20 MHz range, and the discrete RU 2 is obtained through discretization in the second 20 MHz range. In this case, for the STA 1, the first frequency band is determined based on a sum of discrete RUs allocated to the STA 1. The discrete RU 1 and the discrete RU 2 that are allocated to the STA 1 cover or occupy a bandwidth of 40 MHz. Therefore, the first frequency band is 40 MHz.

For another example, the AP allocates a discrete RU 1 to the STA 1, and allocates a discrete RU 2 to the STA 2. The discrete RU 1 is obtained through discretization in the first 20 MHz range, and the discrete RU 2 is obtained through discretization in the second 20 MHz range. In this case, for the STA 1, the discrete RU 1 allocated to the STA 1 covers or occupies a bandwidth of 20 MHz, and therefore, the first frequency band is 20 MHz. In this case, for the STA 2, the discrete RU 2 allocated to the STA 2 covers or occupies a bandwidth of 20 MHz, and therefore, the first frequency band is 20 MHz.

4. Time Unit

The time unit may be a slot.

5. Linear Interpolation (Linear Interpolation)

If a pilot signal and a data signal are transmitted through similar channels, a pilot subcarrier may be used to track some types of signal errors, and correct these errors during demodulation at a receive end. This may be referred to as pilot tracking (pilot tracking). For example, a signal amplitude (signal amplitude), a signal phase (signal phase), a symbol timing (symbol timing), and the like are tracked. Generally, a commonly used algorithm for tracking is linear interpolation. For usage of linear interpolation, refer to FIG. 2. As shown in FIG. 2, coordinate values (x0, y0) and (x1, y1) of two points are known. To obtain a value of x at a position in a range of [x0, x1] on a straight line, an equation of the straight line may be first obtained, and then x is substituted into the equation to obtain y. A process of calculating x when y is known is similar. An x-axis corresponds to a carrier frequency of a subcarrier, a y-axis corresponds to a carrier frequency offset of the subcarrier, and (x0, y0) and (x1, y1) may represent carrier frequencies and carrier frequency offsets of different pilot subcarriers.

6. Hadamard (Hadamard) Matrix

A Hadamard matrix H n is a square matrix. A quantity of rows and a quantity of columns are the same, and both are equal to an order (order) n. A value of an element in the Hadamard matrix may be 1 or −1, and satisfies: $H_n H_n^T = nI_n$, where $I_n$ represents an identity matrix.

It should be noted that, in this application, the Hadamard matrix has the following characteristics:

A requirement of an orthogonal matrix is met. A value of an element in the Hadamard matrix may be 1 or −1, so that a transmit power is controlled, and calculation complexity is reduced. A high-order Hadamard matrix may be constructed by using a known low-order Hadamard matrix.

7. P Matrix

In this application, the P matrix has the following characteristics:

A requirement of an orthogonal matrix is met. Optionally, a value of an element in the P matrix may be 1 or −1, so that a transmit power is controlled, and calculation complexity is reduced. A high-order P matrix may be constructed by using a known low-order P matrix.

The foregoing content briefly describes meanings of nouns (communication terms) in embodiments of this application. To better understand the technical solutions provided in embodiments of this application, the foregoing content does not constitute a limitation on the technical solutions provided in embodiments of this application.

It should be understood that, embodiments of this application are applicable to a wireless local area network (wireless local area network, WLAN) scenario, and are applicable to an IEEE 802.11 system standard, for example, 802.11a/b/g, 802.11n, 802.11ac, 802.11ax, or a next-generation standard of 802.11ax, for example, 802.11be, or a next-generation standard. Alternatively, embodiments of this application may be applied to a wireless local area network system, for example, an internet of things (internet of things, IoT) network, a vehicle-to-everything (Vehicle to X, V2X) network, or the like. Certainly, embodiments of this application are also applicable to other possible communication systems, for example, an LTE system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a future 6G communication system, and the like.

The following uses an example in which embodiments of this application are applicable to a WLAN scenario. It should be understood that, the WLAN develops from the 802.11a/g standard, and goes through 802.11n, 802.11ac, 802.11ax, and 802.11be that is currently being discussed. 802.11n may also be referred to as high throughput (high throughput, HT), 802.11ac may also be referred to as very high throughput (very high throughput, VHT), 802.11ax may also be referred to as high efficient (high efficient, HE) or Wi-Fi 6, and 802.11be may also be referred to as extremely high throughput (extremely high throughput, EHT) or Wi-Fi 7. Standards before HT, such as 802.11a/b/g and the like, are collectively referred to as non-high throughput (Non-HT).

Figure 3:
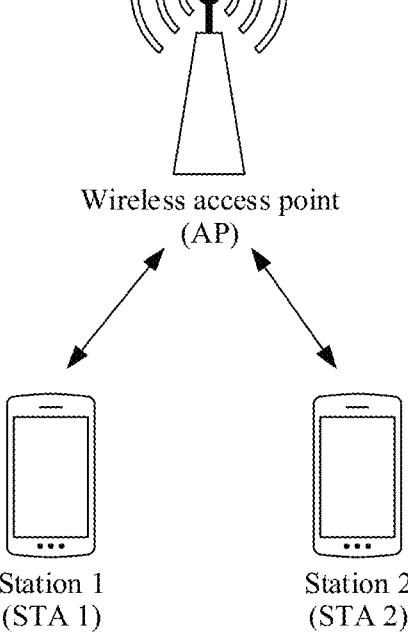
FIG. 3 is a diagram of a network architecture of a WLAN according to an embodiment of this application.

FIG. 3 is a diagram of a network architecture of a WLAN according to an embodiment of this application. In FIG. 1, that the WLAN includes one wireless access point (access point, AP) and two stations (stations, STAs) is used as an example. A STA associated with an AP can receive a radio frame sent by the AP, and can also send a radio frame to the AP. In addition, embodiments of this application are also applicable to communication between APs. For example, the APs may communicate with each other by using a distributed system (distributed system, DS). Embodiments of this application are also applicable to communication between STAs. It should be understood that, quantities of APs and STAs in FIG. 1 are merely an example. There may be more or less APs and STAs.

The STA in embodiments of this application may be a user terminal, a user apparatus, an access apparatus, a subscriber station, a subscriber unit, a mobile station, a user agent, a user device, or another device that has a wireless communication function. The user terminal may include various forms of devices having a wireless communication function, for example, a handheld device, a vehicle-mounted device, a wearable device, a computing device, and another processing device connected to a wireless modem. The user terminal may alternatively be user equipment (user equipment, UE), a mobile station (mobile station, MS), a terminal (terminal), terminal equipment (terminal equipment), a portable communication device, a handheld device, a portable computing device, an entertainment device, a game device or system, a global positioning system device, any other suitable device configured to perform network communication via wireless media, or the like. For example, the STA may be a router, a switch, a bridge, or the like. Herein, for ease of description, the devices mentioned above are collectively referred to as a station or a STA.

The AP and the STA in embodiments of this application may be an AP and a STA that are applicable to an IEEE 802.11 system standard. The AP is an apparatus that is deployed in a wireless communication network and that provides a wireless communication function for a STA associated with the AP. The AP may be used as a hub of the communication system, and is usually a network-side product that supports MAC and a PHY in the 802.11 system standard, for example, may be a communication device such as a base station, a router, a gateway, a repeater, a communication server, a switch, a bridge, or the like. The base station may include various forms of macro base stations, micro base stations, relay stations, or the like. Herein, for ease of description, the devices mentioned above are collectively referred to as an AP. The STA is usually a terminal product that supports media access control (media access control, MAC) and a physical layer (physical, PHY) in the 802.11 system standard, for example, a mobile phone, a notebook computer, or the like.

In addition, the technical solutions provided in embodiments of this application are applicable to a plurality of system architectures. The network architecture and the service scenario described in embodiments of this application are intended to describe the technical solutions in embodiments of this application more clearly, and do not constitute a limitation on the technical solutions provided in embodiments of this application. A person of ordinary skill in the art may learn that: With evolution of the network architecture and emergence of new service scenarios, the technical solutions provided in embodiments of this application are also applicable to similar technical problems.

Optionally, a wireless access point, a station, or the like in FIG. 3 may be implemented by one device, or may be jointly implemented by a plurality of devices, or may be a functional module in one device. This is not specifically limited in embodiments of this application. It may be understood that, the foregoing functions may be network elements in a hardware device, or may be software functions running on dedicated hardware, or may be virtualized functions instantiated on a platform (for example, a cloud platform).

Figure 4:
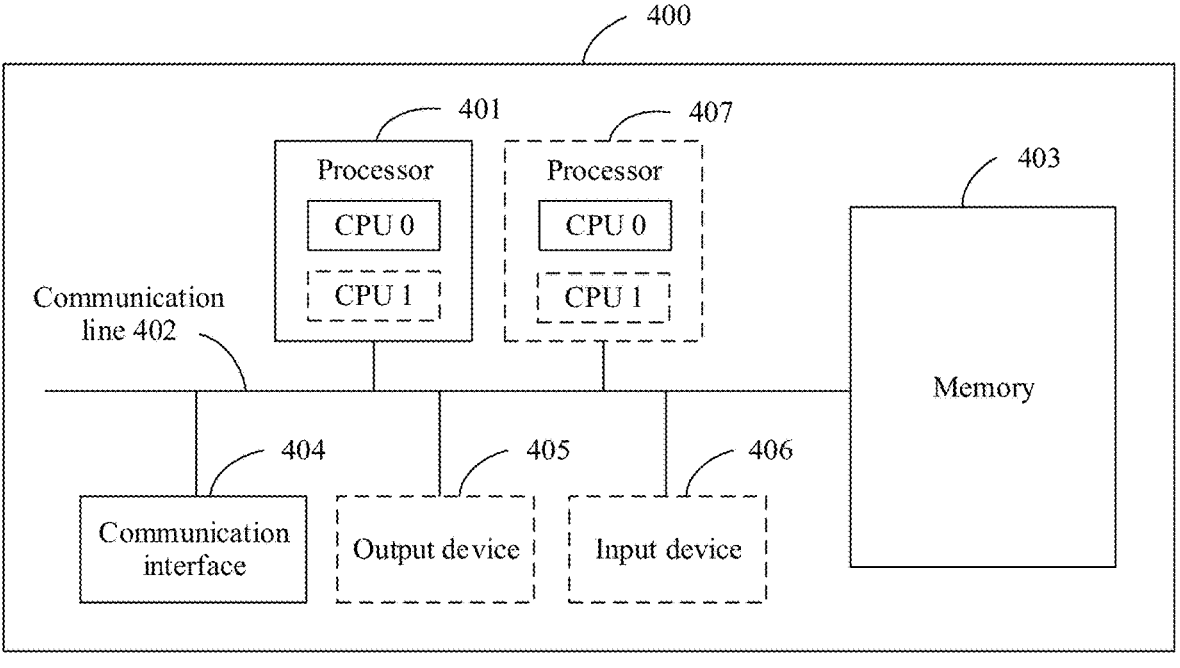
FIG. 4 is a schematic diagram of a hardware structure applicable to a communication apparatus according to an embodiment of this application.

For example, each device in FIG. 3 may be implemented by a communication apparatus 400 in FIG. 4. FIG. 4 is a schematic diagram of a hardware structure applicable to a communication apparatus according to an embodiment of this application. The communication apparatus 400 includes at least one processor 401, a communication line 402, a memory 403, and at least one communication interface 404.

The processor 401 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 402 may include a path for transmitting information between the foregoing components.

The communication interface 404 is any apparatus such as a transceiver (for example, an antenna or the like), and is configured to communicate with another device or a communication network, such as the Ethernet, a RAN, a wireless local area network (wireless local area network, WLAN), or the like.

The memory 403 may be a read-only memory (read-only memory, ROM) or another type of static storage device that can store static information and instructions, or a random access memory (random access memory, RAM) or another type of dynamic storage device that can store information and instructions. Alternatively, the memory 403 may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or data structure and that can be accessed by a computer. However, this is not limited thereto. The memory may exist independently, and is connected to the processor through the communication line 402. The memory may alternatively be integrated with the processor. The memory provided in embodiments of this application may be usually non-volatile. The memory 403 is configured to store computer-executable instructions for performing the solutions in this application, and the processor 401 controls execution. The processor 401 is configured to execute the computer-executable instructions stored in the memory 403, to implement methods provided in the following embodiments of this application.

Optionally, the computer-executable instructions in embodiments of this application may also be referred to as application program code. This is not specifically limited in embodiments of this application.

In a possible implementation, the processor 401 may include one or more CPUs, for example, a CPU 0 and a CPU 1 in FIG. 4.

In a possible implementation, the communication apparatus 400 may include a plurality of processors, for example, the processor 401 and a processor 407 in FIG. 4. Each of the processors may be a single-core (single-CPU) processor, or may be a multi-core (multi-CPU) processor. The processor herein may be one or more devices, circuits, and/or processing cores configured to process data (for example, computer program instructions).

In a possible implementation, the communication apparatus 400 may further include an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, a projector (projector), or the like. The input device 406 communicates with the processor 401, and may receive an input of a user in a plurality of manners. For example, the input device 406 may be a mouse, a keyboard, a touchscreen device, a sensor device, or the like.

The communication apparatus 400 may be a general-purpose device or a dedicated device. During specific implementation, the communication apparatus 400 may be a portable computer, a network server, a palmtop computer (personal digital assistant, PDA), a mobile phone, a tablet computer, a wireless terminal device, an embedded device, or a device having a structure similar to that in FIG. 4. A type of the communication apparatus 400 is not limited in embodiments of this application.

After the communication apparatus is powered on, the processor 401 may read a software program in the memory 403, interpret and execute instructions of the software program, and process data of the software program. When data needs to be sent wirelessly, the processor 401 performs baseband processing on the to-be-sent data, and then outputs a baseband signal to a radio frequency circuit. The radio frequency circuit performs radio frequency processing on the baseband signal, and then sends a radio frequency signal through the antenna in an electromagnetic wave form. When data is sent to the communication apparatus, the radio frequency circuit receives a radio frequency signal through the antenna, converts the radio frequency signal into a baseband signal, and outputs the baseband signal to the processor 401. The processor 401 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that, in this application, a first device may be an AP, and a second device may be a STA or an AP; or a first device may be a STA, and a second device may also be a STA. The following describes the technical solutions provided in embodiments of this application by using an example in which the first device is a STA and the second device is an AP.

Figure 5:
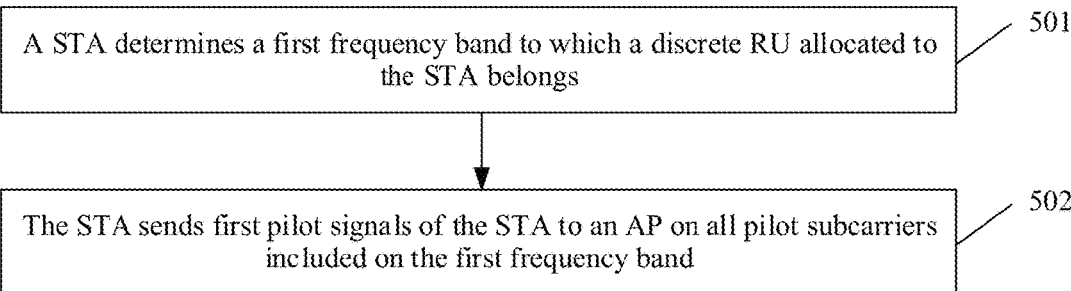
FIG. 5 is a schematic flowchart of a pilot signal transmission method according to an embodiment of this application.

FIG. 5 is a schematic flowchart of a pilot signal transmission method according to an embodiment of this application. FIG. 5 mainly resolves problems existing in the two manners in FIG. 1:

1. A pilot subcarrier is located close to a data subcarrier, or pilot subcarriers are sparsely distributed on a frequency band with a bandwidth of 20 MHz, and therefore, problems such as narrowband interference and frequency selective fading may occur. This may greatly damage transmission of a pilot signal.

2. The pilot subcarriers are sparsely distributed on the frequency band with a bandwidth of 20 MHz. This may result in an inaccurate linear difference result.

3. A phase difference between the distributed pilot subcarriers may exceed $2\pi$. This means that pilot phases are not in a same period, and may cause an error in a linear interpolation result.

4. Pilot subcarriers may be far away from a part of data subcarriers. As a result, a linear difference implemented by using the pilot subcarriers cannot accurately cover the part of data subcarriers at a relatively far position. For example, in Manner 2 in FIG. 1, pilot subcarriers are far away from a part of data subcarriers on the right side. As a result, a linear difference implemented by using the pilot subcarriers cannot accurately cover the part of data subcarriers on the right side.

As shown in FIG. 5, the method includes but is not limited to the following steps.

501: A STA determines a first frequency band to which a discrete RU allocated to the STA belongs.

For the discrete RU, refer to the foregoing related description. Details are not described herein again. It may be understood that, in this application, there may be one or more discrete RUs. This is not limited herein.

The first frequency band to which the discrete RU belongs refers to a frequency band range occupied after the discrete RU is discretized. The frequency band range may be, for example, 20 MHz, 40 MHz, 80 MHz, 160 MHz, 320 MHz, 160+160 MHz, or the like. This is not limited herein.

It should be noted that, in this application, a pilot subcarrier included in a continuous RU allocated to the STA may participate in or not participate in VRU-to-PRU distributed mapping. This is not limited herein.

502: The STA sends first pilot signals of the STA to an AP on all pilot subcarriers included on the first frequency band.

Optionally, the first pilot signals of the STA are related to a preset matrix W and a column vector $$s_k^t.$$

W represents an invertible matrix with Nu rows and Nu columns (W has a full rank, and the rank is Nu). W satisfies the following formula: $W=[w_1, w_2, \ldots, w_{Nu}]$. $w_x$ represents a column vector, x is an integer greater than or equal to 1 and less than or equal to Nu, and Nu is an integer greater than 0. W is used to control pilot signals transmitted by Nu STAs in Nu time units. A column index of W is a time unit index, and a row index of W is a STA index. The Nu STAs include the STA.

$$s_k^t$$

represents pilot signals corresponding to the STA on all pilot subcarriers included on the first frequency band in a $t^{th}$ time unit. A column quantity of $$s_k^t$$

is a quantity of all the pilot subcarriers included on the first frequency band. An $n^{th}$ element in $$s_k^t$$

represents a pilot signal corresponding to the STA on an $n^{th}$ pilot subcarrier included on the first frequency band. n is an integer greater than 0 and less than or equal to the column quantity of $$s_k^t.$$

k is an integer greater than or equal to 1 and less than or equal to Nu. t is an integer greater than or equal to 0, and t represents a time unit index.

In this application, the Nu time units may constitute one period. Column i of W is used to control pilot signals transmitted by the Nu STAs in an $i^{th}$ time unit. Row j of W is used to control pilot signals transmitted by a $j^{th}$ STA in the Nu time units. i is an integer greater than or equal to 1 and less than or equal to Nu. j is an integer greater than or equal to 1 and less than or equal to Nu. It may be understood that, in each time unit in different periods, W may be used to transmit a pilot signal. In different periods, values of an element in $$s_k^t$$

of a same STA may be the same or different. This is not limited herein. It should be noted that, in this application, a value of an element in $$s_k^t$$

may be specified in a protocol or redesigned. This is not limited herein. For example, the value of the element in $$s_k^t$$

may be 0, 1, −1, or the like specified in section 27.3.12.13 of the 802.11ax-2021 standard. This is not limited herein. In addition, the value of the element in $$s_k^t$$

may alternatively be a value specified in the 802.11be standard, or the like.

In this application, a value of each element in W may be any value. This is not limited herein. In consideration of transmit power control or to simplify calculation, the value of each element in W may be 0, 1, or −1. A quantity of STAs that can be supported by W in simultaneously transmitting pilot signals is less than or equal to Nu.

For example, W represents a 2-order Hadamard matrix $H_2$, and $$H_2 = \begin{bmatrix} 1 & 1 \\ -1 & 1 \end{bmatrix}.$$

An element located in a row 1 and a column 1 is 1, and an element located in row 1 and column 2 is −1. To be specific, in a first time unit, two STAs simultaneously send, to the AP on all the pilot subcarriers included on the first frequency band, first pilot signals corresponding to the two STAs. An element located in row 1 and column 2 is 1, and an element located in row 2 and column 2 is −1. To be specific, in a second time unit, two STAs simultaneously send, to the AP on all the pilot subcarriers included on the first frequency band, first pilot signals corresponding to the two STAs. In conclusion, a quantity of STAs that can be supported by W in simultaneously transmitting pilot signals is equal to Nu (Nu is 2).

In this application, that a column quantity of $$s_k^t$$

is a quantity of all pilot subcarriers included on the first frequency band may be understood as that the column quantity of $$s_k^t$$

is a quantity of all pilot subcarriers included on the first frequency band in a $t^{th}$ time unit, and an $n^{th}$ element $$s_k^t$$

in represents a pilot signal corresponding to the STA on an $n^{th}$ pilot subcarrier included on the first frequency band. For example, $$s_k^t$$

may be understood as that a column quantity of $$s_k^t$$

is a quantity of all pilot subcarriers included on the first frequency band in a first time unit, and an $n^{th}$ element $$s_k^t$$

represents a pilot signal corresponding to the STA on an $n^{th}$ pilot subcarrier included on the first frequency band. For example, $$s_k^t$$

may be understood as that a column quantity of $$s_k^2$$

is a quantity of all pilot subcarriers included on the first frequency band in a second time unit, and an $n^{th}$ element in $$s_k^2$$

represents a pilot signal corresponding to the STA on an $n^{th}$ pilot subcarrier included on the first frequency band.

Optionally, W represents an orthogonal matrix;

W represents a 2*n-order Hadamard matrix $H_{2n}$, and $H_{2n}$ satisfies the following formula:

$$H_{2n} = \begin{bmatrix} H_n & H_n \\ -H_n & H_n \end{bmatrix},$$

where $H_n$ represents an n-order Hadamard matrix, and n is an integer greater than or equal to 1;

W represents a 2*n-order P matrix $P_{2n \times 2n}$, and $P_{2n \times 2n}$ satisfies the following formula:

$$P_{2n \times 2n} = \begin{bmatrix} P_{n \times n} & P_{n \times n} \\ P_{n \times n} & -P_{n \times n} \end{bmatrix},$$

where $P_{n \times n}$ represents an n-order P matrix; or

W represents a diagonal matrix, and the diagonal matrix is an identity matrix.

A value of an element in $H_n$ may be 1 or −1, and a value of an element in $P_{n \times n}$ may be 1 or −1. This is not limited herein.

Optionally, if n is 1, $$H_{2n} = \begin{bmatrix} 1 & 1 \\ -1 & 1 \end{bmatrix};$$

if n is 2, $H_{2n} =$ $$\begin{bmatrix} H_2 & H_2 \\ -H_2 & H_2 \end{bmatrix} = \begin{bmatrix} 1 & 1 & 1 & 1 \\ -1 & 1 & -1 & 1 \\ -1 & -1 & 1 & 1 \\ 1 & -1 & -1 & 1 \end{bmatrix};$$

if n is 1, $$P_{2n \times 2n} = \begin{bmatrix} 1 & -1 \\ 1 & 1 \end{bmatrix};$$

if n is 2, $$P_{2n \times 2n} = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

or if n is 4, $$P_{2n \times 2n} = \begin{bmatrix} P_{4 \times 4} & P_{4 \times 4} \\ P_{4 \times 4} & -P_{4 \times 4} \end{bmatrix}.$$

Optionally, in this application, W may represent an a*b-order Hadamard matrix $H_{a*b}$, and $H_{a*b}$ may be implemented by using any one of the following solutions:

Solution A: Replace all elements 1 in $H_a$ with $H_b$, and replace all elements −1 in $H_a$ with −$H_b$.

Solution B: Replace all elements 1 in $H_b$ with $H_a$, and replace all elements −1 in $H_b$ with −$H_a$.

$H_a$ represents an a-order Hadamard matrix, $H_b$ represents a b-order Hadamard matrix, a value of an element in $H_a$ may be 1 or −1, a value of an element in $H_b$ may be 1 or −1, and both a and b are integers greater than or equal to 1.

It should be noted that, in this application, W represents an Nu-order Hadamard matrix or P matrix, and can support less than Nu STAs or Nu STAs in simultaneously transmitting corresponding pilot signals on all pilot subcarriers on a same frequency band. For example, if seven STAs need to be supported, W may represent an 8-order Hadamard matrix or P matrix. Values of elements in one column of the 8-order Hadamard matrix or P matrix may be any known value, for example, all 0s or all 1s. This is not limited herein. For example, values of elements in column 8 of the 8-order Hadamard matrix or P matrix may be any known value, for example, all 0s or all 1s. If 12 STAs need to be supported, W may represent a 16-order Hadamard matrix or P matrix. Values of elements in four columns of the 16-order Hadamard matrix or P matrix may be any known value, for example, all 0s or all 1s. This is not limited herein. For example, values of elements in column 12 to column 16 in the 16-order Hadamard matrix or P matrix may be any known value, for example, all 0s or all 1s. If 12 STAs need to be supported, W may alternatively represent a 12-order Hadamard matrix.

In this application, when W represents a diagonal matrix, in each time unit, only one STA transmits pilot signals on all the pilot subcarriers included on the first frequency band. For example, W represents a diagonal matrix of two rows and two columns, that is, $$W = \begin{bmatrix} 1 & 0 \\ 0 & 1 \end{bmatrix}.$$

An element located in a row 1 and a column 1 is 1, and an element located in row 1 and column 2 is 0. To be specific, in a first time unit, only one STA sends, to the AP on all the pilot subcarriers included on the first frequency band, first pilot signals corresponding to the STA. An element located in row 1 and column 2 is 0, and an element located in row 2 and column 2 is 1. To be specific, in a second time unit, only one STA simultaneously sends, to the AP on all the pilot subcarriers included on the first frequency band, first pilot signals corresponding to the STA. In conclusion, a quantity of STAs that can be supported by W in simultaneously transmitting pilot signals is equal to 1.

Figure 6:
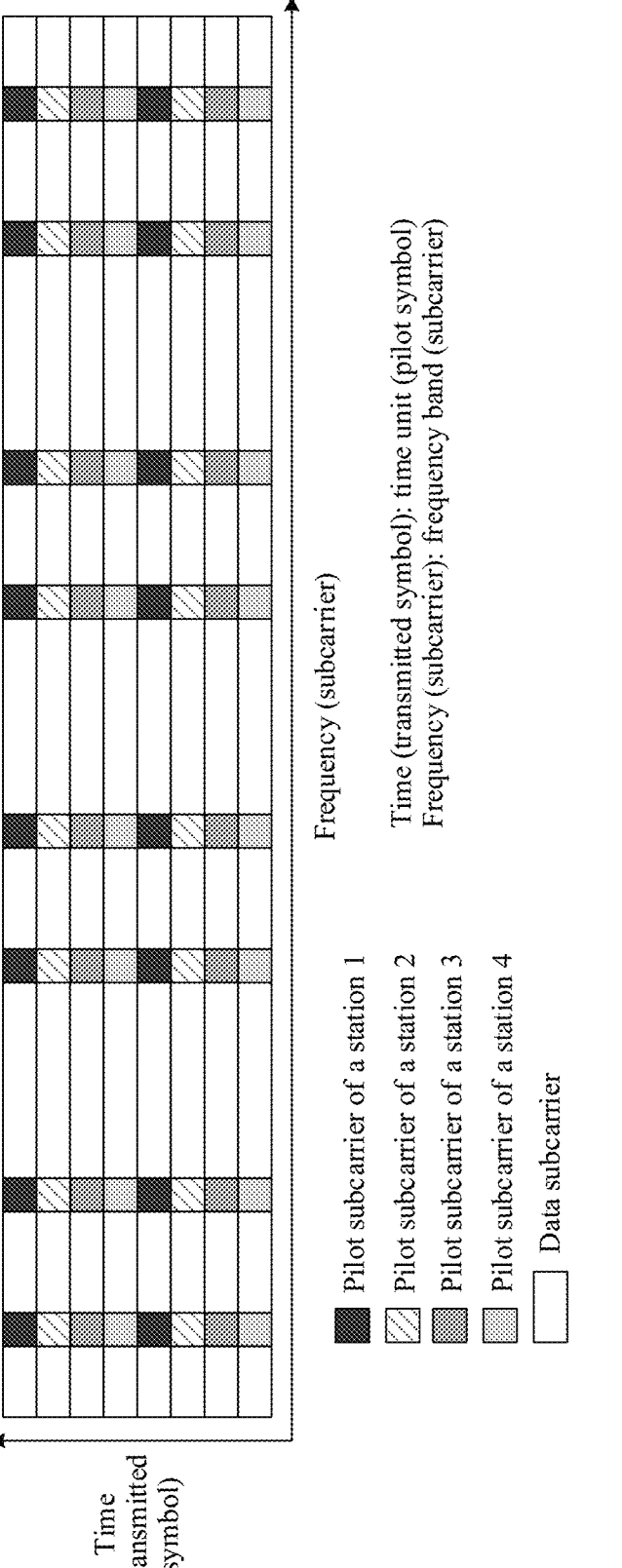
FIG. 6 is a schematic diagram of transmitting a pilot signal by only a single STA in each time unit in a period of 4 according to an embodiment of this application.

For another example, FIG. 6 is a schematic diagram of transmitting a pilot signal by only a single STA in each time unit in a period of 4 according to an embodiment of this application. Refer to FIG. 6 (FIG. 6 shows only eight pilot subcarriers, and other subcarriers are data subcarriers (white)). In FIG. 6, a horizontal axis represents a first frequency band (a position of a subcarrier), and a vertical axis represents a time unit (eight time units in total from top to bottom). Only one STA transmits pilot signals on all pilot subcarriers in each time unit. For example, in a first time unit, only a station 1 transmits pilot signals on all the pilot subcarriers, in a second time unit, only a station 2 transmits pilot signals on all the pilot subcarriers, and in a third time unit, only a station 3 transmits pilot signals on all the pilot subcarriers.

Optionally, first pilot signals of the STA are $$s_k^t W_{k,tt},$$

where tt=mod(t, Nu)+1, t is an integer greater than or equal to 0, t represents a time unit index, and tt is an integer greater than or equal to 1 and less than or equal to Nu. $W_{k,tt}$ represents an element in row k and column tt in W. tt represents a $tt^{th}$ time unit in W.

Optionally, the first pilot signals of the STA are $$s_k^t.$$

For example, W represents a diagonal matrix. In this case, the first pilot signals of the STA may be $$s_k^t.$$

Optionally, a part of elements in $$s_k^t$$

are set to zero. It may be understood that, setting to zero means that no pilot signal is sent on a pilot subcarrier at this position. If a third element in $$s_k^t$$

is set to zero, no pilot signal is sent on a pilot subcarrier corresponding to the third element.

Figure 7:
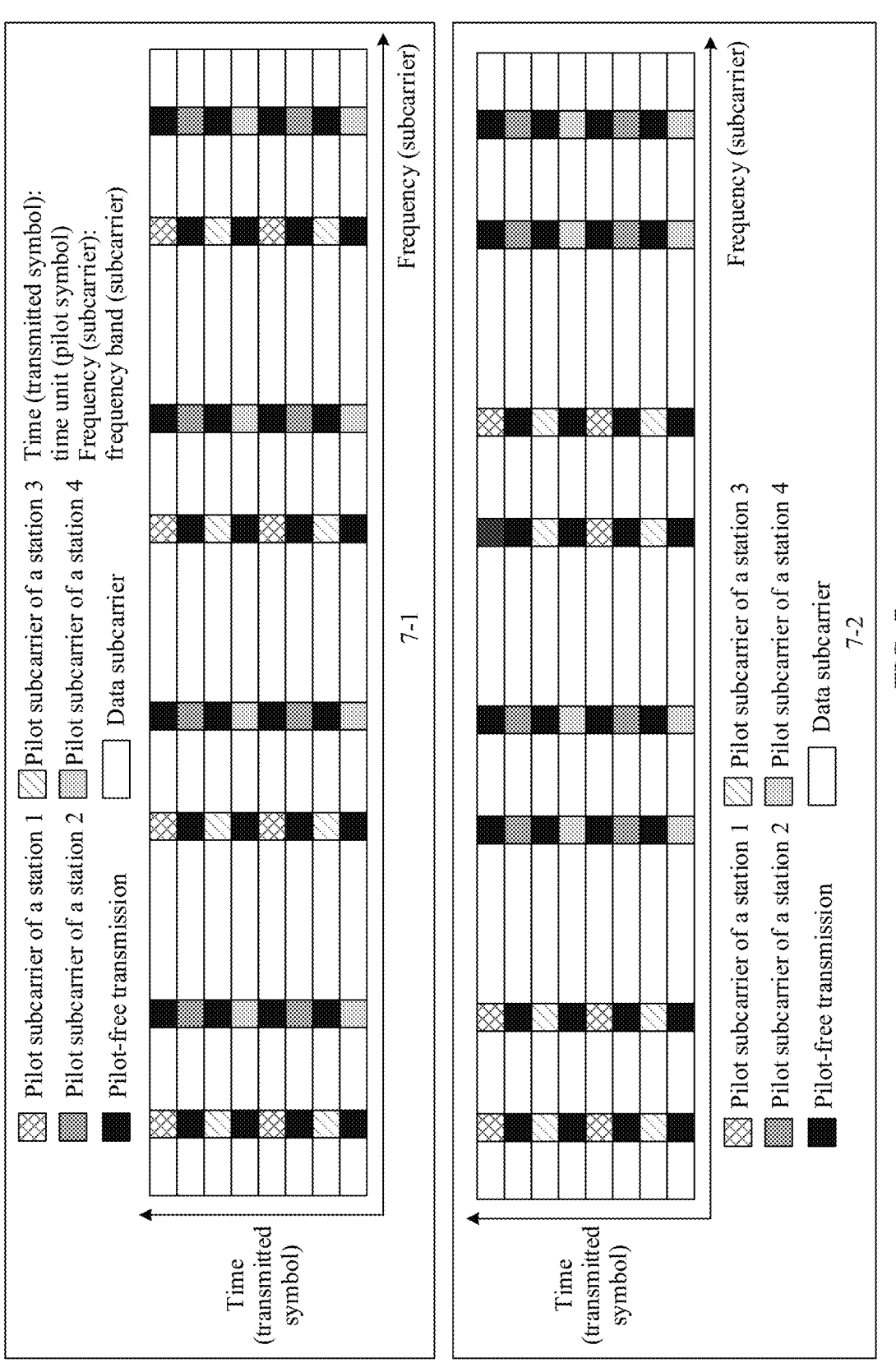
FIG. 7 is a schematic diagram of transmitting pilot signals by different stations on pilot subcarriers corresponding to different time units according to an embodiment of this application.

For example, FIG. 7 is a schematic diagram of transmitting pilot signals by different stations on pilot subcarriers corresponding to different time units according to an embodiment of this application. Refer to FIG. 7 (FIG. 7 shows only eight pilot subcarriers, and other subcarriers are data subcarriers (white)). In FIG. 7, a horizontal axis represents a first frequency band (a position of a subcarrier), and a vertical axis represents a time unit (eight time units in total from top to bottom). In 7-1 in FIG. 7, a station 1 transmits pilot signals on a first, third, fifth, and seventh pilot subcarriers (from left to right on the horizontal axis) in a first time unit, for example, first pilot signals of the station $$1\ s_1^1 = [1\ \ 0\ \ 1\ \ 0\ \ 1\ \ 0\ \ 1\ \ 0];$$

and a station 2 transmits pilot signals on a second, fourth, sixth, and eighth pilot subcarriers (from left to right on the horizontal axis) in a second time unit, for example, first pilot signals of the station $$2\ s_2^2 = [0\ \ 1\ \ 0\ \ 1\ \ 0\ \ 1\ \ 0\ \ 1].$$

In 7-2 in FIG. 7, a station 1 transmits pilot signals on a first, second, fifth, and sixth pilot subcarriers (from left to right on the horizontal axis) in a first time unit, for example, first pilot signals of the station $$1\ s_1^1 = [1\ \ 1\ \ 0\ \ 0\ \ 1\ \ 1\ \ 0\ \ 0];$$

and a station 2 transmits pilot signals on a third, fourth, seventh, and eighth pilot subcarriers (from left to right on the horizontal axis) in a second time unit, for example, first pilot signals of the station $$2\ s_2^2 = [0\ \ 0\ \ 1\ \ 1\ \ 0\ \ 0\ \ 1\ \ 1].$$

It should be noted that, in this application, pilot signals transmitted by a station on different pilot subcarriers may be the same or different.

It can be learned that, in the foregoing technical solution, the first frequency band that includes the discrete RU allocated to the STA is determined, so that the STA may send the first pilot signals of the STA to the AP on all the pilot subcarriers included on the first frequency band. In this way, the first pilot signals can be transmitted by using fixed and evenly distributed pilot subcarriers on the first frequency band, so that problems such as narrowband interference and frequency selective fading that are caused by sparse distribution of pilot subcarriers on a frequency band are avoided, and pilot signal transmission reliability is improved. In addition, a linear difference result is more accurate, so that a problem that a linear difference result is incorrect when pilot phases are not in a same period is avoided, and a linear difference implemented by using pilot subcarriers can accurately cover the entire frequency band.

Optionally, first pilot signals $q_t$ of Nu STAs satisfy the following formula:

$$q_t = [\,s_1^t\quad s_2^t\quad s_3^t\quad \ldots\quad s_{Nu}^t\,]w_{tt}.$$

$w_{tt}$ represents a $tt^{th}$ column vector in W. $q_t$ represents a column vector. A column quantity of $q_t$ is a quantity of all pilot subcarriers included on the first frequency band. The first pilot signals of the Nu STAs are sent on all the pilot subcarriers included on the first frequency band. That is, pilot signals of the Nu STAs are further sent simultaneously on all the pilot subcarriers included on the first frequency band.

$$s_f^t$$

represents pilot signals corresponding to an $f^{th}$ STA on all the pilot subcarriers included on the first frequency band in a $t^{th}$ time unit. A column quantity of $$s_f^t$$

is the quantity of all the pilot subcarriers included on the first frequency band. An $n^{th}$ element in $$s_f^t$$

represents a pilot signal corresponding to the $f^{th}$ STA on an $n^{th}$ pilot subcarrier included on the first frequency band. f is an integer greater than or equal to 1 and less than or equal to Nu. For example, a column quantity of $$s_2^t$$

is the quantity of all the pilot subcarriers included on the first frequency band, and an $n^{th}$ element of $$s_2^t$$

represents a pilot signal corresponding to a STA (that is, a second STA) corresponding to $$s_2^t$$

on an $n^{th}$ pilot subcarrier included on the first frequency band. A column quantity of $$s_3^t$$

is the quantity of all the pilot subcarriers included on the first frequency band, and an $n^{th}$ element of $$s_3^t$$

represents a pilot signal corresponding to a STA (that is, a third STA) corresponding to $$s_3^t$$

on an $n^{th}$ pilot subcarrier included on the first frequency band.

It may be understood that, pilot signals transmitted by the Nu STAs on an $n^{th}$ pilot subcarrier are values of elements in row n in $q_r$.

Figure 8:
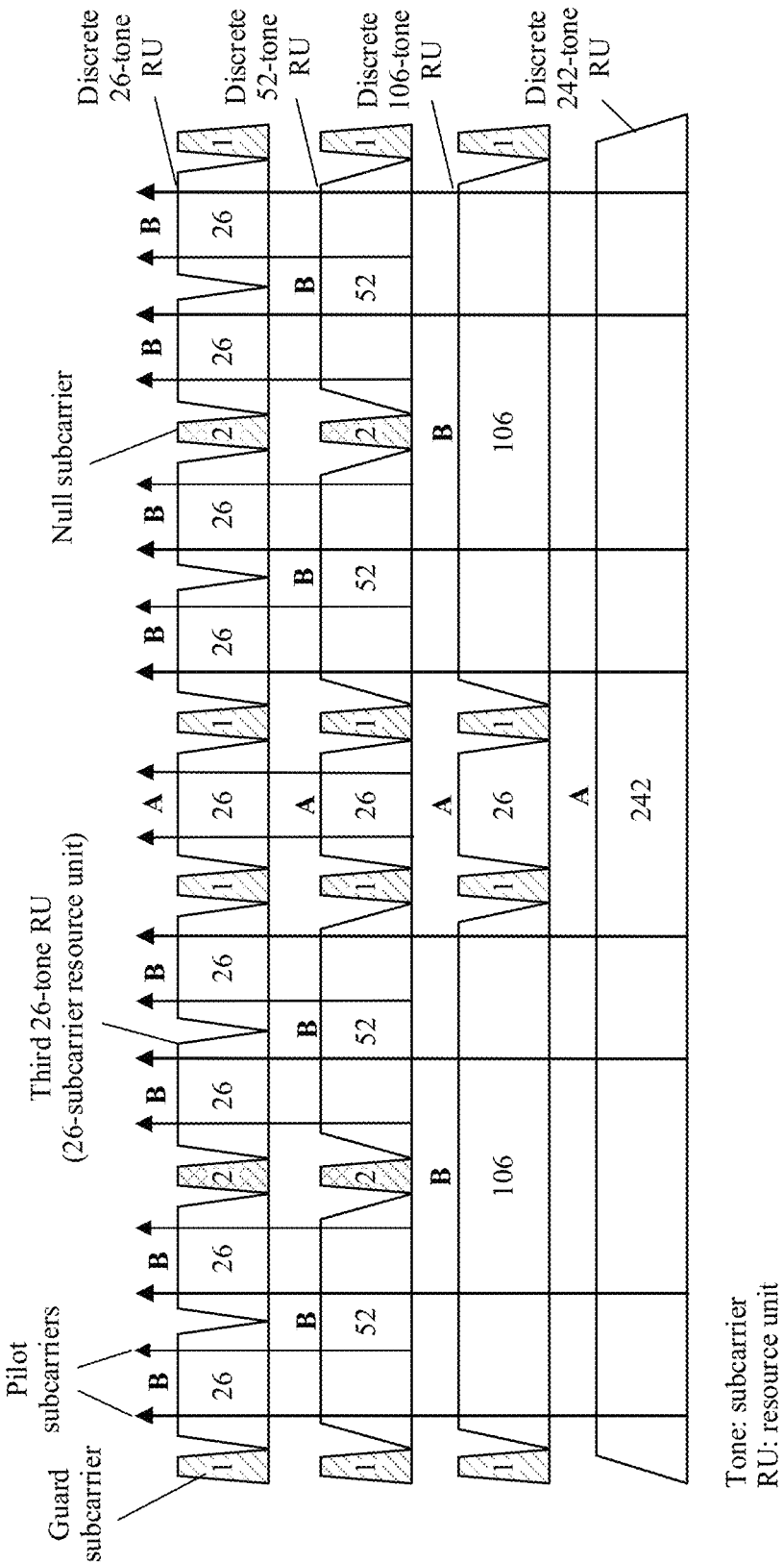
FIG. 8 is a schematic diagram of subcarrier distribution and RU distribution of 20 MHz.
Figure 9:
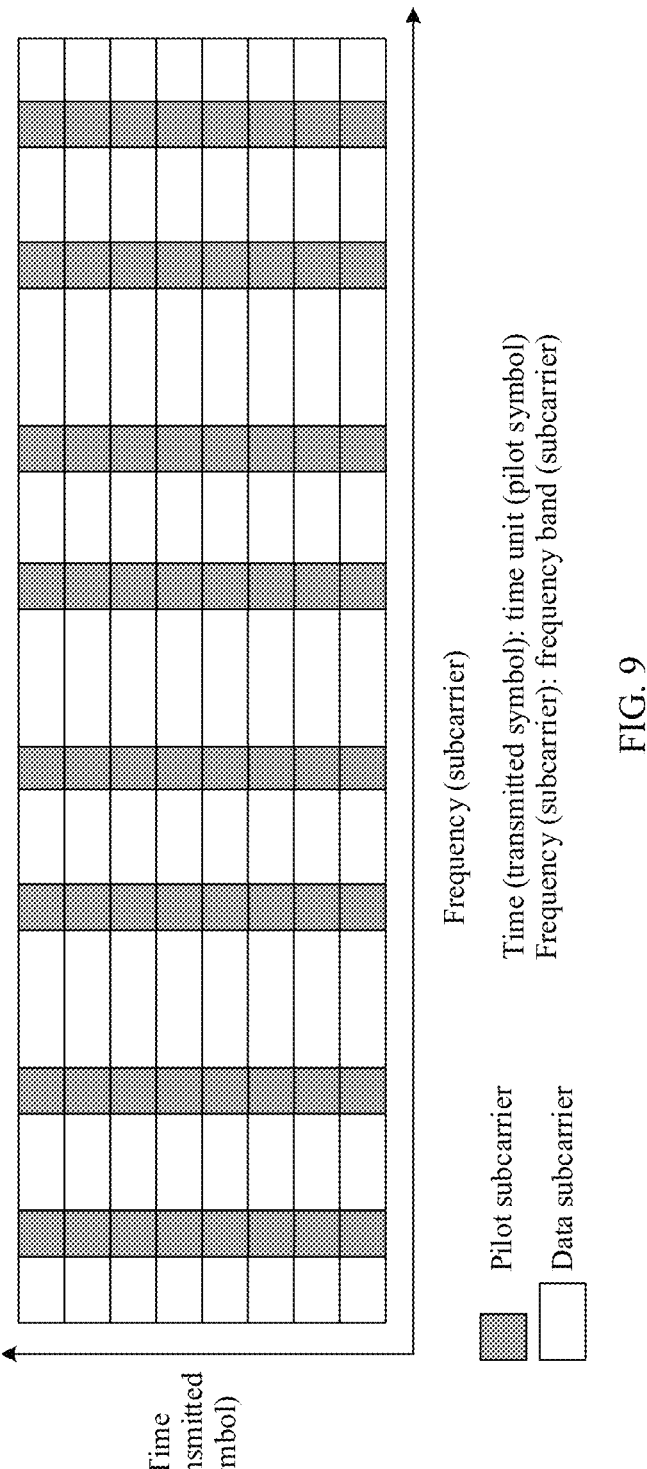
FIG. 9 is a diagram of a pilot transmission mode according to an embodiment of this application.

For example, FIG. 8 is a schematic diagram of subcarrier distribution and RU distribution of 20 MHz. As shown in FIG. 8, when a bandwidth is 20 MHz, the entire bandwidth may include one discrete 242-tone RU, or may include various combinations of a discrete 26-tone RU, a discrete 52-tone RU, and a discrete 106-tone RU. For example, 20 MHz may include nine discrete 26-tone RUs, 20 MHz may include four discrete 52-tone RUs and one discrete 26-tone RU, or 20 MHz may include two discrete 106-tone RUs and one discrete 26-tone RU. In addition, with reference to FIG. 8, it can be learned that the entire bandwidth may include 18 pilot subcarriers. If 20 MHz includes nine discrete 26-tone RUs, and a discrete RU allocated to a STA is a third discrete 26-tone RU from left to right on the entire bandwidth, the STA may transmit first pilot signals on the 18 pilot subcarriers included on the entire bandwidth. It may be understood that, if the other eight discrete 26-tone RUs are allocated to another STA, the another STA may also transmit pilot signals on the 18 pilot subcarriers included on the entire bandwidth. It should be noted that, in this application, when the entire bandwidth includes discrete RUs allocated to a plurality of STAs, the plurality of STAs may simultaneously transmit corresponding pilot signals on the 18 pilot subcarriers included on the entire bandwidth. Further, FIG. 9 is a diagram of a pilot transmission mode according to an embodiment of this application. Refer to FIG. 9 (FIG. 9 shows only eight pilot subcarriers (gray), and other subcarriers are data subcarriers (white)). In FIG. 9, a horizontal axis represents a first frequency band (a position of a subcarrier), and a vertical axis represents a time unit (eight time units in total from top to bottom). Pilot signals of different STAs may be transmitted on each pilot subcarrier in each time unit. It may be understood that, for other larger RUs, for example, a discrete 484-tone RU (the discrete 484-tone RU includes 36 pilot subcarriers), a discrete 996-tone RU (the discrete 996-tone RU includes 72 pilot subcarriers), a discrete 2*996-tone RU (the discrete 2*996-tone RU includes discrete 996-tone RUs that are continuous on two frequency bands, and includes 144 pilot subcarriers), a discrete 4*996-tone RU (the discrete 4*996-tone RU includes discrete 996-tone RUs that are continuous on four frequency bands, and includes 288 pilot subcarriers), and the like, refer to a manner of transmitting a pilot signal in FIG. 8 or FIG. 9. Details are not described herein again.

Optionally, the first pilot signals of the STA occupy different pilot subcarriers in different time units in the Nu time units, and a total quantity of pilot subcarriers occupied by the first pilot signals of the STA in the Nu time units is a total quantity of pilot subcarriers included on the first frequency band. The Nu time units are Nu time units in one period. It may be understood that, in this application, transmitting first pilot signals of different STAs in a same time unit in the Nu time units occupies different pilot subcarriers. First pilot signals of a same STA in different periods occupy a same pilot subcarrier.

Figure 10:
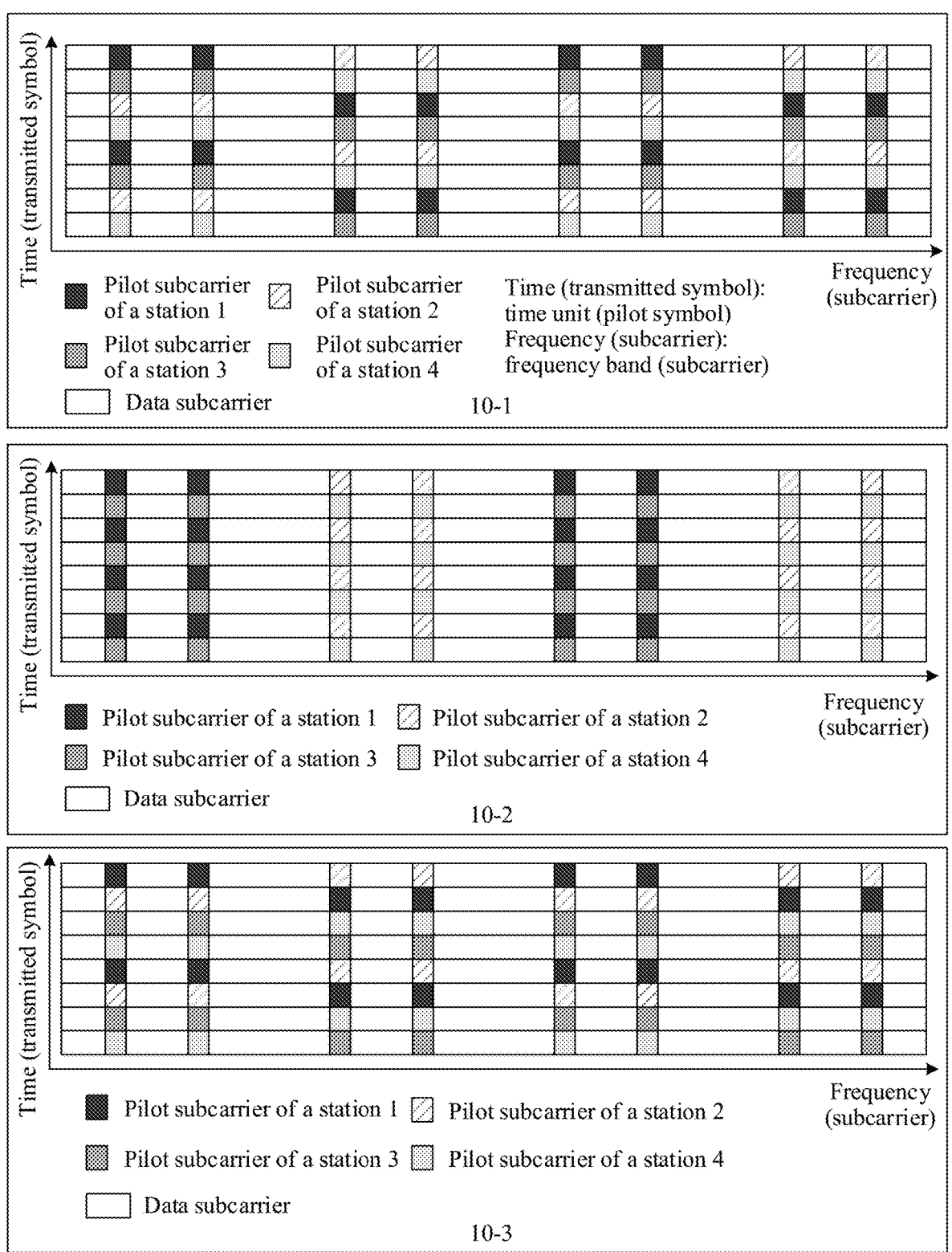
FIG. 10 is a schematic diagram showing that transmitting pilot signals by different STAs is described by using an example in which four stations occupy a discrete 242-tone RU (which is equivalent to a bandwidth of 20 MHz, where the bandwidth of 20 MHz includes a maximum of eight pilot subcarriers) according to an embodiment of this application.

For example, FIG. 10 is a schematic diagram showing that transmitting pilot signals by different STAs is described by using an example in which four stations occupy a discrete 242-tone RU (which is equivalent to a bandwidth of 20 MHz, where the bandwidth of 20 MHz includes a maximum of eight pilot subcarriers) according to an embodiment of this application. Refer to FIG. 10 (FIG. 10 shows only eight pilot subcarriers, and other subcarriers are data subcarriers (white)). In FIG. 10, a horizontal axis represents a first frequency band (a position of a subcarrier), and a vertical axis represents a time unit (eight time units in total from top to bottom). It should be noted that 4 is used as a period in FIG. 10. For example, a first time unit to a fourth time unit (from top to bottom on the vertical axis) in 10-1 in FIG. 10 are one period. In 10-1 in FIG. 10 or 10-3 in FIG. 10, in one period, first pilot signals of a same station in different time units occupy different pilot subcarriers, and a total quantity of pilot subcarriers occupied by the first pilot signals of the same station in four time units is a total quantity of pilot subcarriers included on the first frequency band. As shown in 10-1 in FIG. 10, pilot subcarriers occupied by first pilot signals of a station 1 in a first time unit are different from pilot subcarriers occupied by the first pilot signals of the station 1 in a third time unit, and a total quantity of pilot subcarriers occupied by the first pilot signals of the station 1 in the first time unit and the first pilot signals of the station 1 in the third time unit is 8. In 10-1 in FIG. 10, 10-2 in FIG. 10, or 10-3 in FIG. 10, first pilot signals of different stations in a same time unit occupy different pilot subcarriers. For example, in 10-2 in FIG. 10, in a first time unit, pilot subcarriers occupied by first pilot signals of a station 1 are different from pilot subcarriers occupied by first pilot signals of a station 2. The station 1 sends the first pilot signals of the station 1 on a first, second, fifth, and sixth pilot subcarriers (from left to right on the horizontal axis). The station 2 sends the first pilot signals of the station 2 on a third, fourth, seventh, and eighth pilot subcarriers (from left to right on the horizontal axis). In 10-1 in FIG. 10, 10-2 in FIG. 10, or 10-3 in FIG. 10, first pilot signals of a same STA in different periods occupy same pilot subcarriers. For example, in 10-2 in FIG. 10, in a first period (the first period includes a first time unit to a fourth time unit), a station 1 sends pilot signals on a first, second, fifth, and sixth pilot subcarriers; and in a second period (the second period includes a fifth time unit to an eighth time unit), the station 1 sends pilot signals on the first, second, fifth, and sixth pilot subcarriers.

FIG. 11 is a schematic flowchart of another pilot signal transmission method according to an embodiment of this application. It should be noted that technical problems resolved in FIG. 11 are the same as the technical problems resolved in FIG. 5. Details are not described herein again. As shown in FIG. 11, the method includes but is not limited to the following steps.

1101: A STA determines a first frequency band to which a discrete RU allocated to the STA belongs, where the first frequency band includes pilot subcarriers of a first discrete RU group and pilot subcarriers of a second discrete RU group, and the pilot subcarriers of the first discrete RU group and the pilot subcarriers of the second discrete RU group do not overlap.

A quantity of pilot subcarriers of the first discrete RU group may be the same as or different from a quantity of pilot subcarriers of the second discrete RU group. This is not limited herein. It may be understood that, first pilot signals of another STA may be simultaneously sent on the pilot subcarriers of the first discrete RU group or the second discrete RU group. This is not limited herein.

1102: The STA sends first pilot signals of the STA to an AP on all pilot subcarriers of the first discrete RU group or the second discrete RU group.

Optionally, if a STA group to which the STA belongs corresponds to the first discrete RU group, the STA sends the first pilot signals of the STA to the AP on all the pilot subcarriers of the first discrete RU group. The STA group to which the STA belongs may further include another STA, and the another STA in the STA group to which the STA belongs may send corresponding first pilot signals to the AP on all the pilot subcarriers of the first discrete RU group. If a STA group to which the STA belongs corresponds to the second discrete RU group, the STA sends the first pilot signals of the STA to the AP on all the pilot subcarriers of the second discrete RU group. The STA group to which the STA belongs may further include another STA, and the another STA in the STA group to which the STA belongs may send corresponding first pilot signals to the AP on all the pilot subcarriers of the second discrete RU group.

It should be noted that, in this application, quantities of STAs included in different STA groups may be the same or different. This is not limited herein.

For example, if eight STAs occupy a discrete 242-tone RU (which is equivalent to a bandwidth of 20 MHz, where the bandwidth of 20 MHz includes a maximum of eight pilot subcarriers), the eight STAs are grouped into two groups, each group may include four STAs, and four pilot subcarriers are allocated to each group. For example, from left to right on the first frequency band, a first pilot subcarrier to a fourth pilot subcarrier are allocated to a first group, and a fifth pilot subcarrier to an eighth pilot subcarrier are allocated to a second group. STAs in the first group send pilot signals on the first pilot subcarrier to the fourth pilot subcarrier, and STAs in the second group send pilot signals on the fifth pilot subcarrier to the eighth pilot subcarrier. For another example, from left to right on the first frequency band, a first pilot subcarrier to a sixth pilot subcarrier are allocated to a first group, and a seventh pilot subcarrier and an eighth pilot subcarrier are allocated to a second group. STAs in the first group send pilot signals on the first pilot subcarrier to the sixth pilot subcarrier, and STAs in the second group send pilot signals on the seventh pilot subcarrier and the eighth pilot subcarrier.

Optionally, when the STA sends the first pilot signals of the STA to the AP on all the pilot subcarriers of the first discrete RU group, the first pilot signals of the STA are related to W and $$s_k^t.$$

W is used to control pilot signals transmitted by Nu STAs in Nu time units in the STA group to which the STA belongs.

$$s_k^t$$

represents pilot signals corresponding to the STA on all the pilot subcarriers of the first discrete RU group in a $t^{th}$ time unit. A column quantity of $$s_k^t$$

is a quantity of all the pilot subcarriers included in the first discrete RU group. An $n^{th}$ element in $$s_k^t$$

represents a pilot signal corresponding to the STA on an $n^{th}$ pilot subcarrier included in the first discrete RU group. A column quantity of first pilot signals $q_r$ of Nu STAs is the quantity of all the pilot subcarriers included in the first discrete RU group. The first pilot signals of the Nu STAs are sent on all the pilot subcarriers included in the first discrete RU group. Similarly, when the STA sends second pilot signals of the STA to the AP on all the pilot subcarriers of the second discrete RU group, the first pilot signals of the STA are related to $$W \text{ and } s_k^t.$$

W is used to control pilot signals transmitted by Nu STAs in Nu time units in the STA group to which the STA belongs.

$$s_k^t$$

represents pilot signals corresponding to the STA on all the pilot subcarriers of the second discrete RU group in a $t^{th}$ time unit. A column quantity of $$s_k^t$$

is a quantity of all the pilot subcarriers included in the second discrete RU group. An $n^{th}$ element in $$s_k^t$$

represents a pilot signal corresponding to the STA on an $n^{th}$ pilot subcarrier included in the second discrete RU group. A column quantity of first pilot signals $q_r$ of Nu STAs is the quantity of all the pilot subcarriers included in the second discrete RU group. The second pilot signals of the Nu STAs are sent on all the pilot subcarriers included in the second discrete RU group.

FIG. 12 is a schematic flowchart of a pilot signal demodulation method according to an embodiment of this application. It should be noted that FIG. 12 mainly resolves how to separate pilot signals transmitted by different STAs on a same pilot subcarrier. As shown in FIG. 12, the method includes but is not limited to the following steps.

1201: An AP receives second pilot signals of at least two STAs on all pilot subcarriers included on a first frequency band, where the first frequency band is a frequency band to which discrete RUs allocated to the at least two STAs belong.

For the first frequency band and the discrete RU, refer to the related description of step 501 in FIG. 5. Details are not described herein again.

Frequency bands to which discrete RUs of all the at least two STAs belong are the same, that is, both the frequency bands to which the discrete RUs of all the at least two STAs belong are the first frequency band.

Optionally, second pilot signals X of the at least two STAs satisfy the following formula:

$$X = G[s_1 s_2 s_3 \ldots s_{Nu}]W, \text{ or } X = G[s_1 s_2 s_3 \ldots s_{Nu}]W + Z$$

G represents a channel parameter (channel coefficient). Z represents noise. W satisfies the following formula: $W=[w_1, w_2, \ldots, w_{Nu}]$. $w_x$ represents a column vector, x is an integer greater than or equal to 1 and less than or equal to Nu, and Nu is an integer greater than 1. W is used to control pilot signals transmitted by the at least two STAs in Nu time units. A column index of W is a time unit index, and a row index of W is a device index. A column quantity of $s_k$ is a quantity of all the pilot subcarriers included on the first frequency band. An $n^{th}$ element in $s_k$ represents a pilot signal corresponding to a $k^{th}$ STA in the at least two STAs on an $n^{th}$ pilot subcarrier included on the first frequency band. n is an integer greater than 0 and less than or equal to the column quantity of $s_k$. k is an integer greater than or equal to 1 and less than or equal to Nu. t is an integer greater than or equal to 0, and t represents a time unit index.

In this application, G may be a channel parameter between the STA and the AP.

$s_k$ means that pilot signals sent by the $k^{th}$ STA on all the pilot subcarriers included on the first frequency band in different time units in a same period are the same. For example, $$s_k^0 = s_k^1 = \ldots = s_k^{Nu-1} = s_k.$$

For W, refer to the related description of step 502 in FIG. 5. Details are not described herein again.

1202: The AP processes the second pilot signals of the at least two STAs, to obtain first pilot signals sent by the at least two STAs.

Optionally, the first pilot signals sent by the at least two STAs are $[s_1\ s_2\ s_3\ \ldots\ s_{Nu}]W$.

Optionally, a part of elements of a part or all of column vectors in $[s_1\ s_2\ s_3\ \ldots\ s_{Nu}]$ are set to zero. For example, a part of elements of each column vector in $s_1$ to $s_{Nu}$ are set to zero, or a part of elements of a part of column vectors in $s_1$ to $s_{Nu}$ are set to zero.

The AP may obtain $G^*XW^{-1}=G^*G[s_1\ s_2\ s_3\ \ldots\ s_{Nu}]WW^{-1}$ according to $X=G[s_1\ s_2\ s_3\ \ldots\ s_{Nu}]W$. It may be understood that, $W^{-1}$ may be obtained based on W (W is invertible), so that $G^*XW^{-1}$, $G^*G$, and $WW^{-1}$ may be obtained, and $[s_1\ s_2\ s_3\ \ldots\ s_{Nu}]$ may be further obtained.

Optionally, if W represents an orthogonal matrix, the AP may obtain $G^*XW^*=G^*G[s_1\ s_2\ s_3\ \ldots\ s_{Nu}]WW^*$ according to $X=G[s_1\ s_2\ s_3\ \ldots\ s_{Nu}]W$. W represents an orthogonal matrix, and $WW^*$ represents an identity matrix. Therefore, $G^*XW^*=G^*G[s_1\ s_2\ s_3\ \ldots\ s_{Nu}]$ may be obtained, and $[s_1\ s_2\ s_3\ \ldots\ s_{Nu}]$ may be further obtained.

It can be learned that, in the foregoing technical solution, the AP may receive the second pilot signals of the at least two STAs on all the pilot subcarriers included on the first frequency band, so that the AP may process the second pilot signals of the at least two STAs. In this way, a first pilot signal sent by each STA can be obtained, so that separation of a pilot signal of a single STA is implemented.

Optionally, first pilot signals of one of at least two first STAs occupy different pilot subcarriers in different time units in the Nu time units, and a total quantity of pilot subcarriers occupied by the first pilot signals of the one first device in the Nu time units is a total quantity of pilot subcarriers included on the first frequency band.

FIG. 13 is a schematic flowchart of another pilot signal demodulation method according to an embodiment of this application. It should be noted that FIG. 13 mainly resolves how to separate pilot signals transmitted by different STAs on a same pilot subcarrier. As shown in FIG. 13, the method includes but is not limited to the following steps.

1301: An AP receives second pilot signals of at least two STAs on all pilot subcarriers included in a first discrete RU group or a second discrete RU group, where the first discrete RU group or the second discrete RU group is included on a first frequency band, and the first frequency band is a frequency band to which discrete RUs allocated to the at least two STAs belong.

Frequency bands to which discrete RUs of all the at least two STAs belong are the same, that is, both the frequency bands to which the discrete RUs of all the at least two STAs belong are the first frequency band.

Optionally, if a STA group to which the at least two STAs belong corresponds to the first discrete RU group, the AP receives the second pilot signals of the at least two STAs on all the pilot subcarriers of the first discrete RU group. If a STA group to which the at least two STAs belong corresponds to the second discrete RU group, the AP receives the second pilot signals of the at least two STAs on all the pilot subcarriers of the second discrete RU group.

For the second pilot signals of the at least two STAs, refer to the related description of step 1201 in FIG. 12. Details are not described herein again. A difference lies in that, in FIG. 13, a column quantity of $s_k$ is a quantity of all the pilot subcarriers included in the first discrete RU group, and an $n^{th}$ element in $s_k$ represents a pilot signal corresponding to a $k^{th}$ STA in the at least two STAs on an $n^{th}$ pilot subcarrier included in the first discrete RU group; or a column quantity of $s_k$ is a quantity of all the pilot subcarriers included in the second discrete RU group, and an $n^{th}$ element in $s_k$ represents a pilot signal corresponding to a $k^{th}$ STA in the at least two STAs on an $n^{th}$ pilot subcarrier included in the second discrete RU group.

1302: The AP processes the second pilot signals of the at least two STAs, to obtain first pilot signals sent by the at least two STAs.

For the first discrete RU group and the second discrete RU group, refer to the related description of step 501 in FIG. 5. Details are not described herein again.

Optionally, if a STA group to which the at least two STAs belong corresponds to the first discrete RU group, the AP receives the second pilot signals of the at least two STAs on all the pilot subcarriers of the first discrete RU group. If a STA group to which the at least two STAs belong corresponds to the second discrete RU group, the AP receives the second pilot signals of the at least two STAs on all the pilot subcarriers of the second discrete RU group.

For the first pilot signals sent by the at least two STAs, refer to the related description of step 1202 in FIG. 12. Details are not described herein again.

It can be learned that, in the foregoing technical solution, the AP may receive the second pilot signals of the at least two STAs on all the pilot subcarriers included in the first discrete RU group or the second discrete RU group, so that the AP may process the second pilot signals of the at least two STAs. In this way, a first pilot signal sent by each STA can be obtained, so that separation of a pilot signal of a single STA is implemented.

Figure 14:
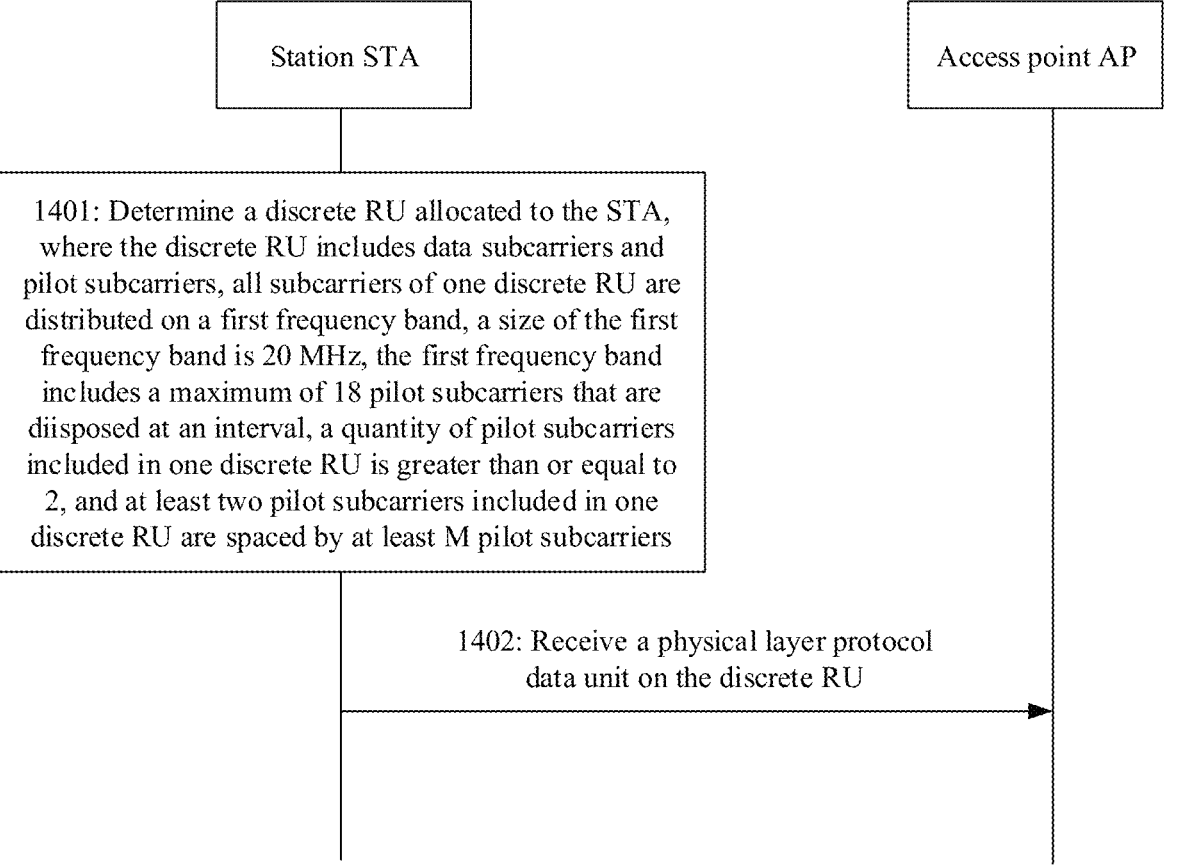
FIG. 14 is a schematic flowchart of a method for sending data in a wireless network according to an embodiment of this application.

It may be understood that, in this application, technical problems mainly resolved in FIG. 14, FIG. 16, and FIG. 17 are the same as the technical problems resolved in FIG. 5. Details are not described herein again.

FIG. 14 is a schematic flowchart of a method for sending data in a wireless network according to an embodiment of this application. As shown in FIG. 14, the method includes but is not limited to the following steps.

1401: A STA determines a discrete RU allocated to the STA, where the discrete RU includes data subcarriers and pilot subcarriers, all subcarriers of one discrete RU are distributed on a first frequency band, a size of the first frequency band is 20 MHz, the first frequency band includes a maximum of 18 pilot subcarriers that are disposed at an interval, a quantity of pilot subcarriers included in one discrete RU is greater than or equal to 2, and at least two pilot subcarriers included in one discrete RU are spaced by at least M pilot subcarriers.

For the discrete RU, refer to the foregoing related description. Details are not described herein again. It may be understood that, in this application, there may be one or more discrete RUs. This is not limited herein.

That the size of the first frequency band is 20 MHz may be understood as that an equivalent RU of the first frequency band is a continuous 242-tone RU. This is not limited herein.

M may be 9.

1402: An AP receives a physical layer protocol data unit (physical protocol data unit, PPDU) on the discrete RU.

band indexes of pilot subcarriers are merely examples. During specific implementation, index numbers of frequency band indexes of pilot subcarriers similar to the examples in this application may alternatively be used. For example, in Table 1, −116, −102, −90, −76, −62, and the like are merely examples, and −117, −103, −91, −77, −63, and the like may alternatively be used. Index numbers of frequency band indexes of pilot subcarriers in another table or description are similar to those described above, and fall within the scope of specific embodiments of this application provided that the index numbers follow an interval rule described in this application. It should be understood that, for ease of description, in this application, sequence indexes that are of pilot subcarriers and that correspond to frequency band indexes of the pilot subcarriers are used to describe some pairing relationships and interval rules that are followed between the frequency band indexes of the pilot subcarriers. This does not indicate that the pilot subcarriers need to be assigned sequence indexes.

TABLE 1

Correspondence between sequence indexes of 18 pilot subcarriers and frequency band indexes of the 18 pilot subcarriers when the size of the first frequency band is 20 MHz

| | Sequence index of a pilot subcarrier | | | | | | | | |
|---|---|---|---|---|---|---|---|---|---|
| | 1 | 2 | 3 | 4 | 5 | 6 | 7 | 8 | 9 |
| Frequency band index of the pilot subcarrier | −116 | −102 | −90 | −76 | −62 | −48 | −36 | −22 | −10 |

| | Sequence index of a pilot subcarrier | | | | | | | | |
|---|---|---|---|---|---|---|---|---|---|
| | 10 | 11 | 12 | 13 | 14 | 15 | 16 | 17 | 18 |
| Frequency band index of the pilot subcarrier | 10 | 22 | 36 | 48 | 62 | 76 | 90 | 102 | 116 |

Correspondingly, the STA sends the PPDU on the discrete RU.

Optionally, step 1402 may include: The AP receives the PPDU from the STA on the discrete RU. Correspondingly, the STA sends the PPDU to the AP on the discrete RU.

It can be learned that, in the foregoing technical solution, all subcarriers of the discrete RU allocated to the STA are distributed on the frequency band of 20 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, sending the PPDU on the discrete RU is also implemented.

Figure 15:
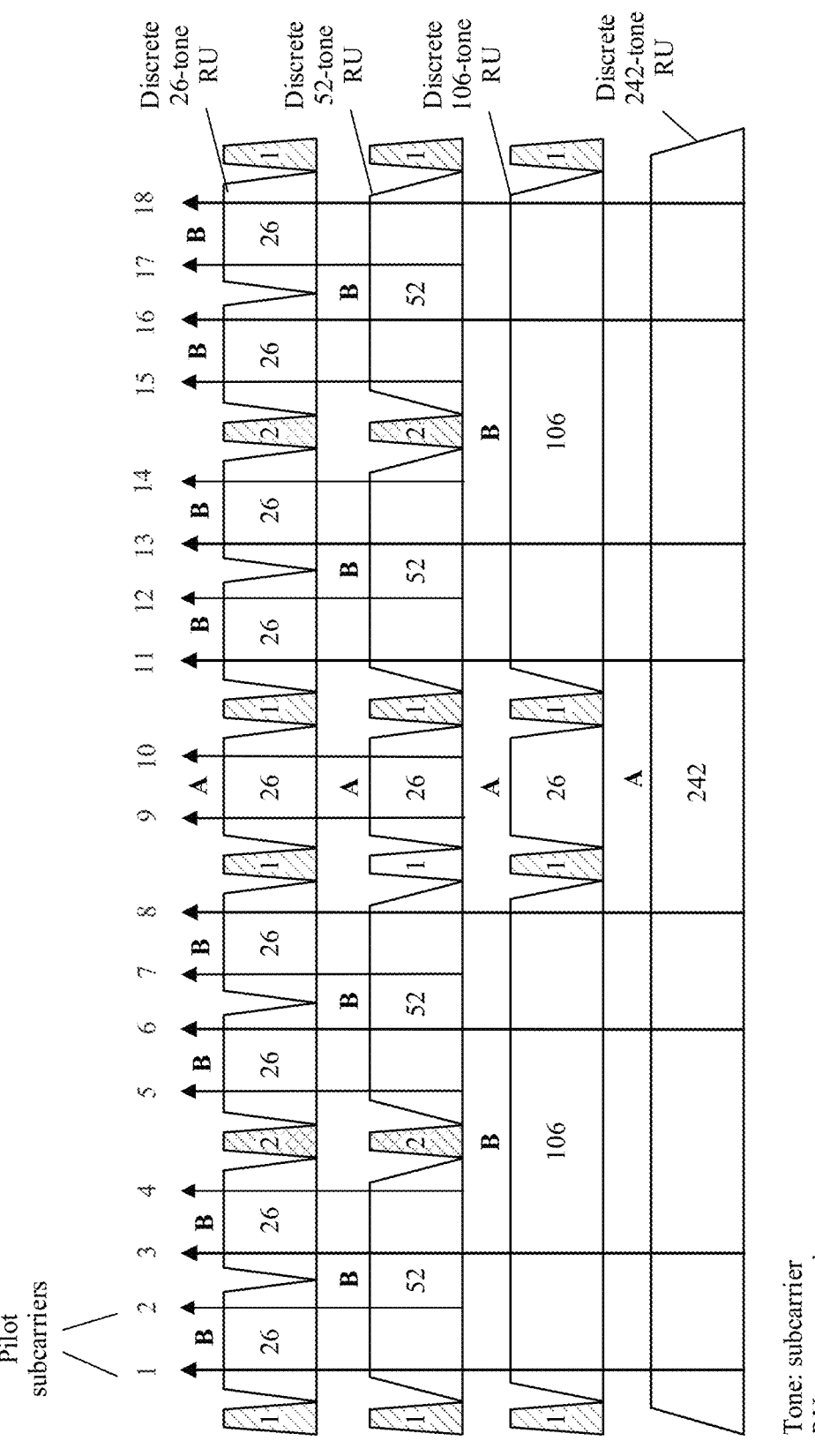
FIG. 15 shows sequence indexes of 18 pilot subcarriers when a size of a first frequency band is 20 MHz.

Optionally, the maximum of 18 pilot subcarriers that are disposed at an interval on the first frequency band are the same as pilot subcarriers in a continuous RU mode. Specifically, refer to Table 1. Table 1 shows indexes of 18 pilot subcarriers when the size of the first frequency band is 20 MHz. In this application, sequence indexes of pilot subcarriers may be indexes of all pilot subcarriers in a frequency band range, and frequency band indexes of pilot subcarriers are real indexes of all subcarriers included in a frequency band range. In addition, it should be noted that, in this application, index numbers enumerated for all frequency The frequency band indexes of the 18 pilot subcarriers in Table 1 are the same as those of the pilot subcarriers in the continuous RU mode. For example, a frequency band index of a first pilot subcarrier from left to right on the first frequency band may be −116, and a frequency band index of a second pilot subcarrier from left to right on the first frequency band may be −102. For frequency band indexes of other pilot subcarriers, refer to Table 1. Details are not described herein again. It may be understood that, the sequence indexes of the 18 pilot subcarriers are in a one-to-one correspondence with the frequency band indexes of the 18 pilot subcarriers. For example, the sequence index 1 of the pilot subcarrier corresponds to the frequency band index −116 of the pilot subcarrier. The sequence indexes of the 18 pilot subcarriers in Table 1 are the sequence numbers of the 18 pilot subcarriers from left to right on the first frequency band when the size of the first frequency band is 20 MHz. For example, FIG. 15 shows sequence indexes of 18 pilot subcarriers when the size of the first frequency band is 20 MHz. As shown in FIG. 15, a sequence index of a first pilot subcarrier from left to right may be 1, and a sequence index of a second pilot subcarrier from left to right may be 2. For sequence indexes of other pilot subcarriers, refer to FIG. 15. Details are not described herein again. It may be understood that, in this application, a sequence index of a pilot subcarrier is a sequence number of the pilot subcarrier from left to right on the first frequency band.

Optionally, one discrete RU corresponds to one continuous RU, one continuous RU includes at least two pilot subcarriers, and there is an intersection set between indexes of pilot subcarriers in the discrete RU and indexes of pilot subcarriers in the continuous RU.

For example, sequence indexes of pilot subcarriers in one discrete RU may be, for example, one of the following: {1, 11}, {2, 12}, {3, 13}, {4, 14}, {5, 15}, {6, 16}, {7, 17}, {8, 18}, or {9, 10}. That is, frequency band indexes of pilot subcarriers in one discrete RU may be, for example, one of the following: {−116, 22}, {−90, 48}, {−62, 76}, {−36, 102}, {−10, 10}, {−102, 36}, {−76, 62}, {−48, 90}, or {−22, 116}. Frequency band indexes of pilot subcarriers in one continuous RU may be, for example, one of the following: {−116, −102}, {−90, −76}, {−62, −48}, {−36, −22}, {−10, 10}, {22, 36}, {48, 62}, {76, 90}, or {102, 116}. If frequency band indexes of pilot subcarriers in one discrete RU are {−116, 22}, and frequency band indexes of pilot subcarriers in a continuous RU corresponding to the discrete RU are {−116, −102}, there is an intersection set between the indexes of the pilot subcarriers in the discrete RU and the indexes of the pilot subcarriers in the continuous RU.

Optionally, the discrete RU is a discrete 26-tone RU, the discrete 26-tone RU includes 24 data subcarriers and two pilot subcarriers, and the two pilot subcarriers are spaced by at least nine pilot subcarriers.

For example, refer to Table 2. Table 2 shows a correspondence that is between a discrete 26-tone RU and sequence indexes of two pilot subcarriers included in the discrete 26-tone RU and that exists when the size of the first frequency band is 20 MHz. It should be noted that, in this application, one discrete RU corresponds to one continuous RU. In other words, there is also a correspondence between one continuous RU and sequence indexes of two pilot subcarriers included in one discrete RU. For example, in Table 2, a discrete 26-tone RU whose index is 1 corresponds to sequence indexes {1, 11} of pilot subcarriers. In this case, a continuous 26-tone RU corresponding to the discrete 26-tone RU whose index is 1 may also correspond to the sequence indexes {1, 11} of the pilot subcarriers.

TABLE 2

Correspondence that is between a discrete 26-tone
RU and sequence indexes of two pilot subcarriers
included in the discrete 26-tone RU and that exists
when the size of the first frequency band is 20 MHz

| Index of a discrete 26-tone RU | Sequence indexes of pilot subcarriers |
|---|---|
| 1 | {1, 11} |
| 2 | {3, 13} |
| 3 | {5, 15} |
| 4 | {7, 17} |
| 5 | {9, 10} |
| 6 | {2, 12} |
| 7 | {4, 14} |
| 8 | {6, 16} |
| 9 | {8, 18} |

With reference to Table 2, it can be learned that, an interval between sequence indexes that are of pilot subcarriers and that correspond to each of other discrete 26-tone RUs except a discrete 26-tone RU whose index is 5 is 10. In other words, two pilot subcarriers included in each of the other discrete 26-tone RUs are spaced by 10 pilot subcarriers. In this application, an index of a discrete 26-tone RU is a sequence number of the discrete 26-tone RU from left to right on the first frequency band. For example, a discrete 26-tone RU whose index is 1 is a first discrete 26-tone RU from left to right on the first frequency band, and a discrete 26-tone RU whose index is 2 is a second discrete 26-tone RU from left to right on the first frequency band. It may be understood that, in this application, specific sequence indexes of pilot subcarriers and that correspond to each of the other discrete 26-tone RUs except the discrete 26-tone RU whose index is 5 are not limited herein. For example, sequence indexes that are of pilot subcarriers and that correspond to the discrete 26-tone RU whose index is 1 may be one of the following: {1, 11}, {2, 12}, {3, 13}, {4, 14}, {5, 15}, {6, 16}, {7, 17}, or {8, 18}; and sequence indexes that are of pilot subcarriers and that correspond to the discrete 26-tone RU whose index is 2 may be one of the following: {1, 11}, {2, 12}, {3, 13}, {4, 14}, {5, 15}, {6, 16}, {7, 17}, or {8, 18}. It should be noted that, in this application, discrete 26-tone RUs whose indexes are different correspond to different sequence indexes of pilot subcarriers. For example, refer to Table 3. Table 3 shows another correspondence that is between a discrete 26-tone RU and sequence indexes of two pilot subcarriers included in the discrete 26-tone RU and that exists when the size of the first frequency band is 20 MHz. With reference to Table 3, it can be learned that, an interval between sequence indexes that are of pilot subcarriers and that correspond to each of other discrete 26-tone RUs except a discrete 26-tone RU whose index is 5 is 10. In other words, two pilot subcarriers included in each of the other discrete 26-tone RUs are spaced by 10 pilot subcarriers.

TABLE 3

Another correspondence that is between a discrete 26-
tone RU and sequence indexes of two pilot subcarriers
included in the discrete 26-tone RU and that exists
when the size of the first frequency band is 20 MHz

| Index of a discrete 26-tone RU | Sequence indexes of pilot subcarriers |
|---|---|
| 1 | {2, 12} |
| 2 | {4, 14} |
| 3 | {6, 16} |
| 4 | {8, 18} |
| 5 | {9, 10} |
| 6 | {1, 11} |
| 7 | {3, 13} |
| 8 | {5, 15} |
| 9 | {7, 17} |

For example, refer to Table 4. Table 4 shows another correspondence that is between a discrete 26-tone RU and sequence indexes of two pilot subcarriers included in the discrete 26-tone RU and that exists when the size of the first frequency band is 20 MHz.

TABLE 4

Another correspondence that is between a discrete 26-
tone RU and sequence indexes of two pilot subcarriers
included in the discrete 26-tone RU and that exists
when the size of the first frequency band is 20 MHz

| Index of a discrete 26-tone RU | Sequence indexes of pilot subcarriers |
|---|---|
| 1 | {1, 10} |
| 2 | {3, 12} |
| 3 | {5, 14} |
| 4 | {7, 16} |
| 5 | {9, 18} |
| 6 | {2, 11} |
| 7 | {4, 13} |
| 8 | {6, 15} |
| 9 | {8, 17} |

With reference to Table 4, it can be learned that, an interval between sequence indexes that are of pilot subcarriers and that correspond to each of nine discrete 26-tone RU indexes is 9. In other words, two pilot subcarriers included in each of the nine discrete 26-tone RUs are spaced by nine pilot subcarriers. It may be understood that, in this application, specific sequence indexes that of pilot subcarriers and that correspond to each of the nine discrete 26-tone RUs are not limited herein. For example, sequence indexes that are of pilot subcarriers and that correspond to a discrete 26-tone RU whose index is 1 may be one of the following: {1, 10}, {2, 11}, {3, 12}, {4, 13}, {5, 14}, {6, 15}, {7, 16}, {8, 17}, or {9, 18}; and sequence indexes that are of pilot subcarriers and that correspond to a discrete 26-tone RU whose index is 2 may be one of the following: {1, 10}, {2, 11}, {3, 12}, {4, 13}, {5, 14}, {6, 15}, {7, 16}, {8, 17}, or {9, 18}. It should be noted that, in this application, discrete 26-tone RUs whose indexes are different correspond to different sequence indexes of pilot subcarriers. For example, refer to Table 5. Table 5 shows another correspondence that is between a discrete 26-tone RU and sequence indexes of two pilot subcarriers included in the discrete 26-tone RU and that exists when the size of the first frequency band is 20 MHz. With reference to Table 5, it can be learned that, an interval between sequence indexes that are of pilot subcarriers and that correspond to each of nine discrete 26-tone RU indexes is 9. In other words, two pilot subcarriers included in each of the nine discrete 26-tone RUs are spaced by nine pilot subcarriers.

TABLE 5

Another correspondence that is between a discrete 26-tone RU and sequence indexes of two pilot subcarriers included in the discrete 26-tone RU and that exists when the size of the first frequency band is 20 MHz

| Index of a discrete 26-tone RU | Sequence indexes of pilot subcarriers |
|---|---|
| 1 | {2, 11} |
| 2 | {4, 13} |
| 3 | {6, 15} |
| 4 | {8, 17} |
| 5 | {1, 10} |
| 6 | {3, 12} |
| 7 | {5, 14} |
| 8 | {7, 16} |
| 9 | {9, 18} |

Optionally, in this application, a quantity of pilot subcarriers by which two pilot subcarriers included in one discrete 26-tone RU on the first frequency band are spaced is not limited. For example, two pilot subcarriers included in one discrete 26-tone RU on the first frequency band may be spaced by 11 pilot subcarriers, or two pilot subcarriers included in one discrete 26-tone RU on the first frequency band may be spaced by eight pilot subcarriers.

Optionally, the discrete RU is a 52-tone RU, the discrete 52-tone RU includes two discrete 26-tone RUs, and pilot subcarriers of the discrete 52-tone RU include a part or all of pilot subcarriers in the two discrete 26-tone RUs.

For example, refer to Table 6. Table 6 shows a correspondence that is between a discrete 52-tone RU and indexes of discrete 26-tone RUs included in the discrete 52-tone RU and that exists when the size of the first frequency band is 20 MHz.

TABLE 6

Correspondence that is between a discrete 52-tone RU and indexes of discrete 26-tone RUs included in the discrete 52-tone RU and that exists when the size of the first frequency band is 20 MHz

| Index of a discrete 52-tone RU | Indexes of two discrete 26-tone RUs |
|---|---|
| 1 | {1, 2} |
| 2 | {3, 4} |
| 3 | {6, 7} |
| 4 | {8, 9} |

With reference to Table 6, it can be learned that, a discrete 52-tone RU whose index is 1 corresponds to discrete 26-tone RUs whose indexes are 1 and 2, a discrete 52-tone RU whose index is 2 corresponds to discrete 26-tone RUs whose indexes are 3 and 4, a discrete 52-tone RU whose index is 3 corresponds to discrete 26-tone RUs whose indexes are 6 and 7, and a discrete 52-tone RU whose index is 4 corresponds to discrete 26-tone RUs whose indexes are 8 and 9. In this application, an index of a discrete 52-tone RU is a sequence number of the discrete 52-tone RU from left to right on the first frequency band. For example, the discrete 52-tone RU whose index is 1 is a first discrete 52-tone RU from left to right on the first frequency band, the discrete 52-tone RU whose index is 2 is a second discrete 52-tone RU from left to right on the first frequency band, and so on. It may be understood that, pilot subcarriers included in the discrete 52-tone RU whose index is 1 may be a subset or a universal set of a union set of pilot subcarriers included in the discrete 26-tone RU whose index is 1 and the discrete 26-tone RU whose index is 2; pilot subcarriers included in the discrete 52-tone RU whose index is 2 may be a subset or a universal set of a union set of pilot subcarriers included in the discrete 26-tone RU whose index is 3 and the discrete 26-tone RU whose index is 4; pilot subcarriers included in the discrete 52-tone RU whose index is 3 may be a subset or a universal set of a union set of pilot subcarriers included in the discrete 26-tone RU whose index is 6 and the discrete 26-tone RU whose index is 7; and pilot subcarriers included in the discrete 52-tone RU whose index is 4 may be a subset or a universal set of a union set of pilot subcarriers included in the discrete 26-tone RU whose index is 8 and the discrete 26-tone RU whose index is 9.

For example, sequence indexes of the pilot subcarriers included in the discrete 52-tone RU whose index is 1 may be, for example, one of the following: {1, 3, 11, 13}, {1, 11}, {3, 13}, or the like. This is not limited herein. In other words, the pilot subcarriers of the discrete 52-tone RU may include a part or all of the pilot subcarriers in the two discrete 26-tone RUs.

Optionally, the discrete RU is a discrete 52-tone RU, the discrete 52-tone RU includes at least 48 data subcarriers, a quantity of pilot subcarriers included in the discrete 52-tone RU is greater than or equal to 2 and is less than or equal to 4, and at least two pilot subcarriers in the maximum of four pilot subcarriers are spaced by at least nine pilot subcarriers.

Optionally, the discrete RU is a discrete 106-tone RU, the discrete 106-tone RU includes four discrete 26-tone RUs, and pilot subcarriers of the discrete 106-tone RU include a part or all of pilot subcarriers in the four discrete 26-tone RUs.

For example, refer to Table 7. Table 7 shows a correspondence that is between a discrete 106-tone RU and indexes of discrete 26-tone RUs included in the discrete 106-tone RU and that exists when the size of the first frequency band is 20 MHz.

TABLE 7

| Correspondence that is between a discrete 106-tone RU and indexes of discrete 26-tone RUs included in the discrete 106-tone RU and that exists when the size of the first frequency band is 20 MHz | |
| --- | --- |
| Index of a discrete 106-tone RU | Indexes of four discrete 26-tone RUs |
| 1 | {1, 2, 3, 4} |
| 2 | {6, 7, 8, 9} |

With reference to Table 7, it can be learned that, a discrete 106-tone RU whose index is 1 corresponds to discrete 26-tone RUs whose indexes are 1, 2, 3, and 4, and a discrete 106-tone RU whose index is 2 corresponds to discrete 26-tone RUs whose indexes are 6, 7, 8, and 9. In this application, an index of a discrete 106-tone RU is a sequence number of the discrete 106-tone RU from left to right on the first frequency band. For example, the discrete 106-tone RU whose index is 1 is a first discrete 106-tone RU from left to right on the first frequency band, the discrete 106-tone RU whose index is 2 is a second discrete 106-tone RU from left to right on the first frequency band, and so on. It may be understood that, pilot subcarriers included in the discrete 106-tone RU whose index is 1 may be a subset or a universal set of a union set of pilot subcarriers included in the discrete 26-tone RU whose index is 1, the discrete 26-tone RU whose index is 2, the discrete 26-tone RU whose index is 3, and the discrete 26-tone RU whose index is 4; and pilot subcarriers included in the discrete 106-tone RU whose index is 2 may be a subset or a universal set of a union set of pilot subcarriers included in the discrete 26-tone RU whose index is 6, the discrete 26-tone RU whose index is 7, the discrete 26-tone RU whose index is 8, and the discrete 26-tone RU whose index is 9.

For example, sequence indexes of the pilot subcarriers included in the discrete 106-tone RU whose index is 1 may be, for example, one of the following: {1, 3, 5, 7, 11, 13, 15, 17}, {1, 3, 11, 13}, or the like. This is not limited herein. In other words, the pilot subcarriers of the discrete 106-tone RU may include a part or all of the pilot subcarriers in the four discrete 26-tone RUs.

Optionally, the discrete RU is a discrete 106-tone RU, the discrete 106-tone RU includes two discrete 52-tone RUs, and pilot subcarriers of the discrete 106-tone RU include a part or all of pilot subcarriers in the two discrete 52-tone RUs.

For example, refer to Table 8. Table 8 shows a correspondence that is between a discrete 106-tone RU and indexes of discrete 52-tone RUs included in the discrete 106-tone RU and that exists when the size of the first frequency band is 20 MHz.

TABLE 8

| Correspondence that is between a discrete 106-tone RU and indexes of discrete 52-tone RUs included in the discrete 106-tone RU and that exists when the size of the first frequency band is 20 MHz | |
| --- | --- |
| Index of a discrete 106-tone RU | Indexes of two discrete 52-tone RUs |
| 1 | {1, 2} |
| 2 | {3, 4} |

With reference to Table 8, it can be learned that, a discrete 106-tone RU whose index is 1 corresponds to discrete 52-tone RUs whose indexes are 1 and 2, and a discrete 106-tone RU whose index is 2 corresponds to discrete 52-tone RUs whose indexes are 3 and 4. It may be understood that, pilot subcarriers included in the discrete 106-tone RU whose index is 1 may be a subset or a universal set of a union set of pilot subcarriers included in the discrete 52-tone RU whose index is 1 and the discrete 52-tone RU whose index is 2; and pilot subcarriers included in the discrete 106-tone RU whose index is 2 may be a subset or a universal set of a union set of pilot subcarriers included in the discrete 52-tone RU whose index is 3 and the discrete 52-tone RU whose index is 4.

For example, sequence indexes of the pilot subcarriers included in the discrete 106-tone RU whose index is 1 may be, for example, one of the following: {1, 3, 5, 7, 11, 13, 15, 17}, {1, 3, 11, 13}, or the like. This is not limited herein. In other words, the pilot subcarriers of the discrete 106-tone RU may include a part or all of the pilot subcarriers in the two discrete 52-tone RUs.

Optionally, the discrete RU is a discrete 106-tone RU, a quantity of data subcarriers included in the discrete 106-tone RU is greater than or equal to 98, a quantity of pilot subcarriers included in the discrete 106-tone RU is greater than or equal to 2 and is less than or equal to 8, and at least two pilot subcarriers in the maximum of eight pilot subcarriers are spaced by at least nine pilot subcarriers.

Optionally, the quantity of data subcarriers included in the discrete 106-tone RU may be, for example, 102, and the quantity of pilot subcarriers included in the discrete 106-tone RU may be, for example, 4. This is not limited herein.

It should be noted that, in this application, based on the one-to-one correspondence between the sequence indexes of the 18 pilot subcarriers and the frequency band indexes of the 18 pilot subcarriers in Table 1, frequency band indexes of pilot subcarriers corresponding to different discrete RUs when the first frequency band is 20 MHz may be obtained.

For example, with reference to Table 2, frequency band indexes of pilot subcarriers corresponding to different discrete RUs when the first frequency band is 20 MHz may be obtained. Specifically, refer to Table 9. Table 9 shows frequency band indexes of pilot subcarriers corresponding to different discrete RUs when the size of the first frequency band is 20 MHz.

TABLE 9

| Frequency band indexes of pilot subcarriers corresponding to different discrete RUs when the size of the first frequency band is 20 MHz | | |
| --- | --- | --- |
| Size of the first frequency band | RU size (size) | Frequency band indexes of pilot subcarriers |
| 20 MHz | First to ninth discrete 26-tone RUs | {−116, 22} {−90, 48} {−62, 76} {−36, 102} {−10, 10} {−102, 36} {−76, 62}{−48, 90} {−22, 116} |
| | First to fourth discrete 52-tone RUs | Subset or universal set of {−116, 22, −90, 48}, subset or universal set of {−62, 76, −36, 102}, subset or universal set of {−102, 36, −76, 62}, and subset or universal set of {−48, 90, −22, 116} |

TABLE 9-continued

Frequency band indexes of pilot subcarriers corresponding to different
discrete RUs when the size of the first frequency band is 20 MHz

| Size of the first frequency band | RU size (size) | Frequency band indexes of pilot subcarriers |
|---|---|---|
| | First and second discrete 106-tone RUs | Subset or universal set of {−116, 22, −90, 48, −62, 76, −36, 102}, and subset or universal set of {−102, 36, −76, 62, −48, 90, −22, 116} |

With reference to Table 9, it can be learned that, frequency band indexes of pilot subcarriers included in the first discrete 26-tone RU (that is, a discrete 26-tone RU whose index is 1) are {−116, 22}, frequency band indexes of pilot subcarriers included in the second discrete 26-tone RU (that is, a discrete 26-tone RU whose index is 2) are {−90, 48}, frequency band indexes of pilot subcarriers included in the third discrete 26-tone RU (that is, a discrete 26-tone RU whose index is 3) are {−62, 76}, and so on. Frequency band indexes of pilot subcarriers included in each of other discrete 26-tone RUs are deducted by analogy. Details are not described herein. Frequency band indexes of pilot subcarriers included in the first discrete 52-tone RU (that is, a discrete 52-tone RU whose index is 1) are a subset or a universal set of {−116, 22, −90, 48}, frequency band indexes of pilot subcarriers included in the second discrete 52-tone RU (that is, a discrete 52-tone RU whose index is 2) are a subset or a universal set of {−62, 76, −36, 102}, and so on. Frequency band indexes of pilot subcarriers included in each of other discrete 52-tone RUs are deducted by analogy. Details are not described herein. Frequency band indexes of pilot subcarriers included in the first discrete 106-tone RU (that is, a discrete 106-tone RU whose index is 1) are a subset or a universal set of {−116, 22, −90, 48, −62, 76, −36, 102}, and frequency band indexes of pilot subcarriers included in the second discrete 106-tone RU (that is, a discrete 106-tone RU whose index is 2) are a subset or a universal set of {−102, 36, −76, 62, −48, 90, −22, 116}.

For example, with reference to Table 3, frequency band indexes of pilot subcarriers corresponding to different discrete RUs when the first frequency band is 20 MHz may be obtained. Specifically, refer to Table 10. Table 10 shows other frequency band indexes of pilot subcarriers corresponding to different discrete RUs when the size of the first frequency band is 20 MHz.

With reference to Table 10, it can be learned that, frequency band indexes of pilot subcarriers included in the first discrete 26-tone RU (that is, a discrete 26-tone RU whose index is 1) are {−102, 36}, frequency band indexes of pilot subcarriers included in the second discrete 26-tone RU (that is, a discrete 26-tone RU whose index is 2) are {−76, 62}, frequency band indexes of pilot subcarriers included in the third discrete 26-tone RU (that is, a discrete 26-tone RU whose index is 3) are {−48, 90}, and so on. Frequency band indexes of pilot subcarriers included in each of other discrete 26-tone RUs are deducted by analogy. Details are not described herein. Frequency band indexes of pilot subcarriers included in the first discrete 52-tone RU (that is, a discrete 52-tone RU whose index is 1) are a subset or a universal set of {−102, 36, −76, 62}, frequency band indexes of pilot subcarriers included in the second discrete 52-tone RU (that is, a discrete 52-tone RU whose index is 2) are a subset or a universal set of {−48, 90, −22, 116}, and so on. Frequency band indexes of pilot subcarriers included in each of other discrete 52-tone RUs are deducted by analogy. Details are not described herein. Frequency band indexes of pilot subcarriers included in the first discrete 106-tone RU (that is, a discrete 106-tone RU whose index is 1) are a subset or a universal set of {−102, 36, −76, 62, −48, 90, −22, 116}, and frequency band indexes of pilot subcarriers included in the second discrete 106-tone RU (that is, a discrete 106-tone RU whose index is 2) are a subset or a universal set of {−116, 22, −90, 48, −62, 76, −36, 102}.

For example, with reference to Table 4, frequency band indexes of pilot subcarriers corresponding to different discrete RUs when the first frequency band is 20 MHz may be obtained. Specifically, refer to Table 11. Table 11 shows other frequency band indexes of pilot subcarriers corresponding to different discrete RUs when the size of the first frequency band is 20 MHz.

TABLE 10

Other frequency band indexes of pilot subcarriers corresponding to different
discrete RUs when the size of the first frequency band is 20 MHz

| Size of the first frequency band | RU size (size) | Frequency band indexes of pilot subcarriers |
|---|---|---|
| 20 MHz | First to ninth discrete 26-tone RUs | {−102, 36} {−76, 62} {−48, 90} {−22, 116} {−10, 10} {−116, 22} {−90, 48} {−62, 76} {−36, 102} |
| | First to fourth discrete 52-tone RUs | Subset or universal set of {−102, 36, −76, 62}, subset or universal set of {−48, 90, −22, 116}, subset or universal set of {−116, 22, −90, 48}, and subset or universal set of {−62, 76, −36, 102} |
| | First and second discrete 106-tone RUs | Subset or universal set of {−102, 36, −76, 62, −48, 90, −22, 116}, and subset or universal set of {−116, 22, −90, 48, −62, 76, −36, 102} |

TABLE 11

| Size of the first frequency band | RU size (size) | Frequency band indexes of pilot subcarriers |
|---|---|---|
| | Other frequency band indexes of pilot subcarriers corresponding to different discrete RUs when the size of the first frequency band is 20 MHz | |
| 20 MHz | First to ninth discrete 26-tone RUs | $\{-116, 10\}$ $\{-90, 36\}$ $\{-62, 62\}$ $\{-36, 90\}$ $\{-10, 116\}$ $\{-102, 22\}\{-76, 48\}$ $\{-48, 76\}$ $\{-22, 102\}$ |
| | First to fourth discrete 52-tone RUs | Subset or universal set of $\{-116, 10, -90, 36\}$, subset or universal set of $\{-62, 62, -36, 90\}$, subset or universal set of $\{-102, 22, -76, 48\}$, and subset or universal set of $\{-48, 76, -22, 102\}$ |
| | First and second discrete 106-tone RUs | Subset or universal set of $\{-116, 10, -90, 36, -62, 62, -36, 90\}$, and subset or universal set of $\{-102, 22, -76, 48, -48, 76, -22, 102\}$ |

With reference to Table 11, it can be learned that, frequency band indexes of pilot subcarriers included in the first discrete 26-tone RU (that is, a discrete 26-tone RU whose index is 1) are $\{-116, 10\}$, frequency band indexes of pilot subcarriers included in the second discrete 26-tone RU (that is, a discrete 26-tone RU whose index is 2) are $\{-90, 36\}$, frequency band indexes of pilot subcarriers included in the third discrete 26-tone RU (that is, a discrete 26-tone RU whose index is 3) are $\{-62, 62\}$, and so on. Frequency band indexes of pilot subcarriers included in each of other discrete 26-tone RUs are deducted by analogy. Details are not described herein. Frequency band indexes of pilot subcarriers included in the first discrete 52-tone RU (that is, a discrete 52-tone RU whose index is 1) are a subset or a universal set of $\{-116, 10, -90, 36\}$, frequency band indexes of pilot subcarriers included in the second discrete 52-tone RU (that is, a discrete 52-tone RU whose index is 2) are a subset or a universal set of $\{-62, 62, -36, 90\}$, and so on. Frequency band indexes of pilot subcarriers included in each of other discrete 52-tone RUs are deducted by analogy. Details are not described herein. Frequency band indexes of pilot subcarriers included in the first discrete 106-tone RU (that is, a discrete 106-tone RU whose index is 1) are a subset or a universal set of $\{-116, 10, -90, 36, -62, 62, -36, 90\}$, and frequency band indexes of pilot subcarriers included in the second discrete 106-tone RU (that is, a discrete 106-tone RU whose index is 2) are a subset or a universal set of $\{-102, 22, -76, 48, -48, 76, -22, 102\}$.

For example, with reference to Table 5, frequency band indexes of pilot subcarriers corresponding to different discrete RUs when the first frequency band is 20 MHz may be obtained. Specifically, refer to Table 12. Table 12 shows other frequency band indexes of pilot subcarriers corresponding to different discrete RUs when the size of the first frequency band is 20 MHz.

With reference to Table 12, it can be learned that, frequency band indexes of pilot subcarriers included in the first discrete 26-tone RU (that is, a discrete 26-tone RU whose index is 1) are $\{-102, 22\}$, frequency band indexes of pilot subcarriers included in the second discrete 26-tone RU (that is, a discrete 26-tone RU whose index is 2) are $\{-76, 48\}$, frequency band indexes of pilot subcarriers included in the third discrete 26-tone RU (that is, a discrete 26-tone RU whose index is 3) are $\{-48, 76\}$, and so on. Frequency band indexes of pilot subcarriers included in each of other discrete 26-tone RUs are deducted by analogy. Details are not described herein. Frequency band indexes of pilot subcarriers included in the first discrete 52-tone RU (that is, a discrete 52-tone RU whose index is 1) are a subset or a universal set of $\{-102, 22, -76, 48\}$, frequency band indexes of pilot subcarriers included in the second discrete 52-tone RU (that is, a discrete 52-tone RU whose index is 2) are a subset or a universal set of $\{-48, 76, -22, 102\}$, and so on. Frequency band indexes of pilot subcarriers included in each of other discrete 52-tone RUs are deducted by analogy. Details are not described herein. Frequency band indexes of pilot subcarriers included in the first discrete 106-tone RU (that is, a discrete 106-tone RU whose index is 1) are a subset or a universal set of $\{-102, 22, -76, 48, -48, 76, -22, 102\}$, and frequency band indexes of pilot subcarriers included in the second discrete 106-tone RU (that is, a discrete 106-tone RU whose index is 2) are a subset or a universal set of $\{-90, 36, -62, 62, -36, 90, -10, 116\}$.

FIG. 16 is a schematic flowchart of another method for sending data in a wireless network according to an embodiment of this application. As shown in FIG. 16, the method includes but is not limited to the following steps.

1601: A STA determines a discrete RU allocated to the STA, where the discrete RU includes data subcarriers and

TABLE 12

| Size of the first frequency band | RU size (size) | Frequency band indexes of pilot subcarriers |
|---|---|---|
| | Other frequency band indexes of pilot subcarriers corresponding to different discrete RUs when the size of the first frequency band is 20 MHz | |
| 20 MHz | First to ninth discrete 26-tone RUs | $\{-102, 22\}$ $\{-76, 48\}$ $\{-48, 76\}$ $\{-22, 102\}$ $\{-116, 10\}$ $\{-90, 36\}$ $\{-62, 62\}$ $\{-36, 90\}$ $\{-10, 116\}$ |
| | First to fourth discrete 52-tone RUs | Subset or universal set of $\{-102, 22, -76, 48\}$, subset or universal set of $\{-48, 76, -22, 102\}$, subset or universal set of $\{-90, 36, -62, 62\}$, and subset or universal set of $\{-36, 90, -10, 116\}$ |
| | First and second discrete 106-tone RUs | Subset or universal set of $\{-102, 22, -76, 48, -48, 76, -22, 102\}$, and subset or universal set of $\{-90, 36, -62, 62, -36, 90, -10, 116\}$ | pilot subcarriers, all subcarriers of one discrete RU are distributed on a first frequency band, a size of the first frequency band is 40 MHz, the first frequency band includes a maximum of 36 pilot subcarriers that are disposed at an interval, a quantity of pilot subcarriers included in one discrete RU is greater than or equal to 2, and at least two pilot subcarriers included in one discrete RU are spaced by at least M pilot subcarriers.

For the discrete RU, refer to the foregoing related description. Details are not described herein again. It may be understood that, in this application, there may be one or more discrete RUs. This is not limited herein.

That the size of the first frequency band is 40 MHz may be understood as that a size of an equivalent RU of the first frequency band is a continuous 484-tone RU. This is not limited herein.

M may be 18.

1602: An AP receives a physical layer protocol data unit (physical protocol data unit, PPDU) on the discrete RU.

Correspondingly, the STA sends the PPDU on the discrete RU.

Optionally, step 1602 may include: The AP receives the PPDU from the STA on the discrete RU. Correspondingly, the STA sends the PPDU to the AP on the discrete RU.

It can be learned that, in the foregoing technical solution, all subcarriers of the discrete RU allocated to the STA are distributed on the frequency band of 40 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, sending the PPDU on the discrete RU is also implemented.

Optionally, the discrete RU is a discrete 26-tone RU, the discrete 26-tone RU includes 24 data subcarriers and two pilot subcarriers, and the two pilot subcarriers are spaced by at least 18 pilot subcarriers.

For example, refer to Table 13. Table 13 shows a correspondence that is between a discrete 26-tone RU and sequence indexes of two pilot subcarriers included in the discrete 26-tone RU and that exists when the size of the first frequency band is 40 MHz.

TABLE 13

Correspondence that is between a discrete 26-tone RU and sequence indexes of two pilot subcarriers included in the discrete 26-tone RU and that exists when the size of the first frequency band is 40 MHz

| Index of a discrete 26-tone RU | Sequence indexes of pilot subcarriers |
|---|---|
| 1 | {1, 19} |
| 2 | {3, 21} |
| 3 | {5, 23} |
| 4 | {7, 25} |
| 5 | {9, 10} |
| 6 | {11, 29} |
| 7 | {13, 31} |
| 8 | {15, 33} |
| 9 | {17, 35} |
| 10 | {2, 20} |
| 11 | {4, 22} |
| 12 | {6, 24} |
| 13 | {8, 26} |
| 14 | {27, 28} |

TABLE 13-continued

Correspondence that is between a discrete 26-tone RU and sequence indexes of two pilot subcarriers included in the discrete 26-tone RU and that exists when the size of the first frequency band is 40 MHz

| Index of a discrete 26-tone RU | Sequence indexes of pilot subcarriers |
|---|---|
| 15 | {12, 30} |
| 16 | {14, 32} |
| 17 | {16, 34} |
| 18 | {18, 36} |

With reference to Table 13, it can be learned that, an interval between sequence indexes that are of pilot subcarriers and that correspond to each of other discrete 26-tone RUs except a discrete 26-tone RU whose index is 5 and a discrete 26-tone RU whose index is 14 is 18. In other words, two pilot subcarriers included in each of the other discrete 26-tone RUs are spaced by 18 pilot subcarriers. It may be understood that, in this application, specific sequence indexes that are of pilot subcarriers and that correspond to each of the other discrete 26-tone RUs except the discrete 26-tone RU whose index is 5 and the discrete 26-tone RU whose index is 14 are not limited herein. For example, sequence indexes that are of pilot subcarriers and that correspond to a discrete 26-tone RU whose index is 1 may be one of the following: {1, 19}, {2, 20}, {3, 21}, {4, 22}, {5, 23}, {6, 24}, {7, 25}, {8, 26}, {11, 29}, {12, 30}, {13, 31}, {14, 32}, {15, 33}, {16, 34}, {17, 35}, or {18, 36}; and sequence indexes that are of pilot subcarriers and that correspond to a discrete 26-tone RU whose index is 2 may be one of the following: {1, 19}, {2, 20}, {3, 21}, {4, 22}, {5, 23}, {6, 24}, {7, 25}, {8, 26}, {11, 29}, {12, 30}, {13, 31}, {14, 32}, {15, 33}, {16, 34}, {17, 35}, or {18, 36}. It should be noted that, in this application, discrete 26-tone RUs whose indexes are different correspond to different sequence indexes of pilot subcarriers. For example, refer to Table 14. Table 14 shows another correspondence that is between a discrete 26-tone RU and sequence indexes of two pilot subcarriers included in the discrete 26-tone RU and that exists when the size of the first frequency band is 40 MHz. With reference to Table 14, it can be learned that, an interval between sequence indexes that are of pilot subcarriers and that correspond to each of other discrete 26-tone RUs except a discrete 26-tone RU whose index is 5 and a discrete 26-tone RU whose index is 14 is 18. In other words, two pilot subcarriers included in each of the other discrete 26-tone RUs are spaced by 18 pilot subcarriers.

TABLE 14

Another correspondence that is between a discrete 26-tone RU and sequence indexes of two pilot subcarriers included in the discrete 26-tone RU and that exists when the size of the first frequency band is 40 MHz

| Index of a discrete 26-tone RU | Sequence indexes of pilot subcarriers |
|---|---|
| 1 | {2, 20} |
| 2 | {4, 22} |
| 3 | {6, 24} |
| 4 | {8, 26} |
| 5 | {9, 10} |
| 6 | {12, 30} |
| 7 | {14, 32} |
| 8 | {16, 34} |
| 9 | {18, 36} |
| 10 | {1, 19} |
| 11 | {3, 21} |

TABLE 14-continued

| Another correspondence that is between a discrete 26-tone RU and sequence indexes of two pilot subcarriers included in the discrete 26-tone RU and that exists when the size of the first frequency band is 40 MHz | |
| --- | --- |
| Index of a discrete 26-tone RU | Sequence indexes of pilot subcarriers |
| 12 | {5, 23} |
| 13 | {7, 25} |
| 14 | {27, 28} |
| 15 | {11, 29} |
| 16 | {13, 31} |
| 17 | {15, 33} |
| 18 | {17, 35} |

For example, refer to Table 15. Table 15 shows another correspondence that is between a discrete 26-tone RU and sequence indexes of two pilot subcarriers included in the discrete 26-tone RU and that exists when the size of the first frequency band is 40 MHz.

TABLE 15

| Another correspondence that is between a discrete 26-tone RU and sequence indexes of two pilot subcarriers included in the discrete 26-tone RU and that exists when the size of the first frequency band is 40 MHz | |
| --- | --- |
| Index of a discrete 26-tone RU | Sequence indexes of pilot subcarriers |
| 1 | {1, 19} |
| 2 | {3, 21} |
| 3 | {5, 23} |
| 4 | {7, 25} |
| 5 | {9, 27} |
| 6 | {11, 29} |
| 7 | {13, 31} |
| 8 | {15, 33} |
| 9 | {17, 35} |
| 10 | {2, 20} |
| 11 | {4, 22} |
| 12 | {6, 24} |
| 13 | {8, 26} |
| 14 | {10, 28} |
| 15 | {12, 30} |
| 16 | {14, 32} |
| 17 | {16, 34} |
| 18 | {18, 36} |

With reference to Table 15, it can be learned that, an interval between sequence indexes that are of pilot subcarriers and that correspond to each of 18 discrete 26-tone RU indexes is 18. In other words, two pilot subcarriers included in each of the 18 discrete 26-tone RUs are spaced by 18 pilot subcarriers. It may be understood that, in this application, specific sequence indexes that of pilot subcarriers and that correspond to each of the 18 discrete 26-tone RUs are not limited herein. For example, sequence indexes that are of pilot subcarriers and that correspond to a discrete 26-tone RU whose index is 1 may be one of the following: {1, 19}, {2, 20}, {3, 21}, {4, 22}, {5, 23}, {6, 24}, {7, 25}, {8, 26}, {9, 27}, {10, 28}, {11, 29}, {12, 30}, {13, 31}, {14, 32}, {15, 33}, {16, 34}, {17, 35}, or {18, 36}; and sequence indexes that are of pilot subcarriers and that correspond to a discrete 26-tone RU whose index is 2 may be one of the following: {1, 19}, {2, 20}, {3, 21}, {4, 22}, {5, 23}, {6, 24}, {7, 25}, {8, 26}, {9, 27}, {10, 28}, {11, 29}, {12, 30}, {13, 31}, {14, 32}, {15, 33}, {16, 34}, {17, 35}, or {18, 36}. It should be noted that, in this application, discrete 26-tone RUs whose indexes are different correspond to different sequence indexes of pilot subcarriers. For example, refer to Table 16. Table 16 shows another correspondence that is between a discrete 26-tone RU and sequence indexes of two pilot subcarriers included in the discrete 26-tone RU and that exists when the size of the first frequency band is 40 MHz. With reference to Table 16, it can be learned that, an interval between sequence indexes that are of pilot subcarriers and that correspond to each of 18 discrete 26-tone RU indexes is 18. In other words, two pilot subcarriers included in each of the 18 discrete 26-tone RUs are spaced by 18 pilot subcarriers.

TABLE 16

| Another correspondence that is between a discrete 26-tone RU and sequence indexes of two pilot subcarriers included in the discrete 26-tone RU and that exists when the size of the first frequency band is 40 MHz | |
| --- | --- |
| Index of a discrete 26-tone RU | Sequence indexes of pilot subcarriers |
| 1 | {2, 20} |
| 2 | {4, 22} |
| 3 | {6, 24} |
| 4 | {8, 26} |
| 5 | {10, 28} |
| 6 | {12, 30} |
| 7 | {14, 32} |
| 8 | {16, 34} |
| 9 | {18, 36} |
| 10 | {1, 19} |
| 11 | {3, 21} |
| 12 | {5, 23} |
| 13 | {7, 25} |
| 14 | {9, 27} |
| 15 | {11, 29} |
| 16 | {13, 31} |
| 17 | {15, 33} |
| 18 | {17, 35} |

Optionally, in this application, a quantity of pilot subcarriers by which two pilot subcarriers included in one discrete 26-tone RU on the first frequency band are spaced is not limited. For example, two pilot subcarriers included in one discrete 26-tone RU on the first frequency band may be spaced by 16 pilot subcarriers, two pilot subcarriers included in one discrete 26-tone RU on the first frequency band may be spaced by 17 pilot subcarriers, two pilot subcarriers included in one discrete 26-tone RU on the first frequency band may be spaced by 19 pilot subcarriers, or two pilot subcarriers included in one discrete 26-tone RU on the first frequency band may be spaced by 20 pilot subcarriers.

Optionally, the discrete RU is a discrete 52-tone RU, the discrete 52-tone RU includes two discrete 26-tone RUs, and pilot subcarriers of the discrete 52-tone RU include a part or all of pilot subcarriers in the two discrete 26-tone RUs.

For example, refer to Table 17. Table 17 shows a correspondence that is between a discrete 52-tone RU and indexes of discrete 26-tone RUs included in the discrete 52-tone RU and that exists when the size of the first frequency band is 40 MHz.

TABLE 17

| Correspondence that is between a discrete 52-tone RU and indexes of discrete 26-tone RUs included in the discrete 52-tone RU and that exists when the size of the first frequency band is 40 MHz | |
| --- | --- |
| Index of a discrete 52-tone RU | Indexes of two discrete 26-tone RUs |
| 1 | {1, 2} |
| 2 | {3, 4} |
| 3 | {6, 7} |
| 4 | {8, 9} |
| 5 | {10, 11} |

TABLE 17-continued

Correspondence that is between a discrete 52-tone RU and indexes
of discrete 26-tone RUs included in the discrete 52-tone RU and
that exists when the size of the first frequency band is 40 MHz

| Index of a discrete 52-tone RU | Indexes of two discrete 26-tone RUs |
|---|---|
| 6 | {12, 13} |
| 7 | {15, 16} |
| 8 | {17, 18} |

With reference to Table 17, it can be learned that, a discrete 52-tone RU whose index is 1 corresponds to discrete 26-tone RUs whose indexes are 1 and 2, a discrete 52-tone RU whose index is 2 corresponds to discrete 26-tone RUs whose indexes are 3 and 4, a discrete 52-tone RU whose index is 3 corresponds to discrete 26-tone RUs whose indexes are 6 and 7, and a discrete 52-tone RU whose index is 4 corresponds to discrete 26-tone RUs whose indexes are 8 and 9. Other discrete 52-tone RUs are deducted by analogy. Details are not described herein. It may be understood that, pilot subcarriers included in the discrete 52-tone RU whose index is 1 may be a subset or a universal set of a union set of pilot subcarriers included in the discrete 26-tone RU whose index is 1 and the discrete 26-tone RU whose index is 2; pilot subcarriers included in the discrete 52-tone RU whose index is 2 may be a subset or a universal set of a union set of pilot subcarriers included in the discrete 26-tone RU whose index is 3 and the discrete 26-tone RU whose index is 4; pilot subcarriers included in the discrete 52-tone RU whose index is 3 may be a subset or a universal set of a union set of pilot subcarriers included in the discrete 26-tone RU whose index is 6 and the discrete 26-tone RU whose index is 7; and pilot subcarriers included in the discrete 52-tone RU whose index is 4 may be a subset or a universal set of a union set of pilot subcarriers included in the discrete 26-tone RU whose index is 8 and the discrete 26-tone RU whose index is 9. Pilot subcarriers included in each of other discrete 52-tone RUs are deducted by analogy. Details are not described herein.

For example, sequence indexes of the pilot subcarriers included in the discrete 52-tone RU whose index is 1 may be, for example, one of the following: {1, 3, 19, 21}, {1, 19}, {3, 21}, {1, 21}, {3, 19}, or the like. This is not limited herein. In other words, the pilot subcarriers of the discrete 52-tone RU may include a part or all of the pilot subcarriers in the two discrete 26-tone RUs.

Optionally, the discrete RU is a discrete 52-tone RU, the discrete 52-tone RU includes at least 48 data subcarriers, a quantity of pilot subcarriers included in the discrete 52-tone RU is greater than or equal to 2 and is less than or equal to 4, and at least two pilot subcarriers in the maximum of four pilot subcarriers are spaced by at least 18 pilot subcarriers.

Optionally, the discrete RU is a discrete 106-tone RU, the discrete 106-tone RU includes four discrete 26-tone RUs, and pilot subcarriers of the discrete 106-tone RU include a part or all of pilot subcarriers in the four discrete 26-tone RUs.

For example, refer to Table 18. Table 18 shows a correspondence that is between a discrete 106-tone RU and indexes of discrete 26-tone RUs included in the discrete 106-tone RU and that exists when the size of the first frequency band is 40 MHz.

TABLE 18

Correspondence that is between a discrete 106-tone RU and indexes
of discrete 26-tone RUs included in the discrete 106-tone RU and
that exists when the size of the first frequency band is 40 MHz

| Index of a discrete 106-tone RU | Indexes of four discrete 26-tone RUs |
|---|---|
| 1 | {1, 2, 3, 4} |
| 2 | {6, 7, 8, 9} |
| 3 | {10, 11, 12, 13} |
| 4 | {15, 16, 17, 18} |

With reference to Table 18, it can be learned that, a discrete 106-tone RU whose index is 1 corresponds to discrete 26-tone RUs whose indexes are 1, 2, 3, and 4, and a discrete 106-tone RU whose index is 2 corresponds to discrete 26-tone RUs whose indexes are 6, 7, 8, and 9. Other discrete 106-tone RUs are deducted by analogy. Details are not described herein. It may be understood that, pilot subcarriers included in the discrete 106-tone RU whose index is 1 may be a subset or a universal set of a union set of pilot subcarriers included in the discrete 26-tone RU whose index is 1, the discrete 26-tone RU whose index is 2, the discrete 26-tone RU whose index is 3, and the discrete 26-tone RU whose index is 4; and pilot subcarriers included in the discrete 106-tone RU whose index is 2 may be a subset or a universal set of a union set of pilot subcarriers included in the discrete 26-tone RU whose index is 6, the discrete 26-tone RU whose index is 7, the discrete 26-tone RU whose index is 8, and the discrete 26-tone RU whose index is 9. Pilot subcarriers included in each of other discrete 106-tone RUs are deducted by analogy. Details are not described herein.

For example, sequence indexes of the pilot subcarriers included in the discrete 106-tone RU whose index is 1 may be, for example, one of the following: {1, 3, 5, 7, 19, 21, 23, 25}, {1, 3, 19, 21}, {5, 7, 23, 25}, {1, 5, 19, 23}, {3, 7, 21, 25}, {1, 7, 19, 25}, {3, 5, 21, 23}, or the like. This is not limited herein. In other words, the pilot subcarriers of the discrete 106-tone RU may include a part or all of the pilot subcarriers in the four discrete 26-tone RUs.

Optionally, the discrete RU is a discrete 106-tone RU, the discrete 106-tone RU includes two discrete 52-tone RUs, and pilot subcarriers of the discrete 106-tone RU include a part or all of pilot subcarriers in the two discrete 52-tone RUs.

For example, refer to Table 19. Table 19 shows a correspondence that is between a discrete 106-tone RU and indexes of discrete 52-tone RUs included in the discrete 106-tone RU and that exists when the size of the first frequency band is 40 MHz.

TABLE 19

Correspondence that is between a discrete 106-tone RU and indexes
of discrete 52-tone RUs included in the discrete 106-tone RU and
that exists when the size of the first frequency band is 40 MHz

| Index of a discrete 106-tone RU | Indexes of two discrete 52-tone RUs |
|---|---|
| 1 | {1, 2} |
| 2 | {3, 4} |
| 3 | {5, 6} |
| 4 | {7, 8} |

With reference to Table 19, it can be learned that, a discrete 106-tone RU whose index is 1 corresponds to discrete 52-tone RUs whose indexes are 1 and 2, and a discrete 106-tone RU whose index is 2 corresponds to discrete 52-tone RUs whose indexes are 3 and 4. Other discrete 106-tone RUs are deducted by analogy. Details are not described herein. It may be understood that, pilot subcarriers included in the discrete 106-tone RU whose index is 1 may be a subset or a universal set of a union set of pilot subcarriers included in the discrete 52-tone RU whose index is 1 and the discrete 52-tone RU whose index is 2; and pilot subcarriers included in the discrete 106-tone RU whose index is 2 may be a subset or a universal set of a union set of pilot subcarriers included in the discrete 52-tone RU whose index is 3 and the discrete 52-tone RU whose index is 4. Pilot subcarriers included in each of other discrete 106-tone RUs are deducted by analogy. Details are not described herein.

For example, sequence indexes of the pilot subcarriers included in the discrete 106-tone RU whose index is 1 may be, for example, one of the following: $\{1, 3, 5, 7, 19, 21, 23, 25\}$, $\{1, 3, 19, 21\}$, $\{5, 7, 23, 25\}$, $\{1, 5, 19, 23\}$, $\{3, 7, 21, 25\}$, $\{1, 7, 19, 25\}$, $\{3, 5, 21, 23\}$, or the like. This is not limited herein. In other words, the pilot subcarriers of the discrete 106-tone RU may include a part or all of the pilot subcarriers in the two discrete 52-tone RUs.

Optionally, the discrete RU is a discrete 106-tone RU, a quantity of data subcarriers included in the discrete 106-tone RU is greater than or equal to 98, a quantity of pilot subcarriers included in the discrete 106-tone RU is greater than or equal to 2 and is less than or equal to 8, and at least two pilot subcarriers in the maximum of eight pilot subcarriers are spaced by at least 18 pilot subcarriers.

Optionally, the quantity of data subcarriers included in the discrete 106-tone RU may be, for example, 102, and the quantity of pilot subcarriers included in the discrete 106-tone RU may be, for example, 4. This is not limited herein.

Optionally, the discrete RU is a discrete 242-tone RU, the discrete 242-tone RU includes two discrete 106-tone RUs, and pilot subcarriers of the discrete 242-tone RU include a part or all of pilot subcarriers in the two discrete 106-tone RUs.

For example, refer to Table 20. Table 20 shows a correspondence that is between a discrete 242-tone RU and indexes of discrete 106-tone RUs included in the discrete 242-tone RU and that exists when the size of the first frequency band is 40 MHz.

TABLE 20

| Correspondence that is between a discrete 242-tone RU and indexes of discrete 106-tone RUs included in the discrete 242-tone RU and that exists when the size of the first frequency band is 40 MHz | |
| --- | --- |
| Index of a discrete 242-tone RU | Indexes of two discrete 106-tone RUs |
| 1 | $\{1, 2\}$ |
| 2 | $\{3, 4\}$ |

With reference to Table 20, it can be learned that, a discrete 242-tone RU whose index is 1 corresponds to discrete 106-tone RUs whose indexes are 1 and 2, and a discrete 242-tone RU whose index is 2 corresponds to discrete 106-tone RUs whose indexes are 3 and 4. It may be understood that, pilot subcarriers included in the discrete 242-tone RU whose index is 1 may be a subset or a universal set of a union set of pilot subcarriers included in the discrete 106-tone RU whose index is 1 and the discrete 106-tone RU whose index is 2; and pilot subcarriers included in the discrete 242-tone RU whose index is 2 may be a subset or a universal set of a union set of pilot subcarriers included in the discrete 106-tone RU whose index is 3 and the discrete 106-tone RU whose index is 4.

For example, sequence indexes of the pilot subcarriers included in the discrete 242-tone RU whose index is 1 may be, for example, one of the following: $\{1, 3, 5, 7, 9, 10, 11, 13, 15, 17, 19, 21, 23, 25, 29, 31, 33, 35\}$, $\{1, 3, 5, 7, 11, 13, 15, 17, 19, 21, 23, 25, 29, 31, 33, 35\}$, $\{1, 3, 5, 7, 19, 21, 23, 25\}$, $\{11, 13, 15, 17, 29, 31, 33, 35\}$, $\{1, 3, 11, 13, 19, 21, 29, 31\}$, $\{5, 7, 15, 17, 23, 25, 33, 35\}$, $\{1, 5, 11, 15, 19, 23, 29, 33\}$, $\{3, 7, 13, 17, 21, 25, 31, 35\}$, $\{1, 7, 11, 17, 19, 25, 29, 35\}$, $\{3, 5, 13, 15, 21, 23, 31, 33\}$, or the like. This is not limited herein. In other words, the pilot subcarriers of the discrete 242-tone RU may include a part or all of the pilot subcarriers in the two discrete 106-tone RUs.

Optionally, the discrete RU is a discrete 242-tone RU, the discrete 242-tone RU includes four discrete 52-tone RUs, and pilot subcarriers of the discrete 242-tone RU include a part or all of pilot subcarriers in the four discrete 52-tone RUs.

Optionally, the discrete RU is a discrete 242-tone RU, the discrete 242-tone RU includes eight discrete 26-tone RUs, and pilot subcarriers of the discrete 242-tone RU include a part or all of pilot subcarriers in the eight discrete 26-tone RUs.

Optionally, the discrete RU is a discrete 242-tone RU, a quantity of data subcarriers included in the discrete 242-tone RU is greater than or equal to 224, a quantity of pilot subcarriers included in the discrete 242-tone RU is greater than or equal to 2 and is less than or equal to 18, and at least two pilot subcarriers in the maximum of 18 pilot subcarriers are spaced by at least 18 pilot subcarriers.

Optionally, the quantity of pilot subcarriers included in the discrete 242-tone RU may be, for example, 8. This is not limited herein.

It should be noted that, in this application, based on a one-to-one correspondence between sequence indexes of 36 pilot subcarriers and frequency band indexes of the 36 pilot subcarriers, frequency band indexes of pilot subcarriers corresponding to different discrete RUs when the first frequency band is 40 MHz may be obtained.

Refer to Table 21. Table 21 shows a correspondence between sequence indexes of 36 pilot subcarriers and frequency band indexes of the 36 pilot subcarriers when the size of the first frequency band is 40 MHz. For example, a sequence index 1 of a pilot subcarrier corresponds to a frequency band index −238 of the pilot subcarrier.

TABLE 21

| Correspondence between sequence indexes of 36 pilot subcarriers and frequency band indexes of the 36 pilot subcarriers when the size of the first frequency band is 40 MHz | | | | | | | | |
| --- | --- | --- | --- | --- | --- | --- | --- | --- |
| Sequence index of a pilot subcarrier | | | | | | | | |
| 1 | 2 | 3 | 4 | 5 | 6 | 7 | 8 | 9 |
| Frequency band index of the pilot subcarrier |
| −238 | −224 | −212 | −198 | −184 | −170 | −158 | −144 | −130 |

TABLE 21-continued

Correspondence between sequence indexes of 36 pilot subcarriers and frequency band indexes
of the 36 pilot subcarriers when the size of the first frequency band is 40 MHz

| | Sequence index of a pilot subcarrier | | | | | | | | |
|---|---|---|---|---|---|---|---|---|---|
| | 10 | 11 | 12 | 13 | 14 | 15 | 16 | 17 | 18 |
| Frequency band index of the pilot subcarrier | −116 | −104 | −90 | −78 | −64 | −50 | −36 | −24 | −10 |

| | Sequence index of a pilot subcarrier | | | | | | | | |
|---|---|---|---|---|---|---|---|---|---|
| | 19 | 20 | 21 | 22 | 23 | 24 | 25 | 26 | 27 |
| Frequency band index of the pilot subcarrier | 10 | 24 | 36 | 50 | 64 | 78 | 90 | 104 | 116 |

| | Sequence index of a pilot subcarrier | | | | | | | | |
|---|---|---|---|---|---|---|---|---|---|
| | 28 | 29 | 30 | 31 | 32 | 33 | 34 | 35 | 36 |
| Frequency band index of the pilot subcarrier | 130 | 144 | 158 | 170 | 184 | 198 | 212 | 224 | 238 |

For example, with reference to Table 13 or Table 15, frequency band indexes of pilot subcarriers corresponding to different discrete RUs when the first frequency band is 40 MHz may be obtained. Specifically, refer to Table 22. Table 22 shows frequency band indexes of pilot subcarriers corresponding to different discrete RUs when the size of the first frequency band is 40 MHz.

whose index is 3) are {−184, 64}, and so on. Frequency band indexes of pilot subcarriers included in each of other discrete 26-tone RUs are deducted by analogy. Details are not described herein. Frequency band indexes of pilot subcarriers included in the first discrete 52-tone RU (that is, a discrete 52-tone RU whose index is 1) are a subset or a universal set of {−238, 10, −212, 36}, frequency band

TABLE 22

Frequency band indexes of pilot subcarriers corresponding to different
discrete RUs when the size of the first frequency band is 40 MHz

| Size of the first frequency band | RU size (size) | Frequency band indexes of pilot subcarriers |
|---|---|---|
| 40 MHz | First to 18th discrete 26-tone RUs | {−238, 10} {−212, 36} {−184, 64} {−158, 90} {−130, −116} {−104, 144} {−78, 170} {−50, 198} {−24, 224} {−224, 24} {−198, 50} {−170, 78} {−144, 104} {116, 130} {−90, 158} {−64, 184} {−36, 212} {−10, 238} |
| | First to eighth discrete 52-tone RUs | Subset or universal set of {−238, 10, −212, 36}, subset or universal set of {−184, 64, −158, 90}, subset or universal set of {−104, 144, −78, 170}, subset or universal set of {−50, 198, −24, 224}, subset or universal set of {−224, 24, −198, 50}, subset or universal set of {−170, 78, −144, 104}, subset or universal set of {−90, 158, −64, 184}, and subset or universal set of {−36, 212, −10, 238} |
| | First to fourth discrete 106-tone RUs | Subset or universal set of {−238, 10, −212, 36, −184, 64, −158, 90}, subset or universal set of {−104, 144, −78, 170, −50, 198, −24, 224}, subset or universal set of {−224, 24, −198, 50, −170, 78, −144, 104}, and subset or universal set of {−90, 158, −64, 184, −36, 212, −10, 238} |
| | First and second discrete 242-tone RUs | Subset or universal set of {−238, 10, −212, 36, −184, 64, −158, 90, −130, −116, −104, 144, −78, 170, −50, 198, −24, 224}, and subset or universal set of {−224, 24, −198, 50, −170, 78, −144, 104, 116, 130, −90, 158, −64, 184, −36, 212, −10, 238} |

With reference to Table 22, it can be learned that, frequency band indexes of pilot subcarriers included in the first discrete 26-tone RU (that is, a discrete 26-tone RU whose index is 1) are {−238, 10}, frequency band indexes of pilot subcarriers included in the second discrete 26-tone RU (that is, a discrete 26-tone RU whose index is 2) are {−212, 36}, frequency band indexes of pilot subcarriers included in the third discrete 26-tone RU (that is, a discrete 26-tone RU indexes of pilot subcarriers included in the second discrete 52-tone RU (that is, a discrete 52-tone RU whose index is 2) are a subset or a universal set of {−184, 64, −158, 90}, and so on. Frequency band indexes of pilot subcarriers included in each of other discrete 52-tone RUs are deducted by analogy. Details are not described herein. Frequency band indexes of pilot subcarriers included in the first discrete 106-tone RU (that is, a discrete 106-tone RU whose index is 1) are a subset or a universal set of {−238, 10, −212, 36, −184, 64, −158, 90}, frequency band indexes of pilot subcarriers included in the second discrete 106-tone RU (that is, a discrete 106-tone RU whose index is 2) are a subset or a universal set of {−104, 144, −78, 170, −50, 198, −24, 224}, and so on. Frequency band indexes of pilot subcarriers included in each of other discrete 106-tone RUs are deducted by analogy. Details are not described herein. Frequency band indexes of pilot subcarriers included in the first discrete 242-tone RU (that is, a discrete 242-tone RU whose index is 1) are a subset or a universal set of {−238, 10, −212, 36, −184, 64, −158, 90, −130, −116, −104, 144, −78, 170, −50, 198, −24, 224}, frequency band indexes of pilot subcarriers included in the second discrete 242-tone RU (that is, a discrete 242-tone RU whose index is 2) are a subset or a universal set of {−224, 24, −198, 50, −170, 78, −144, 104, 116, 130, −90, 158, −64, 184, −36, 212, −10, 238}, and so on. Frequency band indexes of pilot subcarriers included in each of other discrete 242-tone RUs are deducted by analogy. Details are not described herein.

For example, with reference to Table 14 or Table 16, frequency band indexes of pilot subcarriers corresponding to different discrete RUs when the first frequency band is 40 MHz may be obtained. Specifically, refer to Table 23. Table 23 shows other frequency band indexes of pilot subcarriers corresponding to different discrete RUs when the size of the first frequency band is 40 MHz.

26-tone RUs are deducted by analogy. Details are not described herein. Frequency band indexes of pilot subcarriers included in the first discrete 52-tone RU (that is, a discrete 52-tone RU whose index is 1) are a subset or a universal set of {−224, 24, −198, 50}, frequency band indexes of pilot subcarriers included in the second discrete 52-tone RU (that is, a discrete 52-tone RU whose index is 2) are a subset or a universal set of {−170, 78, −144, 104}, and so on. Frequency band indexes of pilot subcarriers included in each of other discrete 52-tone RUs are deducted by analogy. Details are not described herein. Frequency band indexes of pilot subcarriers included in the first discrete 106-tone RU (that is, a discrete 106-tone RU whose index is 1) are a subset or a universal set of {−224, 24, −198, 50, −170, 78, −144, 104}, frequency band indexes of pilot subcarriers included in the second discrete 106-tone RU (that is, a discrete 106-tone RU whose index is 2) are a subset or a universal set of {−90, 158, −64, 184, −36, 212, −10, 238}, and so on. Frequency band indexes of pilot subcarriers included in each of other discrete 106-tone RUs are deducted by analogy. Details are not described herein. Frequency band indexes of pilot subcarriers included in the first discrete 242-tone RU (that is, a discrete 242-tone RU whose index is 1) are a subset or a universal set of {−224, 24, −198, 50, −170, 78, −144, 104, 116, 130, −90, 158, −64, 184, −36, 212, −10, 238}, and frequency band indexes of pilot subcarriers included in the second discrete 242-tone RU (that is, a discrete 242-tone RU whose index is 2) are a

TABLE 23

Other frequency band indexes of pilot subcarriers corresponding to different
discrete RUs when the size of the first frequency band is 40 MHz

| Size of the first frequency band | RU size (size) | Frequency band indexes of pilot subcarriers |
|---|---|---|
| 40 MHz | First to 18th discrete 26-tone RUs | {−224, 24} {−198, 50} {−170, 78} {−144, 104} {−130, −116} {−90, 158} {−64, 184} {−36, 212} {−10, 238} {−238, 10} {−212, 36} {−184, 64} {−158, 90} {116, 130} {−104, 144} {−78, 170} {−50, 198} {−24, 224} |
| | First to eighth discrete 52-tone RUs | Subset or universal set of {−224, 24, −198, 50}, subset or universal set of {−170, 78, −144, 104}, subset or universal set of {−90, 158, −64, 184}, subset or universal set of {−36, 212, −10, 238}, subset or universal set of {−238, 10, −212, 36}, subset or universal set of {−184, 64, −158, 90}, subset or universal set of {−104, 144, −78, 170}, and subset or universal set of {−50, 198, −24, 224} |
| | First to fourth discrete 106-tone RUs | Subset or universal set of {−224, 24, −198, 50, −170, 78, −144, 104}, subset or universal set of {−90, 158, −64, 184, −36, 212, −10, 238}, subset or universal set of {−238, 10, −212, 36, −184, 64, −158, 90}, and subset or universal set of {−104, 144, −78, 170, −50, 198, −24, 224} |
| | First and second discrete 242-tone RUs | Subset or universal set of {−224, 24, −198, 50, −170, 78, −144, 104, 116, 130, −90, 158, −64, 184, −36, 212, −10, 238}, and subset or universal set of {−238, 10, −212, 36, −184, 64, −158, 90, −130, −116, −104, 144, −78, 170, −50, 198, −24, 224} |

With reference to Table 23, it can be learned that, frequency band indexes of pilot subcarriers included in the first discrete 26-tone RU (that is, a discrete 26-tone RU whose index is 1) are {−224, 24}, frequency band indexes of pilot subcarriers included in the second discrete 26-tone RU (that is, a discrete 26-tone RU whose index is 2) are {−198, 50}, frequency band indexes of pilot subcarriers included in the third discrete 26-tone RU (that is, a discrete 26-tone RU whose index is 3) are {−170, 78}, and so on. Frequency band indexes of pilot subcarriers included in each of other discrete subset or a universal set of {−238, 10, −212, 36, −184, 64, −158, 90, −130, −116, −104, 144, −78, 170, −50, 198, −24, 224}.

In addition, in this application, when the size of the equivalent RU of the first frequency band is a continuous 484-tone RU, a left continuous 242-tone RU and a right continuous 242-tone RU of the continuous 484-tone RU may separately use a pilot subcarrier allocation manner used when the size of the equivalent RU of the first frequency band is a continuous 242-tone RU. For details, refer to the related description in FIG. 14. Details are not described herein again.

FIG. 17 is a schematic flowchart of another method for sending data in a wireless network according to an embodiment of this application. As shown in FIG. 17, the method includes but is not limited to the following steps.

1701: A STA determines a discrete resource unit RU allocated to the STA, where the discrete RU includes data subcarriers and pilot subcarriers, all subcarriers of one discrete RU are distributed on a first frequency band, a size of the first frequency band is 80 MHz, the first frequency band includes 72 pilot subcarriers that are disposed at an interval, a quantity of pilot subcarriers included in one discrete RU is greater than or equal to 2, and at least two pilot subcarriers included in one discrete RU are spaced by at least M pilot subcarriers.

For the discrete RU, refer to the foregoing related description. Details are not described herein again. It may be understood that, in this application, there may be one or more discrete RUs. This is not limited herein.

That the size of the first frequency band is 80 MHz may be understood as that a size of an equivalent RU of the first frequency band is a continuous 996-tone RU. This is not limited herein.

M may be 36.

1702: An AP receives a physical layer protocol data unit (physical protocol data unit, PPDU) on the discrete RU.

Correspondingly, the STA sends the PPDU on the discrete RU.

Optionally, step 1702 may include: The AP receives the PPDU from the STA on the discrete RU. Correspondingly, the STA sends the PPDU to the AP on the discrete RU.

It can be learned that, in the foregoing technical solution, all subcarriers of the discrete RU allocated to the STA are distributed on the frequency band of 80 MHz, and at least two pilot subcarriers included in the discrete RU are spaced by at least M pilot subcarriers, so that distribution of pilot subcarriers is more discrete, to resolve problems such as narrowband interference and frequency selective fading. In addition, a linear difference result is more accurate, so that a problem that a linear difference result is incorrect when pilot phases are not in a same period is avoided, and a linear difference implemented by using pilot subcarriers can accurately cover the entire frequency band. Moreover, sending the PPDU on the discrete RU is also implemented.

Optionally, the discrete RU is a discrete 26-tone RU, the discrete 26-tone RU includes 24 data subcarriers and two pilot subcarriers, and the two pilot subcarriers are spaced by at least 36 pilot subcarriers.

For example, refer to Table 24. Table 24 shows a correspondence that is between a discrete 26-tone RU and sequence indexes of two pilot subcarriers included in the discrete 26-tone RU and that exists when the size of the first frequency band is 80 MHz.

TABLE 24

| Correspondence that is between a discrete 26-tone RU and sequence indexes of two pilot subcarriers included in the discrete 26-tone RU and that exists when the size of the first frequency band is 80 MHz | |
| --- | --- |
| Index of a discrete 26-tone RU | Sequence indexes of pilot subcarriers |
| 1 | {1, 37} |
| 2 | {3, 39} |
| 3 | {5, 41} |

TABLE 24-continued

| Correspondence that is between a discrete 26-tone RU and sequence indexes of two pilot subcarriers included in the discrete 26-tone RU and that exists when the size of the first frequency band is 80 MHz | |
| --- | --- |
| Index of a discrete 26-tone RU | Sequence indexes of pilot subcarriers |
| 4 | {7, 43} |
| 5 | {9, 10} |
| 6 | {11, 47} |
| 7 | {13, 49} |
| 8 | {15, 51} |
| 9 | {17, 53} |
| 10 | {19, 55} |
| 11 | {21, 57} |
| 12 | {23, 59} |
| 13 | {25, 61} |
| 14 | {27, 28} |
| 15 | {29, 65} |
| 16 | {31, 67} |
| 17 | {33, 69} |
| 18 | {35, 71} |
| 19 | {2, 38} |
| 20 | {4, 40} |
| 21 | {6, 42} |
| 22 | {8, 44} |
| 23 | {45, 46} |
| 24 | {12, 48} |
| 25 | {14, 50} |
| 26 | {16, 52} |
| 27 | {18, 54} |
| 28 | [20, 56} |
| 29 | {22, 58} |
| 30 | {24, 60} |
| 31 | {26, 62} |
| 32 | {63, 64} |
| 33 | {30, 66} |
| 34 | {32, 68} |
| 35 | [34, 70} |
| 36 | [36, 72} |

With reference to Table 24, it can be learned that, an interval between sequence indexes that are of pilot subcarriers and that correspond to each of other discrete 26-tone RUs except a discrete 26-tone RU whose index is 5, a discrete 26-tone RU whose index is 14, a discrete 26-tone RU whose index is 23, and a discrete 26-tone RU whose index is 32 is 36. In other words, two pilot subcarriers included in each of the other discrete 26-tone RUs are spaced by 36 pilot subcarriers. It may be understood that, in this application, specific sequence indexes that are of pilot subcarriers and that correspond to each of the other discrete 26-tone RUs except the discrete 26-tone RU whose index is 5, the discrete 26-tone RU whose index is 14, the discrete 26-tone RU whose index is 23, and the discrete 26-tone RU whose index is 32 are not limited herein. For example, sequence indexes that are of pilot subcarriers and that correspond to a discrete 26-tone RU whose index is 1 may be one of the following: {1, 37}, {3, 39}, {5, 41}, {7, 43}, {11, 47}, {13, 49}, {15, 51}, {17, 53}, {19, 55}, or the like; and sequence indexes that are of pilot subcarriers and that correspond to a discrete 26-tone RU whose index is 2 may be one of the following: {1, 37}, {3, 39}, {5, 41}, {7, 43}, {11, 47}, {13, 49}, {15, 51}, {17, 53}, {19, 55}, or the like. It should be noted that, in this application, discrete 26-tone RUs whose indexes are different correspond to different sequence indexes of pilot subcarriers. For example, refer to Table 25. Table 25 shows another correspondence that is between a discrete 26-tone RU and sequence indexes of two pilot subcarriers included in the discrete 26-tone RU and that exists when the size of the first frequency band is 80 MHz. With reference to Table 25, it can be learned that, an interval between sequence indexes that are of pilot subcarriers and that correspond to each of other discrete 26-tone RUs except a discrete 26-tone RU whose index is 5, a discrete 26-tone RU whose index is 14, a discrete 26-tone RU whose index is 23, and a discrete 26-tone RU whose index is 32 is 36. In other words, two pilot subcarriers included in each of the other discrete 26-tone RUs are spaced by 36 pilot subcarriers.

TABLE 25

Another correspondence that is between a discrete 26-tone RU and sequence indexes of two pilot subcarriers included in the discrete 26-tone RU and that exists when the size of the first frequency band is 80 MHz

| Index of a discrete 26-tone RU | Sequence indexes of pilot subcarriers |
|---|---|
| 1 | {2, 38} |
| 2 | {4, 40} |
| 3 | {6, 42} |
| 4 | {8, 44} |
| 5 | {9, 10} |
| 6 | {12, 48} |
| 7 | {14, 50} |
| 8 | {16, 52} |
| 9 | {18, 54} |
| 10 | {20, 56} |
| 11 | {22, 58} |
| 12 | {24, 60} |
| 13 | {26, 62} |
| 14 | {27, 28} |
| 15 | {30, 66} |
| 16 | {32, 68} |
| 17 | {34, 70} |
| 18 | {36, 72} |
| 19 | {1, 37} |
| 20 | {3, 39} |
| 21 | {5, 41} |
| 22 | {7, 43} |
| 23 | {45, 46} |
| 24 | {11, 47} |
| 25 | {13, 49} |
| 26 | {15, 51} |
| 27 | {17, 53} |
| 28 | {19, 55} |
| 29 | {21, 57} |
| 30 | {23, 59} |
| 31 | {25, 61} |
| 32 | {63, 64} |
| 33 | {29, 65} |
| 34 | {31, 67} |
| 35 | {33, 69} |
| 36 | {35, 71} |

For example, refer to Table 26. Table 26 shows another correspondence that is between a discrete 26-tone RU and sequence indexes of two pilot subcarriers included in the discrete 26-tone RU and that exists when the size of the first frequency band is 80 MHz.

TABLE 26

Another correspondence that is between a discrete 26-tone RU and sequence indexes of two pilot subcarriers included in the discrete 26-tone RU and that exists when the size of the first frequency band is 80 MHz

| Index of a discrete 26-tone RU | Sequence indexes of pilot subcarriers |
|---|---|
| 1 | {1, 37} |
| 2 | {3, 39} |
| 3 | {5, 41} |
| 4 | {7, 43} |
| 5 | {9, 45} |
| 6 | {11, 47} |
| 7 | {13, 49} |

TABLE 26-continued

Another correspondence that is between a discrete 26-tone RU and sequence indexes of two pilot subcarriers included in the discrete 26-tone RU and that exists when the size of the first frequency band is 80 MHz

| Index of a discrete 26-tone RU | Sequence indexes of pilot subcarriers |
|---|---|
| 8 | {15, 51} |
| 9 | {17, 53} |
| 10 | {19, 55} |
| 11 | {21, 57} |
| 12 | {23, 59} |
| 13 | {25, 61} |
| 14 | {27, 63} |
| 15 | {29, 65} |
| 16 | {31, 67} |
| 17 | {33, 69} |
| 18 | {35, 71} |
| 19 | {2, 38} |
| 20 | {4, 40} |
| 21 | {6, 42} |
| 22 | {8, 44} |
| 23 | {10, 46} |
| 24 | {12, 48} |
| 25 | {14, 50} |
| 26 | {16, 52} |
| 27 | {18, 54} |
| 28 | {20, 56} |
| 29 | {22, 58} |
| 30 | {24, 60} |
| 31 | {26, 62} |
| 32 | {28, 64} |
| 33 | {30, 66} |
| 34 | {32, 68} |
| 35 | {34, 70} |
| 36 | {36, 72} |

With reference to Table 26, it can be learned that, an interval between sequence indexes that are of pilot subcarriers and that correspond to each of 36 discrete 26-tone RU indexes is 36. In other words, two pilot subcarriers included in each of the 36 discrete 26-tone RUs are spaced by 18 pilot subcarriers. It may be understood that, in this application, specific sequence indexes that of pilot subcarriers and that correspond to each of the 36 discrete 26-tone RUs are not limited herein. For example, sequence indexes that are of pilot subcarriers and that correspond to a discrete 26-tone RU whose index is 1 may be one of the following: {1, 37}, {3, 39}, {5, 41}, {7, 43}, or the like; and sequence indexes that are of pilot subcarriers and that correspond to a discrete 26-tone RU whose index is 2 may be one of the following: {1, 37}, {3, 39}, {5, 41}, {7, 43}, or the like. It should be noted that, in this application, discrete 26-tone RUs whose indexes are different correspond to different sequence indexes of pilot subcarriers. For example, refer to Table 27. Table 27 shows another correspondence that is between a discrete 26-tone RU and sequence indexes of two pilot subcarriers included in the discrete 26-tone RU and that exists when the size of the first frequency band is 80 MHz. With reference to Table 27, it can be learned that, an interval between sequence indexes that are of pilot subcarriers and that correspond to each of 36 discrete 26-tone RU indexes is 36. In other words, two pilot subcarriers included in each of the 36 discrete 26-tone RUs are spaced by 36 pilot subcarriers.

TABLE 27

| Another correspondence that is between a discrete 26-tone RU and sequence indexes of two pilot subcarriers included in the discrete 26-tone RU and that exists when the size of the first frequency band is 80 MHz | |
| --- | --- |
| Index of a discrete 26-tone RU | Sequence indexes of pilot subcarriers |
| 1 | {2, 38} |
| 2 | {4, 40} |
| 3 | {6, 42} |
| 4 | {8, 44} |
| 5 | {10, 46} |
| 6 | {12, 48} |
| 7 | {14, 50} |
| 8 | {16, 52} |
| 9 | {18, 54} |
| 10 | {20, 56} |
| 11 | {22, 58} |
| 12 | {24, 60} |
| 13 | {26, 62} |
| 14 | {28, 64} |
| 15 | {30, 66} |
| 16 | {32, 68} |
| 17 | {34, 70} |
| 18 | {36, 72} |
| 19 | {1, 37} |
| 20 | {3, 39} |
| 21 | {5, 41} |
| 22 | {7, 43} |
| 23 | {9, 45} |
| 24 | {11, 47} |
| 25 | {13, 49} |
| 26 | {15, 51} |
| 27 | {17, 53} |
| 28 | {19, 55} |
| 29 | {21, 57} |
| 30 | {23, 59} |
| 31 | {25, 61} |
| 32 | {27, 63} |
| 33 | {29, 65} |
| 34 | {31, 67} |
| 35 | {33, 69} |
| 36 | {35, 71} |

Optionally, the discrete RU is a discrete 52-tone RU, the discrete 52-tone RU includes two discrete 26-tone RUs, and pilot subcarriers of the discrete 52-tone RU include a part or all of pilot subcarriers in the two discrete 26-tone RUs.

For example, refer to Table 28. Table 28 shows a correspondence that is between a discrete 52-tone RU and indexes of discrete 26-tone RUs included in the discrete 52-tone RU and that exists when the size of the first frequency band is 80 MHz.

TABLE 28

| Correspondence that is between a discrete 52-tone RU and indexes of discrete 26-tone RUs included in the discrete 52-tone RU and that exists when the size of the first frequency band is 80 MHz | |
| --- | --- |
| Index of a discrete 52-tone RU | Indexes of two discrete 26-tone RUs |
| 1 | {1, 2} |
| 2 | {3, 4} |
| 3 | {6, 7} |
| 4 | {8, 9} |
| 5 | {10, 11} |
| 6 | {12, 13} |
| 7 | {15, 16} |
| 8 | {17, 18} |
| 9 | {19, 20} |
| 10 | {21, 22} |
| 11 | {24, 25} |
| 12 | {26, 27} |

TABLE 28-continued

| Correspondence that is between a discrete 52-tone RU and indexes of discrete 26-tone RUs included in the discrete 52-tone RU and that exists when the size of the first frequency band is 80 MHz | |
| --- | --- |
| Index of a discrete 52-tone RU | Indexes of two discrete 26-tone RUs |
| 13 | {28, 29} |
| 14 | {30, 31} |
| 15 | {33, 34} |
| 16 | {35, 36} |

With reference to Table 28, it can be learned that, a discrete 52-tone RU whose index is 1 corresponds to discrete 26-tone RUs whose indexes are 1 and 2, a discrete 52-tone RU whose index is 2 corresponds to discrete 26-tone RUs whose indexes are 3 and 4, a discrete 52-tone RU whose index is 3 corresponds to discrete 26-tone RUs whose indexes are 6 and 7, and a discrete 52-tone RU whose index is 4 corresponds to discrete 26-tone RUs whose indexes are 8 and 9. Other discrete 52-tone RUs are deducted by analogy. Details are not described herein. It may be understood that, pilot subcarriers included in the discrete 52-tone RU whose index is 1 may be a subset or a universal set of a union set of pilot subcarriers included in the discrete 26-tone RU whose index is 1 and the discrete 26-tone RU whose index is 2; pilot subcarriers included in the discrete 52-tone RU whose index is 2 may be a subset or a universal set of a union set of pilot subcarriers included in the discrete 26-tone RU whose index is 3 and the discrete 26-tone RU whose index is 4; pilot subcarriers included in the discrete 52-tone RU whose index is 3 may be a subset or a universal set of a union set of pilot subcarriers included in the discrete 26-tone RU whose index is 6 and the discrete 26-tone RU whose index is 7; and pilot subcarriers included in the discrete 52-tone RU whose index is 4 may be a subset or a universal set of a union set of pilot subcarriers included in the discrete 26-tone RU whose index is 8 and the discrete 26-tone RU whose index is 9. Pilot subcarriers included in each of other discrete 52-tone RUs are deducted by analogy. Details are not described herein.

For example, sequence indexes of the pilot subcarriers included in the discrete 52-tone RU whose index is 1 may be, for example, one of the following: {1, 37, 3, 39}, {1, 39}, or the like. This is not limited herein. In other words, the pilot subcarriers of the discrete 52-tone RU may include a part or all of the pilot subcarriers in the two discrete 26-tone RUs.

Optionally, the discrete RU is a discrete 52-tone RU, the discrete 52-tone RU includes at least 48 data subcarriers, a quantity of pilot subcarriers included in the discrete 52-tone RU is greater than or equal to 2 and is less than or equal to 4, and at least two pilot subcarriers in the maximum of four pilot subcarriers are spaced by at least 36 pilot subcarriers.

Optionally, the discrete RU is a discrete 106-tone RU, the discrete 106-tone RU includes four discrete 26-tone RUs, and pilot subcarriers of the discrete 106-tone RU include a part or all of pilot subcarriers in the four discrete 26-tone RUs.

For example, refer to Table 29. Table 29 shows a correspondence that is between a discrete 106-tone RU and indexes of discrete 26-tone RUs included in the discrete 106-tone RU and that exists when the size of the first frequency band is 80 MHz.

TABLE 29

Correspondence that is between a discrete 106-tone RU and indexes
of discrete 26-tone RUs included in the discrete 106-tone RU and
that exists when the size of the first frequency band is 80 MHz

| Index of a discrete 106-tone RU | Indexes of four discrete 26-tone RUs |
|---|---|
| 1 | {1, 2, 3, 4} |
| 2 | {6, 7, 8, 9} |
| 3 | {10, 11, 12, 13} |
| 4 | {15, 16, 17, 18} |
| 5 | {19, 20, 21, 22} |
| 6 | {24, 25, 26, 27} |
| 7 | {28, 29, 30, 31} |
| 8 | {33, 34, 35, 36} |

With reference to Table 29, it can be learned that, a discrete 106-tone RU whose index is 1 corresponds to discrete 26-tone RUs whose indexes are 1, 2, 3, and 4, and a discrete 106-tone RU whose index is 2 corresponds to discrete 26-tone RUs whose indexes are 6, 7, 8, and 9. Other discrete 106-tone RUs are deducted by analogy. Details are not described herein. It may be understood that, pilot subcarriers included in the discrete 106-tone RU whose index is 1 may be a subset or a universal set of a union set of pilot subcarriers included in the discrete 26-tone RU whose index is 1, the discrete 26-tone RU whose index is 2, the discrete 26-tone RU whose index is 3, and the discrete 26-tone RU whose index is 4; and pilot subcarriers included in the discrete 106-tone RU whose index is 2 may be a subset or a universal set of a union set of pilot subcarriers included in the discrete 26-tone RU whose index is 6, the discrete 26-tone RU whose index is 7, the discrete 26-tone RU whose index is 8, and the discrete 26-tone RU whose index is 9. Pilot subcarriers included in each of other discrete 106-tone RUs are deducted by analogy. Details are not described herein.

For example, sequence indexes of the pilot subcarriers included in the discrete 106-tone RU whose index is 1 may be, for example, one of the following: {1, 3, 5, 7, 37, 39, 41, 43}, {1, 3, 37, 39}, or the like. This is not limited herein. In other words, the pilot subcarriers of the discrete 106-tone RU may include a part or all of the pilot subcarriers in the four discrete 26-tone RUs.

Optionally, the discrete RU is a discrete 106-tone RU, the discrete 106-tone RU includes two discrete 52-tone RUs, and pilot subcarriers of the discrete 106-tone RU include a part or all of pilot subcarriers in the two discrete 52-tone RUs.

For example, refer to Table 30. Table 30 shows a correspondence that is between a discrete 106-tone RU and indexes of discrete 52-tone RUs included in the discrete 106-tone RU and that exists when the size of the first frequency band is 80 MHz.

TABLE 30

Correspondence that is between a discrete 106-tone RU and indexes
of discrete 52-tone RUs included in the discrete 106-tone RU and
that exists when the size of the first frequency band is 80 MHz

| Index of a discrete 106-tone RU | Indexes of two discrete 52-tone RUs |
|---|---|
| 1 | {1, 2} |
| 2 | {3, 4} |
| 3 | {5, 6} |
| 4 | {7, 8} |
| 5 | {9, 10} |

TABLE 30-continued

Correspondence that is between a discrete 106-tone RU and indexes
of discrete 52-tone RUs included in the discrete 106-tone RU and
that exists when the size of the first frequency band is 80 MHz

| Index of a discrete 106-tone RU | Indexes of two discrete 52-tone RUs |
|---|---|
| 6 | {11, 12} |
| 7 | {13, 14} |
| 8 | {15, 16} |

With reference to Table 30, it can be learned that, a discrete 106-tone RU whose index is 1 corresponds to discrete 52-tone RUs whose indexes are 1 and 2, and a discrete 106-tone RU whose index is 2 corresponds to discrete 52-tone RUs whose indexes are 3 and 4. Other discrete 106-tone RUs are deducted by analogy. Details are not described herein. It may be understood that, pilot subcarriers included in the discrete 106-tone RU whose index is 1 may be a subset or a universal set of a union set of pilot subcarriers included in the discrete 52-tone RU whose index is 1 and the discrete 52-tone RU whose index is 2; and pilot subcarriers included in the discrete 106-tone RU whose index is 2 may be a subset or a universal set of a union set of pilot subcarriers included in the discrete 52-tone RU whose index is 3 and the discrete 52-tone RU whose index is 4. Pilot subcarriers included in each of other discrete 106-tone RUs are deducted by analogy. Details are not described herein.

For example, sequence indexes of the pilot subcarriers included in the discrete 106-tone RU whose index is 1 may be, for example, one of the following: {1, 3, 5, 7, 37, 39, 41, 43}, {1, 3, 37, 39}, or the like. This is not limited herein. In other words, the pilot subcarriers of the discrete 106-tone RU may include a part or all of the pilot subcarriers in the two discrete 52-tone RUs.

Optionally, the discrete RU is a discrete 106-tone RU, a quantity of data subcarriers included in the discrete 106-tone RU is greater than or equal to 98, a quantity of pilot subcarriers included in the discrete 106-tone RU is greater than or equal to 2 and is less than or equal to 8, and at least two pilot subcarriers in the maximum of eight pilot subcarriers are spaced by at least 36 pilot subcarriers.

Optionally, the discrete RU is a discrete 242-tone RU, the discrete 242-tone RU includes two discrete 106-tone RUs, and pilot subcarriers of the discrete 242-tone RU include a part or all of pilot subcarriers in the two discrete 106-tone RUs.

For example, refer to Table 31. Table 31 shows a correspondence that is between a discrete 242-tone RU and indexes of discrete 106-tone RUs included in the discrete 242-tone RU and that exists when the size of the first frequency band is 80 MHz.

TABLE 31

Correspondence that is between a discrete 242-tone RU and indexes
of discrete 106-tone RUs included in the discrete 242-tone RU and
that exists when the size of the first frequency band is 80 MHz

| Index of a discrete 242-tone RU | Indexes of two discrete 106-tone RUs |
|---|---|
| 1 | {1, 2} |
| 2 | {3, 4} |
| 3 | {5, 6} |
| 4 | {7, 8} |

With reference to Table 31, it can be learned that, a discrete 242-tone RU whose index is 1 corresponds to discrete 106-tone RUs whose indexes are 1 and 2, and a discrete 242-tone RU whose index is 2 corresponds to discrete 106-tone RUs whose indexes are 3 and 4. It may be understood that, pilot subcarriers included in the discrete 242-tone RU whose index is 1 may be a subset or a universal set of a union set of pilot subcarriers included in the discrete 106-tone RU whose index is 1 and the discrete 106-tone RU whose index is 2; and pilot subcarriers included in the discrete 242-tone RU whose index is 2 may be a subset or a universal set of a union set of pilot subcarriers included in the discrete 106-tone RU whose index is 3 and the discrete 106-tone RU whose index is 4. Pilot subcarriers included in each of other discrete 242-tone RUs are deducted by analogy. Details are not described herein.

For example, sequence indexes of the pilot subcarriers included in the discrete 242-tone RU whose index is 1 may be, for example, one of the following: $\{1, 3, 5, 7, 9, 11, 13, 15, 17, 37, 39, 41, 43, 10, 47, 49, 51, 53\}$, or the like. This is not limited herein. In other words, the pilot subcarriers of the discrete 242-tone RU may include a part or all of the pilot subcarriers in the two discrete 106-tone RUs.

Optionally, the discrete RU is a discrete 242-tone RU, the discrete 242-tone RU includes four discrete 52-tone RUs, and pilot subcarriers of the discrete 242-tone RU include a part or all of pilot subcarriers in the four discrete 52-tone RUs.

Optionally, the discrete RU is a discrete 242-tone RU, the discrete 242-tone RU includes nine discrete 26-tone RUs, and pilot subcarriers of the discrete 242-tone RU include a part or all of pilot subcarriers in the nine discrete 26-tone RUs.

Optionally, the discrete RU is a discrete 242-tone RU, a quantity of data subcarriers included in the discrete 242-tone RU is greater than or equal to 224, a quantity of pilot subcarriers included in the discrete 242-tone RU is greater than or equal to 2 and is less than or equal to 18, and at least two pilot subcarriers in the maximum of 18 pilot subcarriers are spaced by at least 36 pilot subcarriers.

Optionally, the discrete RU is a discrete 484-tone RU, the discrete 484-tone RU includes two discrete 242-tone RUs, and pilot subcarriers of the discrete 484-tone RU include a part or all of pilot subcarriers in the two discrete 242-tone RUs.

For example, refer to Table 32. Table 32 shows a correspondence that is between a discrete 484-tone RU and indexes of discrete 242-tone RUs included in the discrete 484-tone RU and that exists when the size of the first frequency band is 80 MHz.

TABLE 32

| Correspondence that is between a discrete 484-tone RU and indexes of discrete 242-tone RUs included in the discrete 484-tone RU and that exists when the size of the first frequency band is 80 MHz | |
|---|---|
| Index of a discrete 484-tone RU | Indexes of two discrete 242-tone RUs |
| 1 | $\{1, 2\}$ |
| 2 | $\{3, 4\}$ |

With reference to Table 32, it can be learned that, a discrete 484-tone RU whose index is 1 corresponds to discrete 242-tone RUs whose indexes are 1 and 2, and a discrete 484-tone RU whose index is 2 corresponds to discrete 242-tone RUs whose indexes are 3 and 4. It may be understood that, pilot subcarriers included in the discrete 484-tone RU whose index is 1 may be a subset or a universal set of a union set of pilot subcarriers included in the discrete 242-tone RU whose index is 1 and the discrete 242-tone RU whose index is 2; and pilot subcarriers included in the discrete 484-tone RU whose index is 2 may be a subset or a universal set of a union set of pilot subcarriers included in the discrete 242-tone RU whose index is 3 and the discrete 242-tone RU whose index is 4.

For example, sequence indexes of the pilot subcarriers included in the discrete 484-tone RU whose index is 1 may be, for example, one of the following: $\{1, 3, 5, 7, 9, 11, 13, 15, 17, 19, 21, 23, 25, 27, 29, 31, 37, 39, 41, 43, 10, 47, 49, 51, 53, 55, 57, 59, 61, 28, 65, 67\}$, or the like. This is not limited herein. In other words, the pilot subcarriers of the discrete 484-tone RU may include a part or all of the pilot subcarriers in the two discrete 242-tone RUs.

Optionally, the discrete RU is a discrete 484-tone RU, the discrete 484-tone RU includes four discrete 106-tone RUs, and pilot subcarriers of the discrete 484-tone RU include a part or all of pilot subcarriers in the four discrete 106-tone RUs.

Optionally, the discrete RU is a discrete 484-tone RU, the discrete 484-tone RU includes eight discrete 52-tone RUs, and pilot subcarriers of the discrete 484-tone RU include a part or all of pilot subcarriers in the eight discrete 52-tone RUs.

Optionally, the discrete RU is a discrete 484-tone RU, the discrete 484-tone RU includes 16 discrete 26-tone RUs, and pilot subcarriers of the discrete 484-tone RU include a part or all of pilot subcarriers in the 16 discrete 26-tone RUs.

Optionally, the discrete RU is a discrete 484-tone RU, a quantity of data subcarriers included in the discrete 484-tone RU is greater than or equal to 448, a quantity of pilot subcarriers included in the discrete 484-tone RU is greater than or equal to 2 and is less than or equal to 36, and at least two pilot subcarriers in the maximum of 36 pilot subcarriers are spaced by at least 36 pilot subcarriers.

It should be noted that, in this application, based on a one-to-one correspondence between sequence indexes of 72 pilot subcarriers and frequency band indexes of the 72 pilot subcarriers, frequency band indexes of pilot subcarriers corresponding to different discrete RUs when the first frequency band is 80 MHz may be obtained.

Refer to Table 33. Table 33 shows a correspondence between sequence indexes of 72 pilot subcarriers and frequency band indexes of the 72 pilot subcarriers when the size of the first frequency band is 80 MHz. For example, a sequence index 1 of a pilot subcarrier corresponds to a frequency band index −494 of the pilot subcarrier.

TABLE 33

Correspondence between sequence indexes of 72 pilot subcarriers and frequency band indexes of the 72 pilot subcarriers when the size of the first frequency band is 80 MHz

| | Sequence index of a pilot subcarrier | | | | | | | | |
|---|---|---|---|---|---|---|---|---|---|
| | 1 | 2 | 3 | 4 | 5 | 6 | 7 | 8 | 9 |
| Frequency band index of the pilot subcarrier | −494 | −480 | −468 | −454 | −440 | −426 | −414 | −400 | −386 |

| | Sequence index of a pilot subcarrier | | | | | | | | |
|---|---|---|---|---|---|---|---|---|---|
| | 10 | 11 | 12 | 13 | 14 | 15 | 16 | 17 | 18 |
| Frequency band index of the pilot subcarrier | −372 | −360 | −346 | −334 | −320 | −306 | −292 | −280 | −266 |

| | Sequence index of a pilot subcarrier | | | | | | | | |
|---|---|---|---|---|---|---|---|---|---|
| | 19 | 20 | 21 | 22 | 23 | 24 | 25 | 26 | 27 |
| Frequency band index of the pilot subcarrier | −246 | −232 | −220 | −206 | −192 | −178 | −166 | −152 | −140 |

| | Sequence index of a pilot subcarrier | | | | | | | | |
|---|---|---|---|---|---|---|---|---|---|
| | 28 | 29 | 30 | 31 | 32 | 33 | 34 | 35 | 36 |
| Frequency band index of the pilot subcarrier | −126 | −112 | −98 | −86 | −72 | −58 | −44 | −32 | −18 |

| | Sequence index of a pilot subcarrier | | | | | | | | |
|---|---|---|---|---|---|---|---|---|---|
| | 37 | 38 | 39 | 40 | 41 | 42 | 43 | 44 | 45 |
| Frequency band index of the pilot subcarrier | 18 | 32 | 44 | 58 | 72 | 86 | 98 | 112 | 126 |

| | Sequence index of a pilot subcarrier | | | | | | | | |
|---|---|---|---|---|---|---|---|---|---|
| | 46 | 47 | 48 | 49 | 50 | 51 | 52 | 53 | 54 |
| Frequency band index of the pilot subcarrier | 140 | 152 | 166 | 178 | 192 | 206 | 220 | 232 | 246 |

| | Sequence index of a pilot subcarrier | | | | | | | | |
|---|---|---|---|---|---|---|---|---|---|
| | 55 | 56 | 57 | 58 | 59 | 60 | 61 | 62 | 63 |
| Frequency band index of the pilot subcarrier | 266 | 280 | 292 | 306 | 320 | 334 | 346 | 360 | 372 |

| | Sequence index of a pilot subcarrier | | | | | | | | |
|---|---|---|---|---|---|---|---|---|---|
| | 64 | 65 | 66 | 67 | 68 | 69 | 70 | 71 | 72 |
| Frequency band index of the pilot subcarrier | 386 | 400 | 414 | 426 | 440 | 454 | 468 | 480 | 494 |

For example, with reference to Table 24 or Table 26, frequency band indexes of pilot subcarriers corresponding to different discrete RUs when the first frequency band is 80 MHz may be obtained. Specifically, refer to Table 34. Table 34 shows frequency band indexes of pilot subcarriers corresponding to different discrete RUs when the size of the first frequency band is 80 MHz.

TABLE 34

| Frequency band indexes of pilot subcarriers corresponding to different discrete RUs when the size of the first frequency band is 80 MHz | | |
| --- | --- | --- |
| Size of the first frequency band | RU size (size) | Frequency band indexes of pilot subcarriers |
| 80 MHz | First to 36th discrete 26-tone RUs | {−494, 18} {−468, 44} {−440, 72} {−414, 98} {−386, −372} {−360, 152} {−334, 178} {−306, 206} {−280, 232} {−246, 266} {−220, 292} {−192, 320} {−166, 346} {−140, −126} {−112, 400} {−86, 426} {−58, 454} {−32, 480} {−480, 32} {−454, 58} {−426, 86} {−400, 112} {126, 140} {−346, 166} {−320, 192} {−292, 220} {−266, 246} {−232, 280} {−206, 306} {−178, 334} {−152, 360} {372, 386} {−98, 414} {−72, 440} {−44, 468} {−18, 494} |
| | First to 16th discrete 52-tone RUs | Subset or universal set of {−494, 18, −468, 44}, subset or universal set of {−440, 72, −414, 98}, subset or universal set of {−360, 152, −334, 178}, subset or universal set of {−306, 206, −280, 232}, subset or universal set of {−246, 266, −220, 292}, subset or universal set of {−192, 320, −166, 346}, subset or universal set of {−112, 400, −86, 426}, subset or universal set of {−58, 454, −32, 480}, subset or universal set of {−480, 32, −454, 58}, subset or universal set of {−426, 86, −400, 112}, subset or universal set of {−346, 166, −320, 192}, subset or universal set of {−292, 220, −266, 246}, subset or universal set of {−232, 280, −206, 306}, subset or universal set of {−178, 334, −152, 360}, subset or universal set of {−98, 414, −72, 440}, and subset or universal set of {−44, 468, −18, 494} |
| | First to eighth discrete 106-tone RUs | Subset or universal set of {−494, 18, −468, 44, −440, 72, −414, 98}, subset or universal set of {−360, 152, −334, 178, −306, 206, −280, 232}, subset or universal set of {−246, 266, −220, 292, −192, 320, −166, 346}, subset or universal set of {−112, 400, −86, 426, −58, 454, −32, 480}, subset or universal set of {−480, 32, −454, 58, −426, 86, −400, 112}, subset or universal set of {−346, 166, −320, 192, −292, 220, −266, 246}, subset or universal set of {−232, 280, −206, 306, −178, 334, −152, 360}, and subset or universal set of {−98, 414, −72, 440, −44, 468, −18, 494} |
| | First to fourth discrete 242-tone RUs | Subset or universal set of {−494, 18, −468, 44, −440, 72, −414, 98, −360, 152, −334, 178, −306, 206, −280, 232}, subset or universal set of {−246, 266, −220, 292, −192, 320, −166, 346, −112, 400, −86, 426, −58, 454, −32, 480}, subset or universal set of {−480, 32, −454, 58, −426, 86, −400, 112, −346, 166, −320, 192, −292, 220, −266, 246}, and subset or universal set of {−232, 280, −206, 306, −178, 334, −152, 360, −98, 414, −72, 440, −44, 468, −18, 494} |
| | First and second discrete 484-tone RUs | Subset or universal set of {−494, 18, −468, 44, −440, 72, −414, 98, −360, 152, −334, 178, −306, 206, −280, 232, −246, 266, −220, 292, −192, 320, −166, 346, −112, 400, −86, 426, −58, 454, −32, 480}, and subset or universal set of {−480, 32, −454, 58, −426, 86, −400, 112, −346, 166, −320, 192, −292, 220, −266, 246, −232, 280, −206, 306, −178, 334, −152, 360, −98, 414, −72, 440, −44, 468, −18, 494} |

With reference to Table 34, it can be learned that, frequency band indexes of pilot subcarriers included in the first discrete 26-tone RU (that is, a discrete 26-tone RU whose index is 1) are {−494, 18}, frequency band indexes of pilot subcarriers included in the second discrete 26-tone RU (that is, a discrete 26-tone RU whose index is 2) are {−440, 72}, frequency band indexes of pilot subcarriers included in the third discrete 26-tone RU (that is, a discrete 26-tone RU whose index is 3) are {−440, 72}, and so on. Frequency band indexes of pilot subcarriers included in each of other discrete 26-tone RUs are deducted by analogy. Details are not described herein. Frequency band indexes of pilot subcarriers included in the first discrete 52-tone RU (that is, a discrete 52-tone RU whose index is 1) are a subset or a universal set of {−494, 18, −468, 44}, frequency band indexes of pilot subcarriers included in the second discrete 52-tone RU (that is, a discrete 52-tone RU whose index is 2) are a subset or a universal set of {−440, 72, −414, 98}, and so on. Frequency band indexes of pilot subcarriers included in each of other discrete 52-tone RUs are deducted by analogy. Details are not described herein. Frequency band indexes of pilot subcarriers included in the first discrete 106-tone RU (that is, a discrete 106-tone RU whose index is 1) are a subset or a universal set of {−494, 18, −468, 44, −440, 72, −414, 98}, frequency band indexes of pilot subcarriers included in the second discrete 106-tone RU (that is, a discrete 106-tone RU whose index is 2) are a subset or a universal set of {−360, 152, −334, 178, −306, 206, −280, 232}, and so on. Frequency band indexes of pilot subcarriers included in each of other discrete 106-tone RUs are deducted by analogy. Details are not described herein. Frequency band indexes of pilot subcarriers included in the first discrete 242-tone RU (that is, a discrete 242-tone RU whose index is 1) are a subset or a universal set of {−494, 18, −468, 44, −440, 72, −414, 98, −360, 152, −334, 178, −306, 206, −280, 232}, frequency band indexes of pilot subcarriers included in the second discrete 242-tone RU (that is, a discrete 242-tone RU whose index is 2) are a subset or a universal set of {−246, 266, −220, 292, −192, 320, −166, 346, −112, 400, −86, 426, −58, 454, −32, 480}, and so on. Frequency band indexes of pilot subcarriers included in each of other discrete 242-tone RUs are deducted by analogy. Details are not described herein. Frequency band indexes of pilot subcarriers included in the first discrete 484-tone RU (that is, a discrete 484-tone RU whose index is 1) are a subset or a universal set of {−494, 18, −468, 44, −440, 72, −414, 98, −360, 152, −334, 178, −306, 206, −280, 232, −246, 266, −220, 292, −192, 320, −166, 346, −112, 400, −86, 426, −58, 454, −32, 480}, and frequency band indexes of pilot subcarriers included in the second discrete 484-tone RU (that is, a discrete 484-tone RU whose index is 2) are a subset or a universal set of {−480, 32, −454, 58, −426, 86, −400, 112, −346, 166, −320, 192, −292, 220, −266, 246, −232, 280, −206, 306, −178, 334, −152, 360, −98, 414, −72, 440, −44, 468, −18, 494}.

For example, with reference to Table 25 or Table 27, frequency band indexes of pilot subcarriers corresponding to different discrete RUs when the first frequency band is 80 MHz may be obtained. Specifically, refer to Table 35. Table 35 shows other frequency band indexes of pilot subcarriers corresponding to different discrete RUs when the size of the first frequency band is 80 MHz.

discrete 26-tone RU (that is, a discrete 26-tone RU whose index is 1) are {−480, 32}, frequency band indexes of pilot subcarriers included in the second discrete 26-tone RU (that is, a discrete 26-tone RU whose index is 2) are {−454, 58}, frequency band indexes of pilot subcarriers included in the third discrete 26-tone RU (that is, a discrete 26-tone RU whose index is 3) are {−426, 86}, and so on. Frequency band indexes of pilot subcarriers included in each of other discrete 26-tone RUs are deducted by analogy. Details are not described herein. Frequency band indexes of pilot subcarriers included in the first discrete 52-tone RU (that is, a discrete 52-tone RU whose index is 1) are a subset or a universal set of {−480, 32, −454, 58}, frequency band indexes of pilot subcarriers included in the second discrete 52-tone RU (that is, a discrete 52-tone RU whose index is 2) are a subset or a universal set of {−426, 86, −400, 112}, and so on. Frequency band indexes of pilot subcarriers included in each of other discrete 52-tone RUs are deducted by analogy. Details are not described herein. Frequency band indexes of pilot subcarriers included in the first discrete

TABLE 35

| Other frequency band indexes of pilot subcarriers corresponding to different discrete RUs when the size of the first frequency band is 80 MHz | | |
| --- | --- | --- |
| Size of the first frequency band | RU size (size) | Frequency band indexes of pilot subcarriers |
| 80 MHz | First to 36th discrete 26-tone RUs | {−480, 32} {−454, 58} {−426, 86} {−400, 112} {−386, −372} {−346, 166} {−320, 192} {−292, 220} {−266, 246} {−232, 280} {−206, 306} {−178, 334} {−152, 360} {−140, −126} {−98, 414} {−72, 440} {−44, 468} {−18, 494} {−494, 18} {−468, 44} {−440, 72} {−414, 98} {126, 140} {−360, 152} {−334, 178} {−306, 206} {−280, 232} {−246, 266} {−220, 292} {−192, 320} {−166, 346} {372, 386} {−112, 400} {−86, 426} {−58, 454} {−32, 480} |
| | First to 16th discrete 52-tone RUs | Subset or universal set of {−480, 32, −454, 58}, subset or universal set of {−426, 86, −400, 112}, subset or universal set of {−346, 166, −320, 192}, subset or universal set of {−292, 220, −266, 246}, subset or universal set of {−232, 280, −206, 306}, subset or universal set of {−178, 334, −152, 360}, subset or universal set of {−98, 414, −72, 440}, subset or universal set of {−44, 468, −18, 494}, subset or universal set of {−494, 18, −468, 44}, subset or universal set of {−440, 72, −414, 98}, subset or universal set of {−360, 152, −334, 178}, subset or universal set of {−306, 206, −280, 232}, subset or universal set of {−246, 266, −220, 292}, subset or universal set of {−192, 320, −166, 346}, subset or universal set of {−112, 400, −86, 426}, and subset or universal set of {−58, 454, −32, 480} |
| | First to eighth discrete 106-tone RUs | Subset or universal set of {−480, 32, −454, 58, −426, 86, −400, 112}, subset or universal set of {−346, 166, −320, 192, −292, 220, −266, 246}, subset or universal set of {−232, 280, −206, 306, −178, 334, −152, 360}, subset or universal set of {−98, 414, −72, 440, −44, 468, −18, 494}, subset or universal set of {−494, 18, −468, 44, −440, 72, −414, 98}, subset or universal set of {−360, 152, −334, 178, −306, 206, −280, 232}, subset or universal set of {−246, 266, −220, 292, −192, 320, −166, 346}, and subset or universal set of {−112, 400, −86, 426, −58, 454, −32, 480} |
| | First to fourth discrete 242-tone RUs | Subset or universal set of {−480, 32, −454, 58, −426, 86, −400, 112, −346, 166, −320, 192, −292, 220, −266, 246}, subset or universal set of {−232, 280, −206, 306, −178, 334, −152, 360, −98, 414, −72, 440, −44, 468, −18, 494}, subset or universal set of {−494, 18, −468, 44, −440, 72, −414, 98, −360, 152, −334, 178, −306, 206, −280, 232}, and subset or universal set of {−246, 266, −220, 292, −192, 320, −166, 346, −112, 400, −86, 426, −58, 454, −32, 480} |
| | First and second discrete 484-tone RUs | Subset or universal set of {−480, 32, −454, 58, −426, 86, −400, 112, −346, 166, −320, 192, −292, 220, −266, 246, −232, 280, −206, 306, −178, 334, −152, 360, −98, 414, −72, 440, −44, 468, −18, 494}, and subset or universal set of {−494, 18, −468, 44, −440, 72, −414, 98, −360, 152, −334, 178, −306, 206, −280, 232, −246, 266, −220, 292, −192, 320, −166, 346, −112, 400, −86, 426, −58, 454, −32, 480} |

With reference to Table 35, it can be learned that, frequency band indexes of pilot subcarriers included in the first 106-tone RU (that is, a discrete 106-tone RU whose index is 1) are a subset or a universal set of {−480, 32, −454, 58, -426, 86, -400, 112}, frequency band indexes of pilot subcarriers included in the second discrete 106-tone RU (that is, a discrete 106-tone RU whose index is 2) are a subset or a universal set of {-346, 166, -320, 192, -292, 220, -266, 246}, and so on. Frequency band indexes of pilot subcarriers included in each of other discrete 106-tone RUs are deducted by analogy. Details are not described herein. Frequency band indexes of pilot subcarriers included in the first discrete 242-tone RU (that is, a discrete 242-tone RU whose index is 1) are a subset or a universal set of {-480, 32, -454, 58, -426, 86, -400, 112, -346, 166, -320, 192, -292, 220, -266, 246}, frequency band indexes of pilot subcarriers included in the second discrete 242-tone RU (that is, a discrete 242-tone RU whose index is 2) are a subset or a universal set of {-232, 280, -206, 306, -178, 334, -152, 360, -98, 414, -72, 440, -44, 468, -18, 494}, and so on. Frequency band indexes of pilot subcarriers included in each of other discrete 242-tone RUs are deducted by analogy. Details are not described herein. Frequency band indexes of pilot subcarriers included in the first discrete 484-tone RU (that is, a discrete 484-tone RU whose index is 1) are a subset or a universal set of {-480, 32, -454, 58, -426, 86, -400, 112, -346, 166, -320, 192, -292, 220, -266, 246, -232, 280, -206, 306, -178, 334, -152, 360, -98, 414, -72, 440, -44, 468, -18, 494}, and frequency band indexes of pilot subcarriers included in the second discrete 484-tone RU (that is, a discrete 484-tone RU whose index is 2) are a subset or a universal set of {-494, 18, -468, 44, -440, 72, -414, 98, -360, 152, -334, 178, -306, 206, -280, 232, -246, 266, -220, 292, -192, 320, -166, 346, -112, 400, -86, 426, -58, 454, -32, 480}.

In a possible implementation, in this application, when the size of the equivalent RU of the first frequency band is a continuous 996-tone RU, a left continuous 484-tone RU and a right continuous 484-tone RU of the continuous 996-tone RU may separately use a pilot subcarrier allocation manner used when the size of the equivalent RU of the first frequency band is a continuous 484-tone RU. For details, refer to the related description in FIG. 16. Details are not described herein again. Alternatively, the continuous 484-tone RU may use a pilot subcarrier allocation manner used for the continuous 242-tone RU. In another possible implementation, when the size of the equivalent RU of the first frequency band is a continuous 996-tone RU, the continuous 996-tone RU may include four continuous 242-tone RUs, and each continuous 242-tone RU may use a pilot subcarrier allocation manner used when the size of the equivalent RU of the first frequency band is a continuous 242-tone RU. For details, refer to the related description in FIG. 14. Details are not described herein again.

Optionally, in this application, when an equivalent size of the first frequency band is a continuous 2*996-tone RU, a continuous 3*996-tone RU, or a continuous 4*996-tone RU, an interval between two pilot subcarriers included in the discrete RU is respectively at least 72, 108, or 144. For specific pilot subcarrier allocation manners, refer to FIG. 14, FIG. 16, and FIG. 17. Details are not described herein again.

In this application, the size of the first frequency band is U*20 MHz, where U=1, or U is an even number. There are nine discrete 26-tone RUs per 20 MHz. Each of 9*U discrete 26-tone RUs includes data subcarriers and pilot subcarriers, and all subcarriers of each of the 9*U discrete 26-tone RUs are distributed on the first frequency band. 18 pilot subcarriers are included per 20 MHz, and 18*U pilot subcarriers may be included on U*20 MHz.

If U is 1, the first frequency band includes 18 pilot subcarriers that are disposed at an interval, a quantity of pilot subcarriers included in one discrete 26-tone RU is equal to 2, and two pilot subcarriers included in each of other discrete 26-tone RUs except a fifth discrete 26-tone RU are spaced by at least 10 pilot subcarriers. For details, refer to the related description in FIG. 12. Details are not described herein again.

If U is an even number, two pilot subcarriers included in each of other discrete 26-tone RUs except a $(5+9*n)^{th}$ discrete 26-tone RU are spaced by at least 9*U pilot subcarriers, where n is an integer greater than or equal to 0 and less than or equal to U-1. It may be understood that, sequence indexes that are of pilot subcarriers and that correspond to the $(5+9*n)^{th}$ discrete 26-tone RU are {2*(5+9*n)-1, 2*(5+9*n)}, and sequence indexes that are of pilot subcarriers and that correspond to each of the other discrete 26-tone RUs except the $(5+9*n)^{th}$ discrete 26-tone RU are {x, x+9*U}, where x satisfies the following condition: x is an integer greater than or equal to 1 and less than or equal to 9*U, and x is not equal to 2*(5+9*n)-1.

If U is 1 or an even number, sequence indexes that are of pilot subcarriers and that correspond to each of the 9*U discrete 26-tone RUs are {x, x+9U}, where x is an integer greater than or equal to 1 and less than or equal to 9*U.

Optionally, in this application, if at least two STAs send corresponding first pilot signals to an AP on all pilot subcarriers included on a first frequency band, the AP may receive second pilot signals of the at least two STAs on all the pilot subcarriers included on the first frequency band, and calculate an average value of the received second pilot signals corresponding to the at least two STAs, to use the average value as a first pilot signal sent by each of the at least two STAs.

The foregoing mainly describes the solutions provided in this application from the perspective of interaction between devices. It may be understood that, to implement the foregoing functions, each device includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the AP or the STA may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, module division is an example, and is merely logical function division. During actual implementation, another division manner may be used.

When an integrated module is used, FIG. 18 is a schematic diagram of a structure of a communication apparatus according to an embodiment of this application. The communication apparatus 1800 may be applied to the methods shown in FIG. 5 to FIG. 15. As shown in FIG. 18, the communication apparatus 1800 includes a processing module 1801 and a transceiver module 1802. The processing module 1801 may be one or more processors, and the transceiver module 1802 may be a transceiver or a communication interface. The communication apparatus may be configured to implement the AP or the STA in any one of the foregoing method embodiments, or may be configured to implement a function of a network element in any one of the foregoing method embodiments. The network element or network function may be a network element in a hardware device, a software function running on dedicated hardware, or a virtualized function instantiated on a platform (for example, a cloud platform). Optionally, the communication apparatus 1800 may further include a storage module 1803, configured to store program code and data of the communication apparatus 1800.

In an example, when the communication apparatus is used as a STA or a chip used in a STA, the communication apparatus performs the steps performed by the STA in the foregoing method embodiments. The transceiver module 1802 is configured to support communication with an AP or the like. The transceiver module specifically performs sending and/or receiving actions performed by the STA in FIG. 5 to FIG. 15, for example, supports the STA in performing step 502, and/or is configured to perform another process of the technology described in this specification. The processing module 1801 may be configured to support the communication apparatus 1800 in performing processing actions in the foregoing method embodiments, for example, support the STA in performing one or more steps in step 501, step 1201, step 1401, or step 1501, and/or is configured to perform another process of the technology described in this specification.

In an example, when the communication apparatus is used as an AP or a chip used in an AP, the communication apparatus performs the steps performed by the AP in the foregoing method embodiments. The transceiver module 1802 is configured to support communication with a STA or the like. The transceiver module specifically performs sending and/or receiving actions performed by the AP in FIG. 5 to FIG. 15, for example, supports the AP in performing one or more steps in step 1202, step 1402, or step 1502, and/or is configured to perform another process of the technology described in this specification. The processing module 1801 may be configured to support the communication apparatus 1800 in performing processing actions in the foregoing method embodiments, for example, support the AP in performing step 502, and/or is configured to perform another process of the technology described in this specification.

In a possible implementation, when the STA or the AP is a chip, the transceiver module 1802 may be an interface, a pin, a circuit, or the like. The interface may be configured to input to-be-processed data to a processor, and may output a processing result of the processor to the outside. During specific implementation, the interface may be a general-purpose input/output (general-purpose input/output, GPIO) interface, and may be connected to a plurality of peripheral devices (for example, a display (LCD), a camera (camera), a radio frequency (radio frequency, RF) module, an antenna, and the like). The interface is connected to the processor through a bus.

The processing module 1801 may be a processor, and the processor may execute computer-executable instructions stored in the storage module, so that the chip performs the method in any one of the embodiments shown in FIG. 5, FIG. 11 to FIG. 14, FIG. 16, and FIG. 17.

Further, the processor may include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving register operation data, intermediate operation results, and the like that are temporarily stored during instruction execution. During specific implementation, a hardware architecture of the processor may be an application-specific integrated circuit (application-specific integrated circuit, ASIC) architecture, a microprocessor without interlocked piped stages architecture (microprocessor without interlocked piped stages architecture, MIPS) architecture, an advanced reduced instruction set computing machine (advanced RISC machine, ARM) architecture, a network processor (network processor, NP) architecture, or the like. The processor may be a single-core or multi-core processor.

The storage module may be a storage module inside the chip, for example, a register, a cache, or the like. Alternatively, the storage module may be a storage module located outside the chip, for example, a read-only memory (Read-Only Memory, ROM), another type of static storage device that can store static information and instructions, a random access memory (Random Access Memory, RAM), or the like.

It should be noted that a function corresponding to each of the processor and the interface may be implemented by using a hardware design, may be implemented by using a software design, or may be implemented by a combination of software and hardware. This is not limited herein.

An embodiment of this application further provides a communication apparatus. The communication apparatus includes a processor, a memory, an input interface, and an output interface. The input interface is configured to receive information from a communication apparatus other than the communication apparatus. The output interface is configured to output information to a communication apparatus other than the communication apparatus. The processor invokes a computer program stored in the memory, to implement any one of the embodiments shown in FIG. 5, FIG. 11 to FIG. 14, and FIG. 16.

An embodiment of this application further provides a chip. The chip includes at least one processor and an interface. The processor is configured to read and execute instructions stored in a memory. When the instructions are run, the chip is enabled to perform any one of the embodiments shown in FIG. 5, FIG. 11 to FIG. 14, and FIG. 16.

An embodiment of this application further provides a computer-readable storage medium. The computer-readable storage medium stores a computer program. The computer program includes program instructions. When the program instructions are executed by a computer, the computer is enabled to perform any one of the embodiments shown in FIG. 5, FIG. 11 to FIG. 14, and FIG. 16.

An embodiment of this application further provides a computer program product. When a computer reads and executes the computer program product, the computer is enabled to implement any one of the embodiments shown in FIG. 5, FIG. 11 to FIG. 14, and FIG. 16.

In the foregoing specific implementations, the objectives, technical solutions, and beneficial effects of this application are further described in detail. It should be understood that, the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method for sending data in a wireless network, wherein the method comprises:

determining, by a first device, a distributed resource unit (RU) allocated to the first device, wherein the distributed RU comprises data subcarriers and pilot subcarriers, all subcarriers of one distributed RU are distributed on a first frequency band, a size of the first frequency band is 20 MHz, and the first frequency band comprises a maximum of 18 pilot subcarriers that are disposed at an interval, wherein a quantity of pilot subcarriers comprised in one distributed RU is greater than or equal to 2, and at least two pilot subcarriers comprised in one distributed RU are spaced by at least M pilot subcarriers; and sending, by the first device, a physical layer protocol data unit (PPDU) on the distributed RU, wherein:

the maximum of 18 pilot subcarriers that are disposed at an interval on the first frequency band are the same as pilot subcarriers in a continuous RU mode; and one distributed RU corresponds to one continuous RU, one continuous RU comprises at least two pilot subcarriers, and there is an intersection set between indexes of pilot subcarriers in the distributed RU and indexes of pilot subcarriers in the continuous RU.

2. The method according to claim 1, wherein the distributed RU is a distributed 26-tone RU, the distributed 26-tone RU comprises 24 data subcarriers and two pilot subcarriers, and the two pilot subcarriers are spaced by at least nine pilot subcarriers.

3. The method according to claim 1, wherein the distributed RU is a distributed 52-tone RU, the distributed 52-tone RU comprises two distributed 26-tone RUs, and pilot subcarriers of the distributed 52-tone RU comprise a part or all of pilot subcarriers in the two distributed 26-tone RUs.

4. The method according to claim 1, wherein the distributed RU is a distributed 52-tone RU, the distributed 52-tone RU comprises at least 48 data subcarriers, a quantity of pilot subcarriers comprised in the distributed 52-tone RU is greater than or equal to 2 and is less than or equal to 4, and at least two pilot subcarriers in the maximum of four pilot subcarriers are spaced by at least nine pilot subcarriers.

5. The method according to claim 1, wherein the distributed RU is a distributed 106-tone RU, the distributed 106-tone RU comprises two distributed 52-tone RUs, and pilot subcarriers of the distributed 106-tone RU comprise a part or all of pilot subcarriers in the two distributed 52-tone RUs.

6. The method according to claim 1, wherein the distributed RU is a distributed 106-tone RU, a quantity of data subcarriers comprised in the distributed 106-tone RU is greater than or equal to 98, a quantity of pilot subcarriers comprised in the distributed 106-tone RU is greater than or equal to 2 and is less than or equal to 8, and at least two pilot subcarriers in the maximum of eight pilot subcarriers are spaced by at least nine pilot subcarriers.

7. A communication apparatus, wherein the apparatus comprises: at least one processor;

a transceiver; and one or more memories coupled to the at least one processor and storing programming instructions for execution by the at least one processor to:

determine a distributed resource unit (RU) allocated to the communication apparatus, wherein the distributed RU comprises data subcarriers and pilot subcarriers, all subcarriers of one distributed RU are distributed on a first frequency band, a size of the first frequency band is 20 MHz, and the first frequency band comprises a maximum of 18 pilot subcarriers that are disposed at an interval, wherein a quantity of pilot subcarriers comprised in one distributed RU is greater than or equal to 2, and at least two pilot subcarriers comprised in one distributed RU are spaced by at least M pilot subcarriers; and send, by the transceiver, a physical layer protocol data unit (PPDU) on the distributed RU, wherein:

the maximum of 18 pilot subcarriers that are disposed at an interval on the first frequency band are the same as pilot subcarriers in a continuous RU mode; and one distributed RU corresponds to one continuous RU, one continuous RU comprises at least two pilot subcarriers, and there is an intersection set between indexes of pilot subcarriers in the distributed RU and indexes of pilot subcarriers in the continuous RU.

8. The communication apparatus according to claim 7, wherein the distributed RU is a distributed 26-tone RU, the distributed 26-tone RU comprises 24 data subcarriers and two pilot subcarriers, and the two pilot subcarriers are spaced by at least nine pilot subcarriers.

9. The communication apparatus according to claim 7, wherein the distributed RU is a distributed 52-tone RU, the distributed 52-tone RU comprises two distributed 26-tone RUs, and pilot subcarriers of the distributed 52-tone RU comprise a part or all of pilot subcarriers in the two distributed 26-tone RUs.

10. The communication apparatus according to claim 7, wherein the distributed RU is a distributed 52-tone RU, the distributed 52-tone RU comprises at least 48 data subcarriers, a quantity of pilot subcarriers comprised in the distributed 52-tone RU is greater than or equal to 2 and is less than or equal to 4, and at least two pilot subcarriers in the maximum of four pilot subcarriers are spaced by at least nine pilot subcarriers.

11. The communication apparatus according to claim 7, wherein the distributed RU is a distributed 106-tone RU, the distributed 106-tone RU comprises two distributed 52-tone RUs, and pilot subcarriers of the distributed 106-tone RU comprise a part or all of pilot subcarriers in the two distributed 52-tone RUs.

12. The communication apparatus according to claim 7, wherein the distributed RU is a distributed 106-tone RU, a quantity of data subcarriers comprised in the distributed 106-tone RU is greater than or equal to 98, a quantity of pilot subcarriers comprised in the distributed 106-tone RU is greater than or equal to 2 and is less than or equal to 8, and at least two pilot subcarriers in the maximum of eight pilot subcarriers are spaced by at least nine pilot subcarriers.

13. A chip, wherein the chip comprises at least one processor and an interface, the processor is configured to read and execute instructions stored in a memory, and when the instructions are run, the chip is enabled to perform a method comprises:

determining a distributed resource unit (RU) allocated to a first device, wherein the distributed RU comprises data subcarriers and pilot subcarriers, all subcarriers of one distributed RU are distributed on a first frequency band, a size of the first frequency band is 20 MHz, and the first frequency band comprises a maximum of 18 pilot subcarriers that are disposed at an interval, wherein a quantity of pilot subcarriers comprised in one distributed RU is greater than or equal to 2, and at least two pilot subcarriers comprised in one distributed RU are spaced by at least M pilot subcarriers; and sending a physical layer protocol data unit (PPDU) on the distributed RU, wherein:

the maximum of 18 pilot subcarriers that are disposed at an interval on the first frequency band are the same as pilot subcarriers in a continuous RU mode; and one distributed RU corresponds to one continuous RU, one continuous RU comprises at least two pilot subcarriers, and there is an intersection set between indexes of pilot subcarriers in the distributed RU and indexes of pilot subcarriers in the continuous RU.

14. The chip according to claim 13, wherein the distributed RU is a distributed 26-tone RU, the distributed 26-tone RU comprises 24 data subcarriers and two pilot subcarriers, and the two pilot subcarriers are spaced by at least nine pilot subcarriers.

15. The chip according to claim 13, wherein the distributed RU is a distributed 52-tone RU, the distributed 52-tone RU comprises two distributed 26-tone RUs, and pilot subcarriers of the distributed 52-tone RU comprise a part or all of pilot subcarriers in the two distributed 26-tone RUs.

16. The chip according to claim 13, wherein the distributed RU is a distributed 52-tone RU, the distributed 52-tone RU comprises at least 48 data subcarriers, a quantity of pilot subcarriers comprised in the distributed 52-tone RU is greater than or equal to 2 and is less than or equal to 4, and at least two pilot subcarriers in the maximum of four pilot subcarriers are spaced by at least nine pilot subcarriers.

17. The chip according to claim 13, wherein the distributed RU is a distributed 106-tone RU, the distributed 106-tone RU comprises two distributed 52-tone RUs, and pilot subcarriers of the distributed 106-tone RU comprise a part or all of pilot subcarriers in the two distributed 52-tone RUs.

18. The chip according to claim 13, wherein the distributed RU is a distributed 106-tone RU, a quantity of data subcarriers comprised in the distributed 106-tone RU is greater than or equal to 98, a quantity of pilot subcarriers comprised in the distributed 106-tone RU is greater than or equal to 2 and is less than or equal to 8, and at least two pilot subcarriers in the maximum of eight pilot subcarriers are spaced by at least nine pilot subcarriers.

\* \* \* \* \*